(12) United States Patent
Lowenthal et al.

(10) Patent No.: US 8,919,797 B2
(45) Date of Patent: Dec. 30, 2014

(54) WHEELCHAIR SEAT ASSEMBLY

(75) Inventors: Howard Lowenthal, Hinckley, OH (US); Traian Mohan, Parma, OH (US); Robert Bekoscke, Medina, OH (US); Damon Jurkiewicz, Cleveland, OH (US); Daniel James Yee, Parma, OH (US)

(73) Assignee: Invacare Corp., Elyria, OH (US)

( * ) Notice: Subject to any disclaimer, the term of this patent is extended or adjusted under 35 U.S.C. 154(b) by 711 days.

(21) Appl. No.: 13/065,200

(22) Filed: Mar. 16, 2011

(65) Prior Publication Data

US 2011/0227314 A1    Sep. 22, 2011

Related U.S. Application Data

(60) Provisional application No. 61/314,347, filed on Mar. 16, 2010, provisional application No. 61/412,043, filed on Nov. 10, 2010.

(51) Int. Cl.
| | |
|---|---|
| *B62M 1/14* | (2006.01) |
| *B60N 2/22* | (2006.01) |
| *A61G 5/10* | (2006.01) |
| *B60N 2/20* | (2006.01) |
| *A61G 5/08* | (2006.01) |
| *A61G 5/12* | (2006.01) |

(52) U.S. Cl.
CPC .......... *A61G 5/1067* (2013.01); *A61G 2203/14* (2013.01); *A61G 2005/085* (2013.01); *B60N 2/22* (2013.01); *B60N 2/20* (2013.01); *A61G 5/1075* (2013.01); *A61G 2005/0891* (2013.01); *A61G 2005/125* (2013.01); *A61G 2005/1045* (2013.01); *A61G 2005/1048* (2013.01); *A61G 2005/121* (2013.01); *A61G 5/1043* (2013.01); *A61G 5/12* (2013.01); *A61G 5/1059* (2013.01); *A61G 2005/0883* (2013.01)

USPC ................. 280/250.1; 280/304.1; 297/378.1; 297/361.1; 297/354.12

(58) Field of Classification Search
USPC .............. 280/250.1, 304.1; 297/378.1, 361.1, 297/354.12
See application file for complete search history.

(56) References Cited

U.S. PATENT DOCUMENTS

| | | |
|---|---|---|
| D231,801 S | 6/1974 | Pivacek |
| 3,865,427 A | 2/1975 | Delany |

(Continued)

FOREIGN PATENT DOCUMENTS

| | | |
|---|---|---|
| FR | 2845893 | 4/2004 |
| WO | 9746516 | 12/1997 |

OTHER PUBLICATIONS

Invacare Corporation, Operator and Maintenance Manual, Pronto M51 and M61 with SureStep, 80 pages, Rev. J—Oct. 2008, copyright 2008.

(Continued)

*Primary Examiner* — Joseph M Rocca
*Assistant Examiner* — Marlon Arce
(74) *Attorney, Agent, or Firm* — Calfee, Halter & Griswold LLP; Mark R. Hull

(57) ABSTRACT

A seat assembly for a conveyance, such as a wheelchair, that allows the user to set the recline angle of the seat back at a seating position, fold the seat back down to a folded position and back up to the seating position, such that the seat back is returned to the seating position at the user selected recline angle R unless the recline angle is adjusted by the user. The user selected recline angle R is not disturbed by folding the seat back from the seating position, to the folded position 106, and back to the seating position.

10 Claims, 116 Drawing Sheets

(56) References Cited

U.S. PATENT DOCUMENTS

| | | | | |
|---|---|---|---|---|
| 4,025,112 | A | 5/1977 | Hale | |
| 4,961,610 | A | 10/1990 | Reeder et al. | |
| 5,018,788 | A | 5/1991 | Cedergreen | |
| 5,033,792 | A | 7/1991 | Kanazawa | |
| D333,737 | S | 3/1993 | Adams | |
| 5,275,466 | A | 1/1994 | Rentchler, Jr. | |
| 5,366,037 | A | 11/1994 | Richey | |
| D365,787 | S | 1/1996 | Peterson et al. | |
| 5,593,211 | A * | 1/1997 | Jay et al. | 297/383 |
| D380,991 | S | 7/1997 | Deming | |
| 5,820,221 | A | 10/1998 | Greaves et al. | |
| 5,997,021 | A * | 12/1999 | Robinson et al. | 280/250.1 |
| 6,003,891 | A | 12/1999 | Broadhead | |
| 6,015,190 | A | 1/2000 | Wend | |
| 6,328,381 | B1 * | 12/2001 | Smuk | 297/365 |
| 6,352,273 | B1 | 3/2002 | Dickie | |
| 6,386,638 | B1 | 5/2002 | Strauch | |
| D462,639 | S | 9/2002 | Lin | |
| 6,459,962 | B2 | 10/2002 | Ulrich et al. | |
| D468,669 | S | 1/2003 | Hopely, Jr. | |
| 6,669,299 | B2 | 12/2003 | Carlson et al. | |
| D491,115 | S | 6/2004 | Taylor | |
| D494,110 | S | 8/2004 | Cheng | |
| 6,846,042 | B2 * | 1/2005 | Hanson et al. | 297/411.36 |
| 6,938,923 | B2 | 9/2005 | Mulhern et al. | |
| D523,788 | S | 6/2006 | Jones et al. | |
| D529,844 | S | 10/2006 | Chen et al. | |
| D536,187 | S | 2/2007 | Goebert et al. | |
| D536,887 | S | 2/2007 | Goebert et al. | |
| 7,185,910 | B2 * | 3/2007 | Beauchesne et al. | 280/650 |
| 7,192,042 | B2 * | 3/2007 | Cerreto | 280/250.1 |
| D540,221 | S | 4/2007 | Cartellone et al. | |
| 7,204,556 | B2 | 4/2007 | Schwerdtner et al. | |
| 7,229,132 | B2 | 6/2007 | Meeker et al. | |
| 7,243,938 | B2 * | 7/2007 | Stamps et al. | 280/304.1 |
| 7,296,856 | B2 * | 11/2007 | Rozaieski et al. | 297/354.12 |
| D559,741 | S | 1/2008 | Lasher, III | |
| D569,769 | S | 5/2008 | Chiu et al. | |
| 7,413,045 | B2 | 8/2008 | Tien | |
| 7,472,959 | B1 | 1/2009 | Ratza et al. | |
| D585,794 | S | 2/2009 | Lin | |
| 7,494,186 | B2 * | 2/2009 | Paing et al. | 297/378.12 |
| D589,411 | S | 3/2009 | Brown et al. | |
| D590,304 | S | 4/2009 | Kruse | |
| D608,550 | S | 1/2010 | Scollberger et al. | |
| D614,541 | S | 4/2010 | Storm | |
| 7,694,991 | B2 | 4/2010 | Mills et al. | |
| D615,461 | S | 5/2010 | Storm | |
| D632,229 | S | 2/2011 | Kruse | |
| 7,891,696 | B2 * | 2/2011 | Hanson | 280/647 |
| 7,931,338 | B2 * | 4/2011 | Lindsay | 297/378.13 |
| 8,087,687 | B2 * | 1/2012 | Murdock | 280/642 |
| 8,474,848 | B2 * | 7/2013 | Bernatsky et al. | 280/250.1 |
| 2001/0013437 | A1 | 8/2001 | Husted et al. | |
| 2003/0056329 | A1 | 3/2003 | Coman et al. | |
| 2004/0239169 | A1 | 12/2004 | De Nichilo | |
| 2006/0066143 | A1 * | 3/2006 | Cerreto | 297/301.1 |
| 2006/0082098 | A1 | 4/2006 | Harris | |
| 2007/0107963 | A1 | 5/2007 | Chiu | |
| 2007/0195081 | A1 | 8/2007 | Fischer | |
| 2008/0087481 | A1 | 4/2008 | Grymko | |

OTHER PUBLICATIONS

Invacare Corporation, User Manual, FDX Power Wheelchair Base FDX, FDX-CG, FDX-MCG, 96 pages, Rev. A—Apr. 2010, copyright 2010.

Invacare Corporation, product catalog, 14 pages, copyright 2004, printed Feb. 18, 2011.

Invacare Corporation, At'm (Take Along Chair) brochure, 2 pages, copyright 2009.

Invacare Corporation, FDX Front-Wheel Drive Power Wheelchair brochure, 4 pages, copyright 2010.

Invacare Corporation, Nutron R51 brochure, 2 pages, copyright 2006.

Invacare Corporation, P9000 XDT brochure, 2 pages, copyright 2007.

Invacare Corporation, Pronto M51 brochure, 4 pages, copyright 2010.

Invacare Corporation, Pronto M51 with Formula CG Seating website printout, 2 pages, printed Feb. 18, 2011.

Invacare Corporation, The New TDX Family brochure, 25 pages, copyright 2008.

Invacare Corporation, Storm Series brochure, 16 pages, copyright 2010.

International Search Report and Written Opinion from PCT/US11/28626 dated May 20, 2011.

* cited by examiner

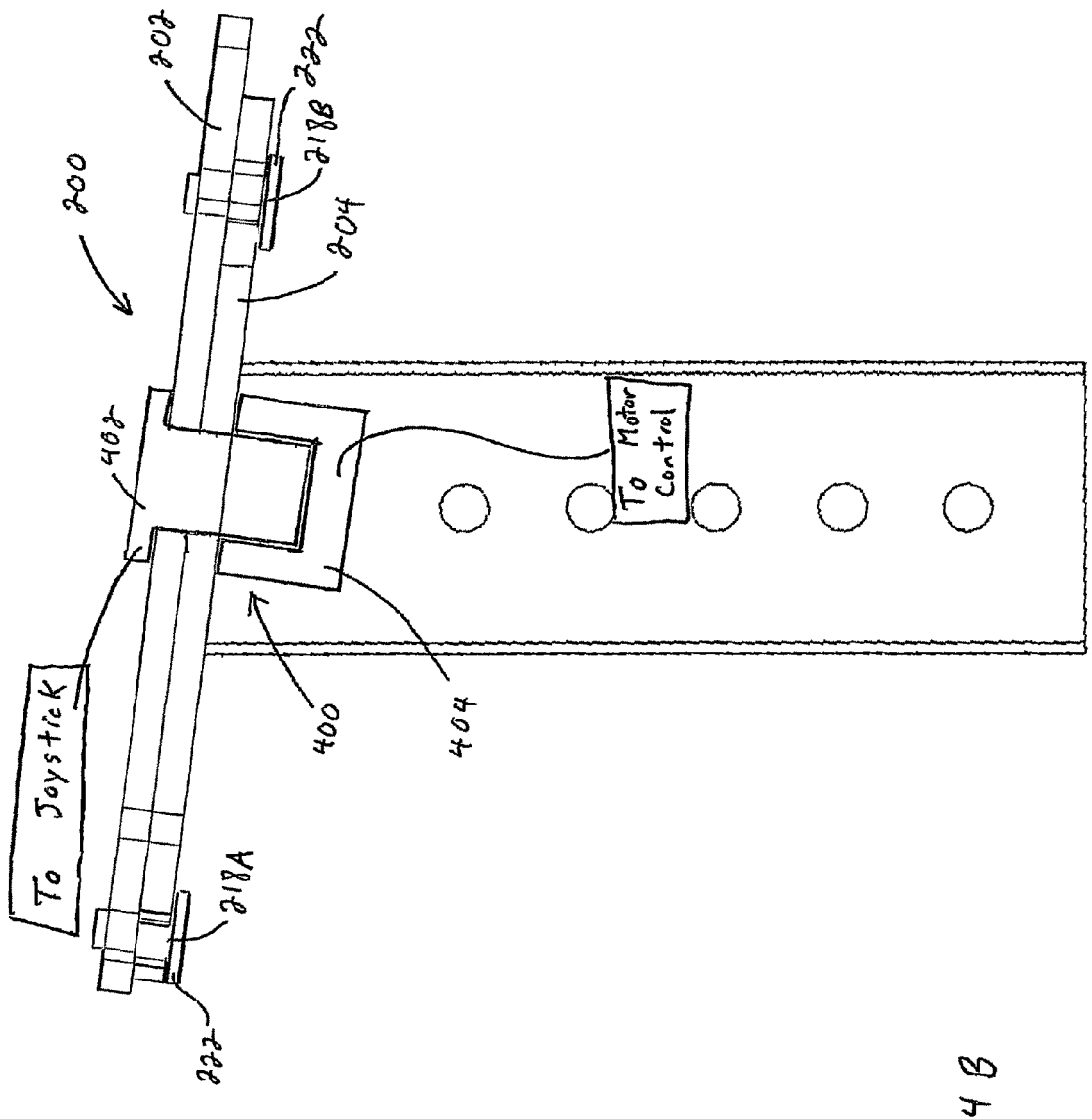

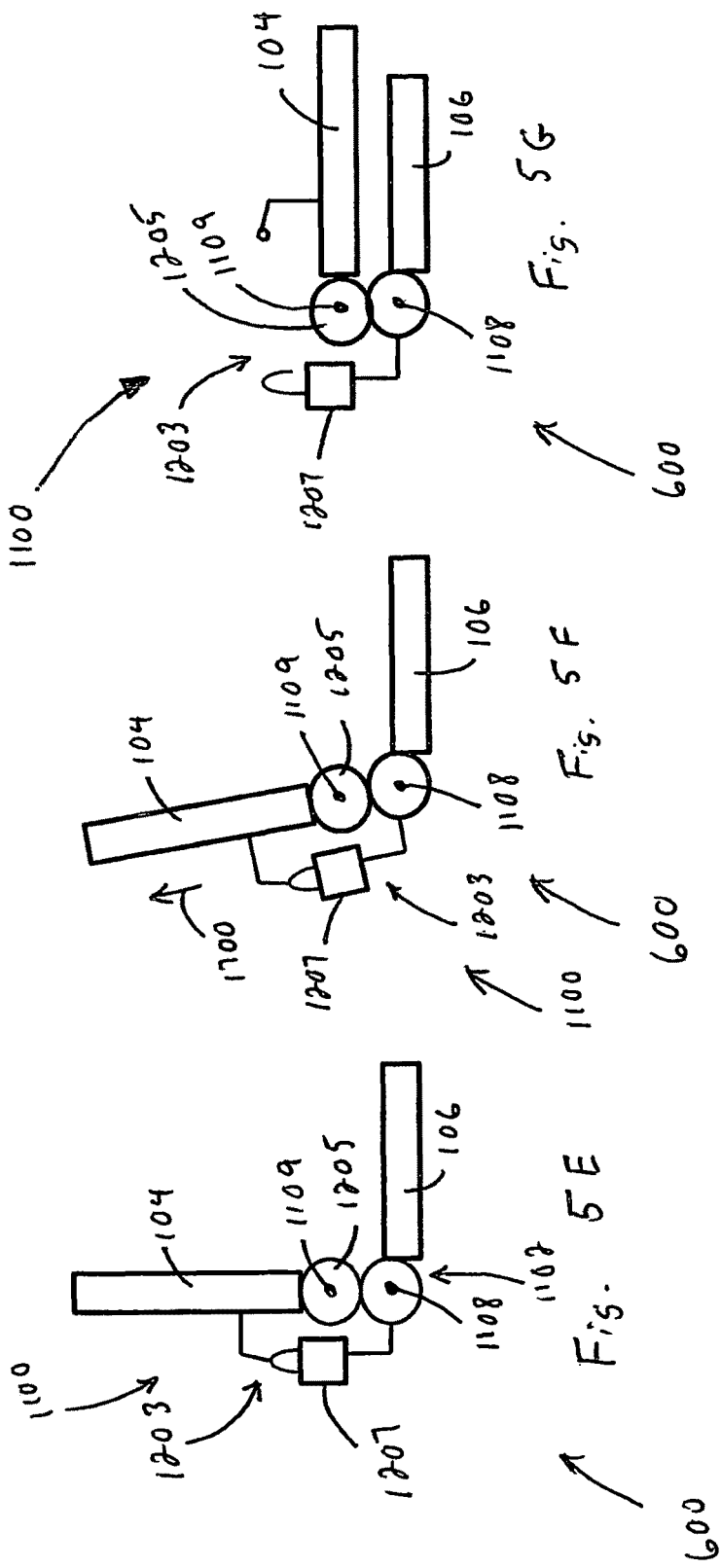

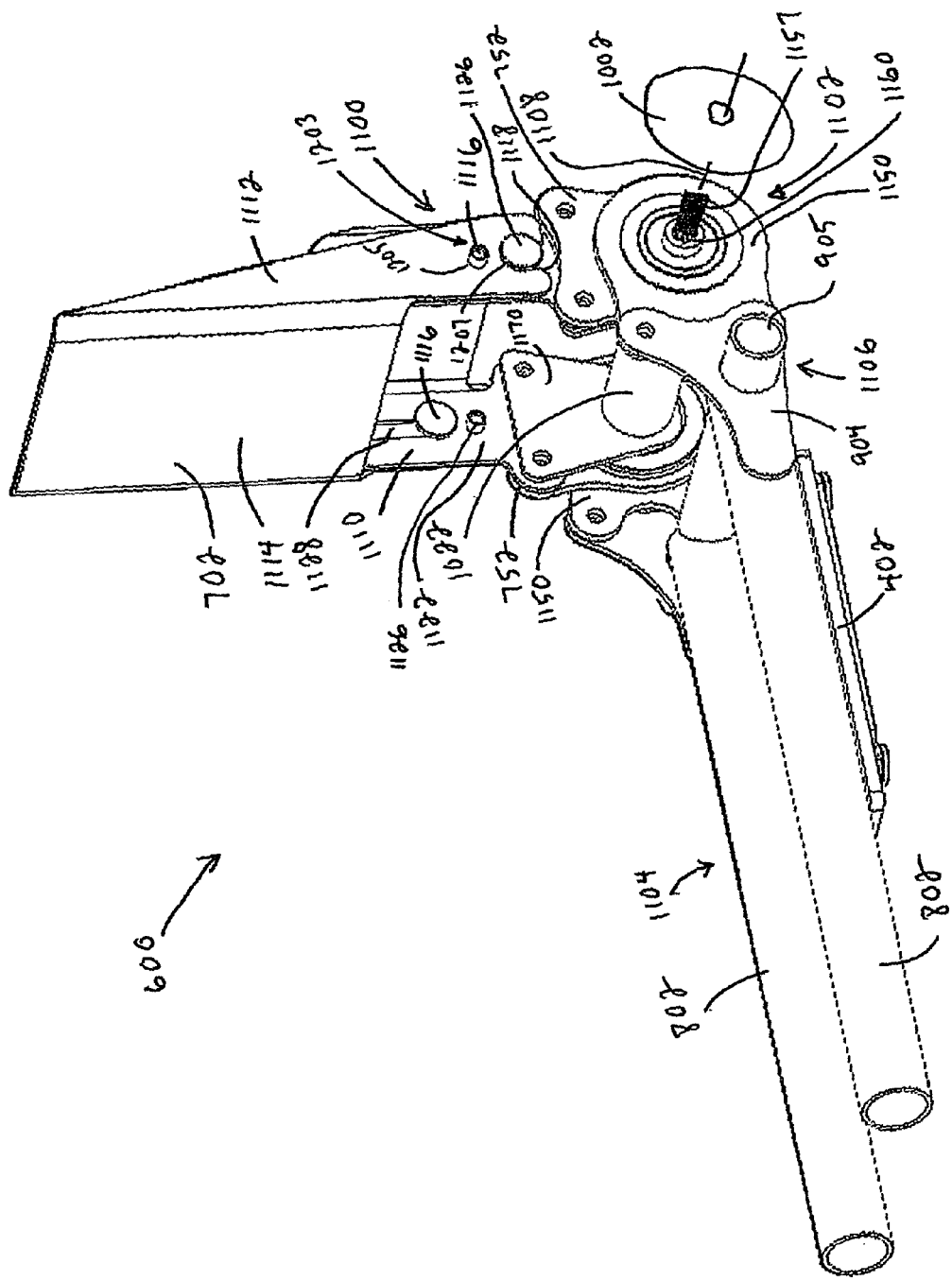

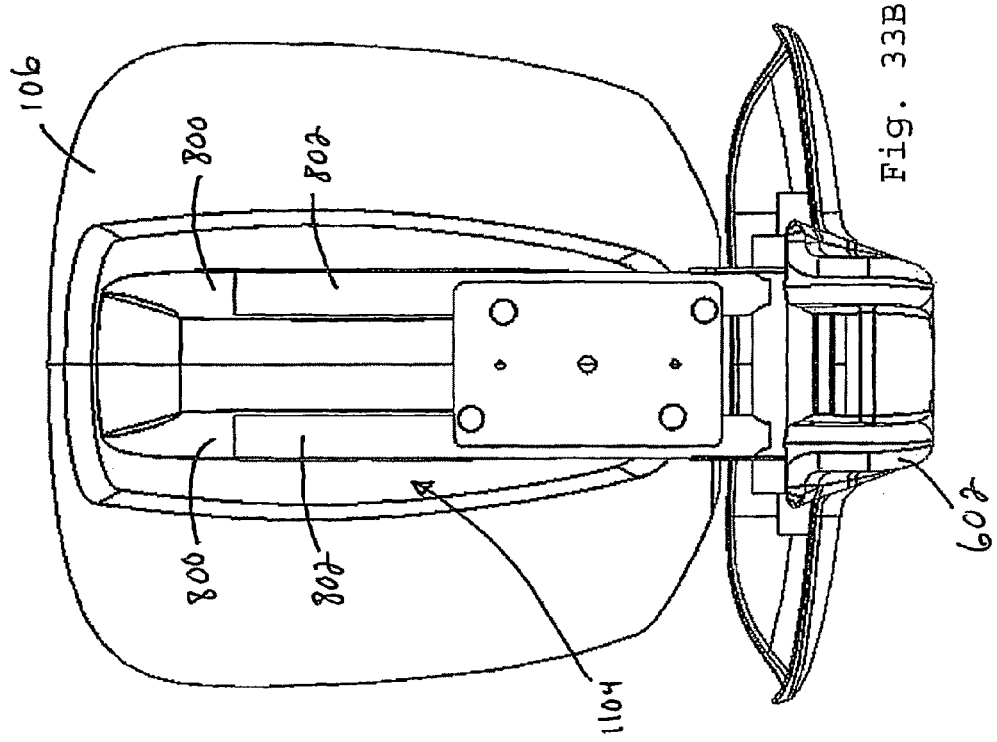
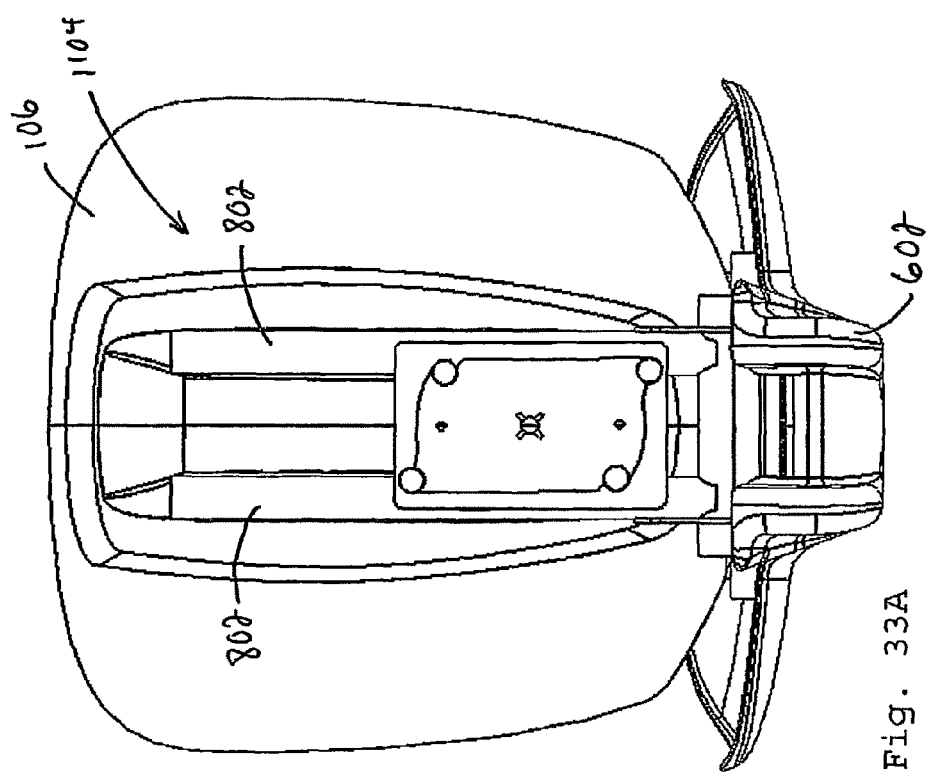

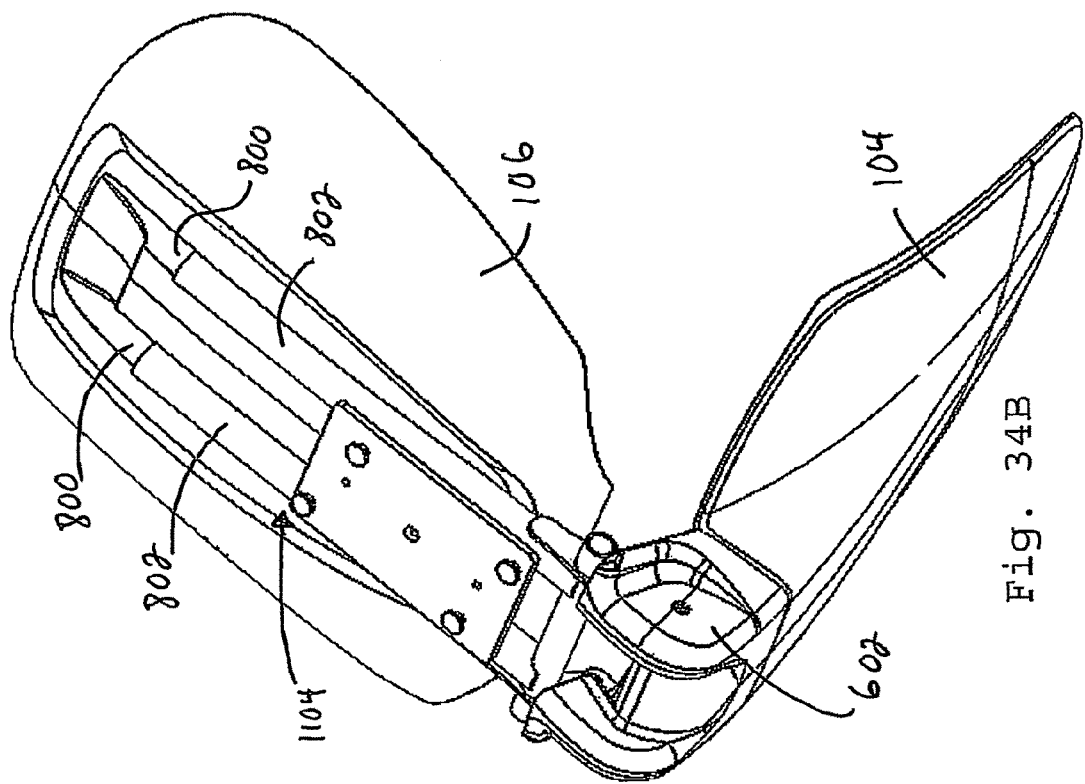
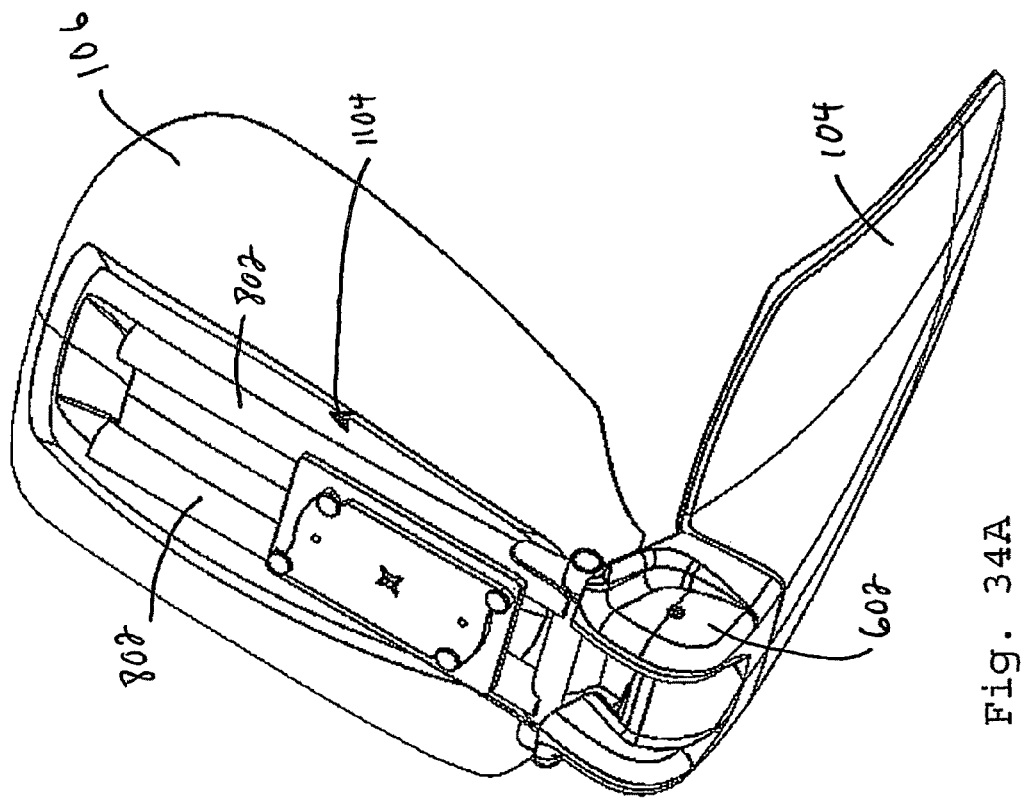

WHEELCHAIR SEAT ASSEMBLY

RELATED APPLICATIONS

The present application claims the benefit of U.S. provisional application Ser. No. 61/314,347, filed on Mar. 16, 2010, and 61/412,043, filed on Nov. 10, 2010 which are both incorporated herein by reference in their entireties.

FIELD OF THE INVENTION

The invention relates generally to conveyances and, more particularly, to wheelchairs for assisting in the mobility of its users.

BACKGROUND

Wheelchairs and similar conveyances are an important means of transportation for a significant portion of society. Whether manual or powered, wheelchairs provide an important degree of independence for those they assist.

SUMMARY

In one embodiment, the present invention is directed to a seat assembly for a conveyance, such as a wheelchair, that allows the user to set the recline angle of the seat back at a seating position, fold the seat back down to a folded position and back up to the seating position, such that the seat back is returned to the seating position at the user selected recline angle unless the recline angle is adjusted by the user. The user selected recline angle is not disturbed by folding the seat back from the seating position, to the folded position, and back to the seating position.

The present application also discloses exemplary embodiments of a seat assembly. Seat assemblies in accordance with the present invention may include any combination or subcombination of the features disclosed by the present application.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of this invention.

FIG. 4B is a sectional view of an alternate embodiment of a seat mount where an electrical connector is connected by connecting the components of the seat mount;

FIG. 5E is a schematic illustration of an exemplary embodiment of a seat with a seat adjustment and folding mechanism;

FIG. 5F is a view similar to FIG. 5E with a seat back reclined from the position shown in FIG. 5E;

FIG. 5G is a view similar to FIG. 5F with the seat back folded from the position shown in FIG. 5F;

FIG. 11 is a perspective view of the seat adjustment and folding assembly;

FIG. 33A is a bottom view illustrating the seat adjustment and folding assembly and the seat bottom of FIG. 32, where the seat back is adjusted to a minimum seat depth;

FIG. 33B is a bottom view illustrating the seat adjustment and folding assembly and the seat bottom of FIG. 32, where the seat back is adjusted to a maximum seat depth;

FIG. 34A is a bottom perspective view illustrating the seat adjustment and folding assembly and the seat bottom, where the seat back is adjusted to a minimum seat depth;

FIG. 34B is a bottom perspective view illustrating the seat adjustment and folding assembly and the seat bottom, where the seat back is adjusted to a maximum seat depth;

FIG. 53 is a perspective view of a tie down bracket;

FIG. 54A is a side elevational view of a tiltably adjustable seat cushion support assembly;

FIG. 54B is a side elevational view illustrating that a tilt mechanism may be positioned between a seat bottom and seat bottom support member;

FIG. 54C is a side elevational view illustrating that a tilt mechanism may be positioned between a seat bottom support member and a seat attachment plate;

FIG. 54D is a side elevational view illustrating that a tilt mechanism may be positioned between a seat attachment plate and a seat post;

FIG. 54E is a side elevational view illustrating a first embodiment of a tilt mechanism that is incorporated into the attachment of the seat attachment plate and the seat post; and FIG. 54F is a side elevational view illustrating a second embodiment of a tilt mechanism that is incorporated into the attachment of the seat attachment plate and the seat post.

As described herein, when one or more components are described as being connected, joined, affixed, coupled, attached, or otherwise interconnected, such interconnection may be direct as between the components or may be in direct such as through the use of one or more intermediary components. Also as described herein, reference to a "member," "component," or "portion" shall not be limited to a single structural member, component, or element but can include an assembly of components, members or elements.

Figure 1:
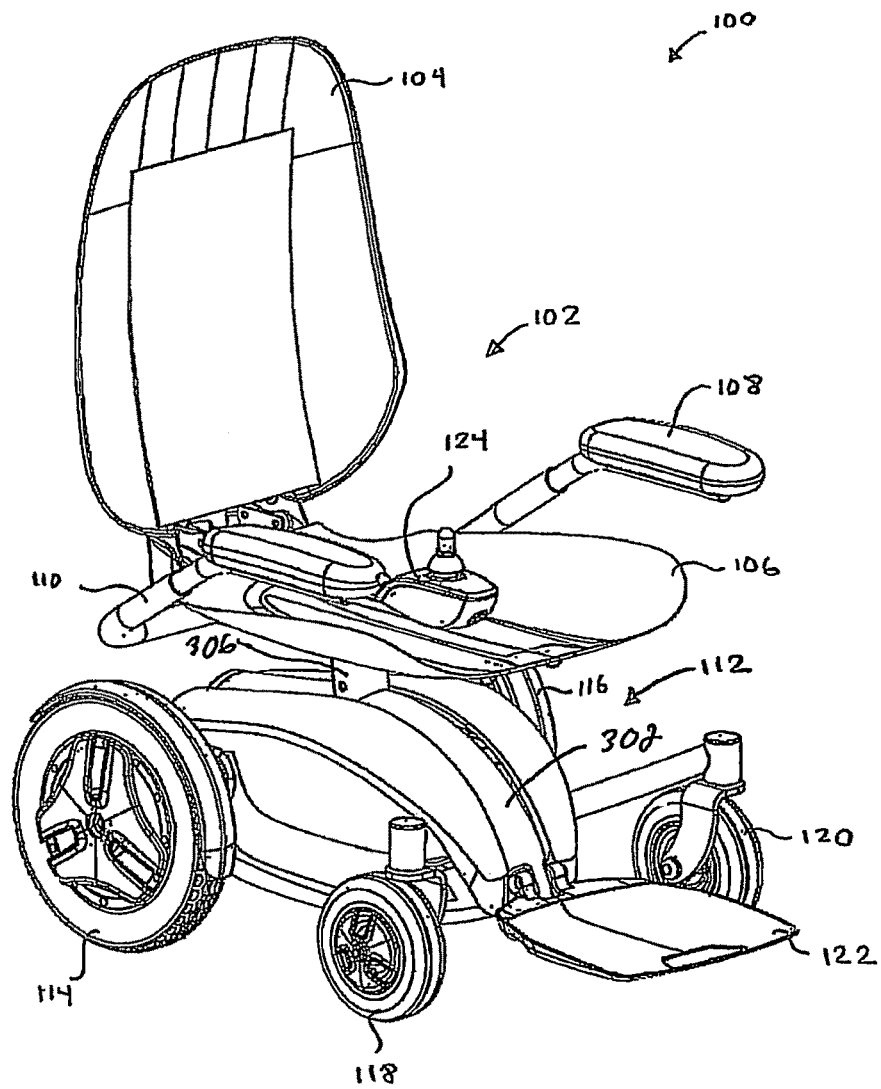
FIG. 1 is a perspective view of one embodiment of a conveyance incorporating aspects of the present invention.

Referring to FIG. 1, a conveyance such as a wheelchair 100 is illustrated. The wheelchair 100 includes a seat assembly 102 and a chassis 112. The seat assembly 102 includes a seat back 104, a seat bottom 106, and armrests assemblies 108 and 110. As will be described in more detail below, seat back 104 and seat bottom 106 are constructed in such a manner so as to allow the angle there between to be adjusted and to also allow for folding of these components together to facilitate disassembly and transportation of wheelchair 100.

The chassis 112 includes drive wheels 114 and 116 connected thereto for propulsion of wheelchair 100. Drive wheels 114 and 116 may be driven by a plurality of types of drive assemblies including, for example, electric motor and gear combinations or gearless brushless motors such as wheel hub motors. Casters 118 and 120 are connected to the chassis 112 for providing forward support of wheelchair 100. One or more rear anti-tip wheels 121 (see FIG. 2) may also be included. A footplate 122 is connected to the front portion of chassis 112 to support the feet of a user. A joystick 124 is provided to allow a user to control the drive system of wheelchair 100.

Figure 2:
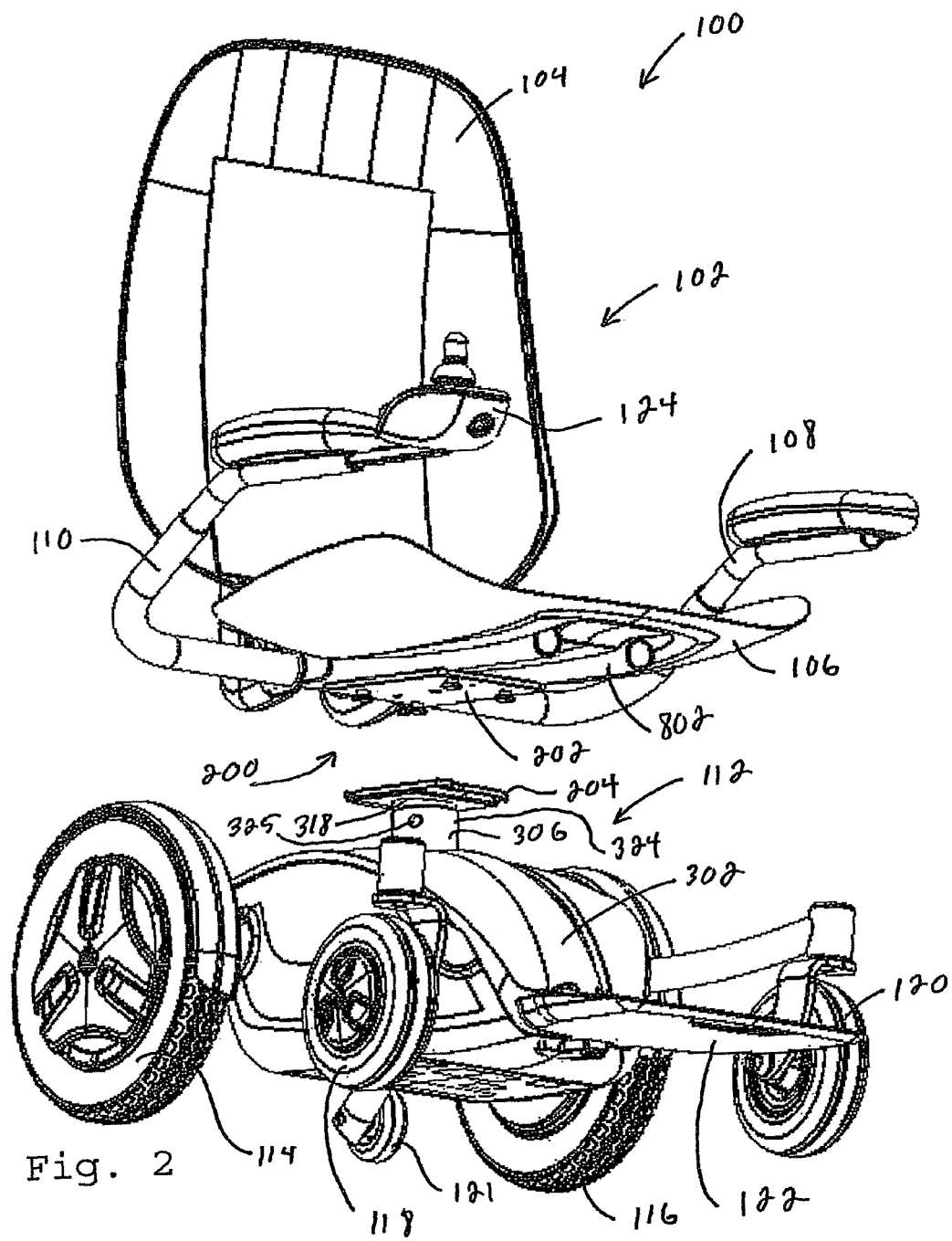
FIG. 2 is an exploded perspective view of the conveyance of FIG. 1.

Referring to FIG. 2, in one exemplary embodiment, the seat assembly 102 is easily attached to and detached from the chassis 112 by a quick release assembly 200. In FIG. 2, the seat assembly 102 is removed from the chassis. The quick release assembly 200 may take a wide variety of different forms. Examples of acceptable quick release assemblies 200 include, but are not limited to, detent mechanisms, cam-lock mechanisms, coarse threaded members, cooperating tongue and groove arrangements, pin and opening arrangements, and similar mechanisms. The quick release assembly 200 may comprise any arrangement capable of quickly and easily connecting the seat assembly 102 to the chassis 112. The quick release assembly 200 may be used with the illustrated seat 102 and chassis 112 or any other wheelchair seat and chassis.

Figure 3:
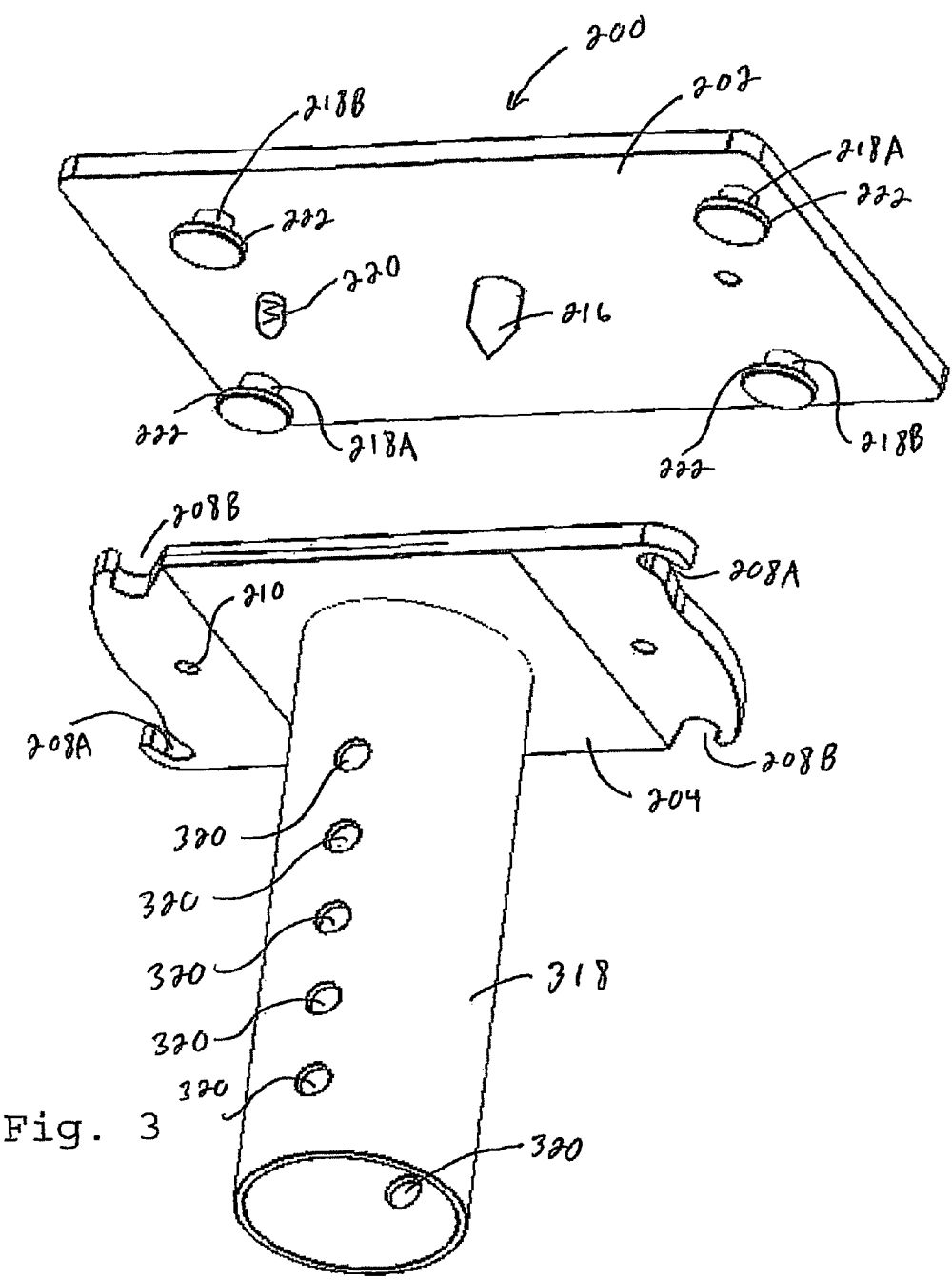
FIG. 3 is an exploded perspective view of an exemplary embodiment of a seat mount for the conveyance illustrated by FIG. 1.
Figure 4:
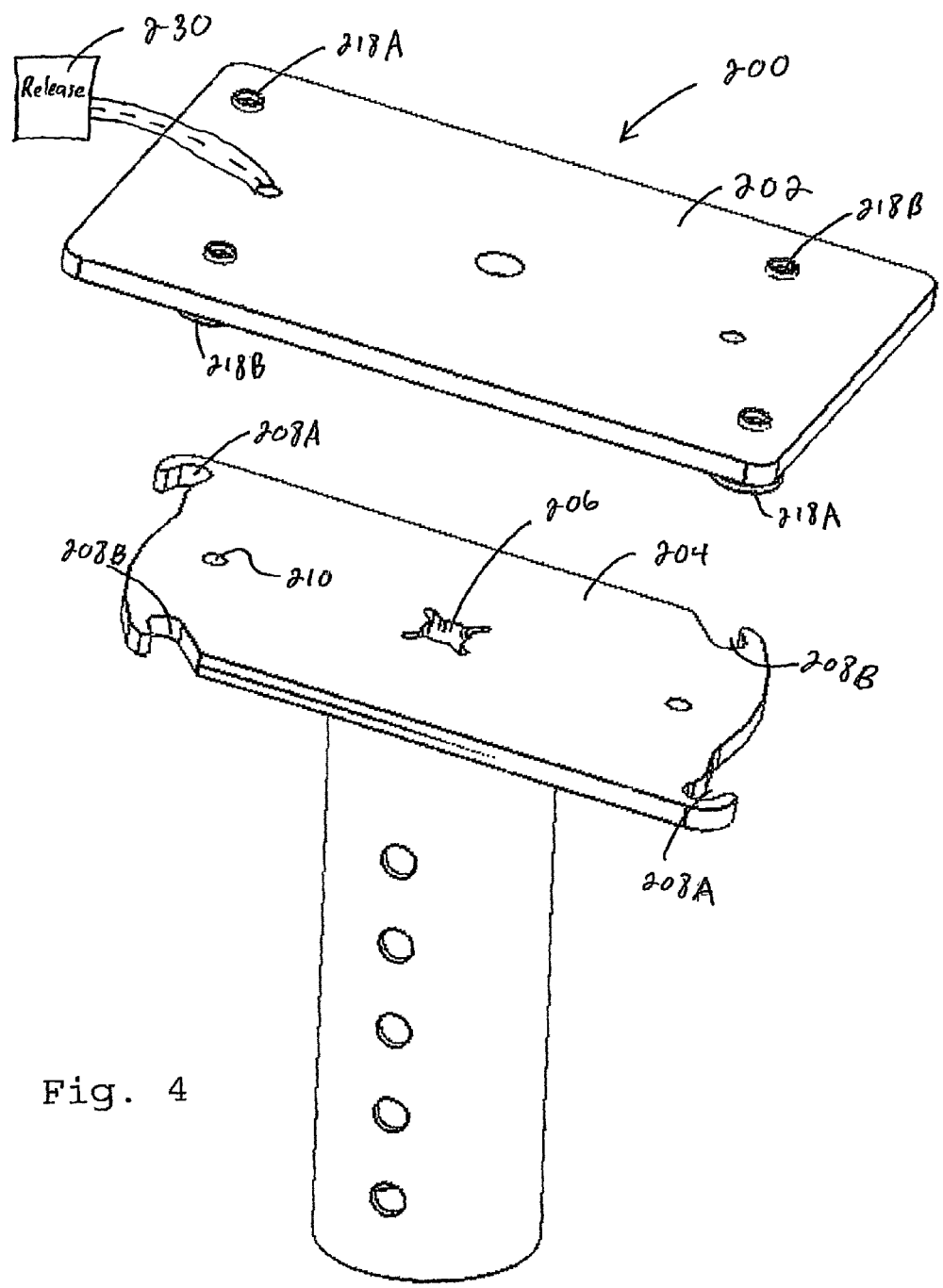
FIG. 4 is a second exploded perspective view of the seat mount illustrated by FIG. 3.
Figure 4A:
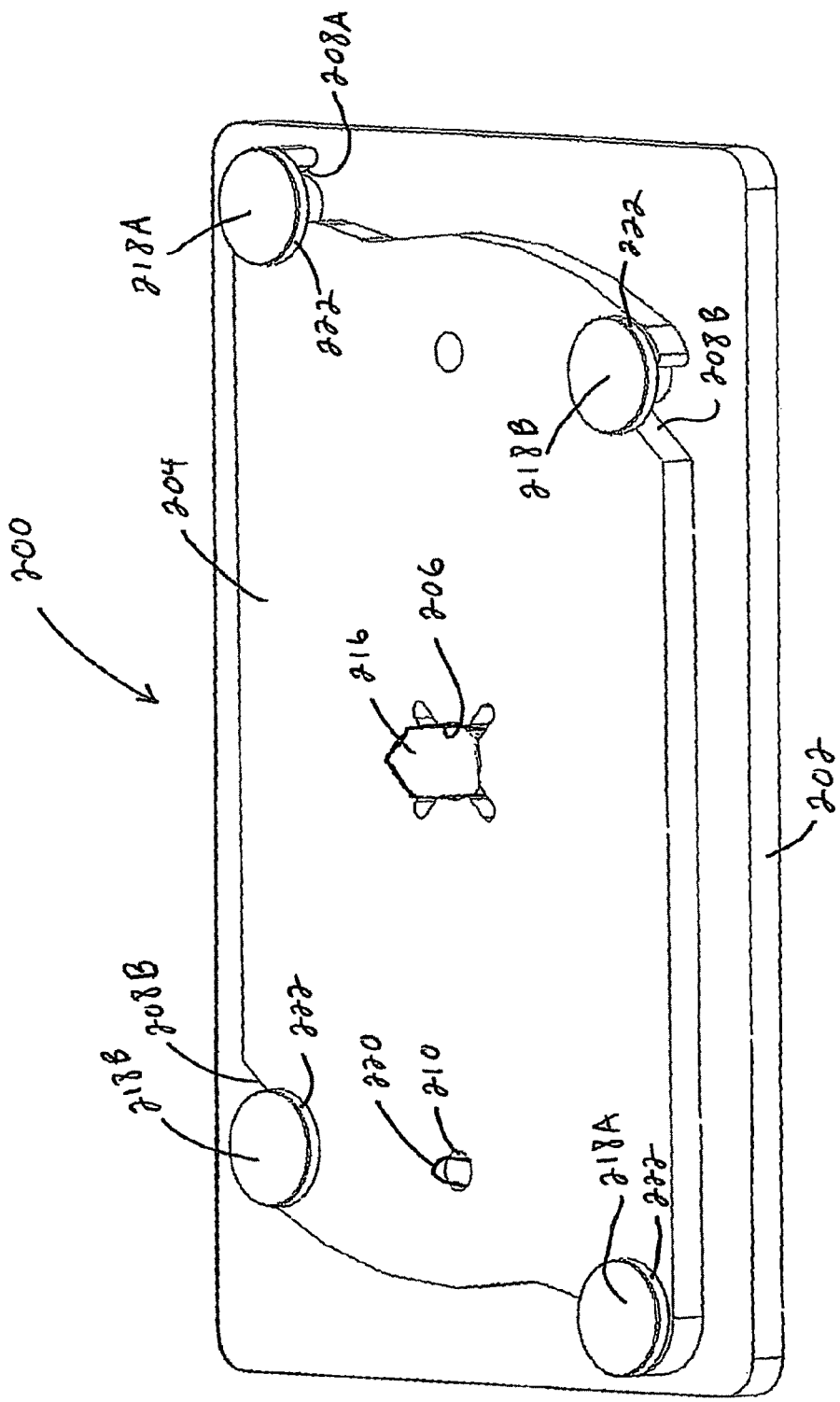
FIG. 4A is a perspective view of components of the seat mount illustrated by FIGS. 3 and 4 in a connected condition.

Referring to FIGS. 2-4, the illustrated quick release assembly 200 includes an upper plate 202 and a lower plate 204. Referring to FIGS. 4, and 4A, a central locating opening 206, a plurality of peripheral slots 208A, 208B, and an offset opening 210 that is offset from the central opening 206 are disposed in the lower plate 204. In the illustrated embodiment, the peripheral slots 208A are further away from the central opening 206 than the peripheral slots 208B. Referring to FIGS. 3 and 4A, a central locating pin 216, a plurality of peripheral fasteners 218A, 218B, and an offset retractable pin 220 (for example, a spring loaded pin) are fixed to the upper plate 202. In the illustrated embodiment, the peripheral fasteners 218A are further away from the central opening 206 than the peripheral fasteners 218B. The central locating pin 216, the plurality of peripheral fasteners 218A, 218B, and the offset retractable pin 220 are alignable with the central locating opening 206, the peripheral slots 208A, 208B, and the offset opening 210. The plate arrangements may be configured in a wide variety of forms, other than as shown. For example, any one or more of the pins or fasteners may be included on the lower plate 204, any one or more of the openings or slots may be included on the upper plate 202, and/or the positions of the openings, slots, pins, and fasteners may be other than as shown. Any number of slots or other openings can be included to accept any number of fasteners.

To connect the seat assembly 102 to the chassis 112, the user aligns the central locating pin 216 with the central locating opening 206. The user turns the seat assembly 102, such that heads 222 of the fasteners 218 clear an outer periphery 224 of the lower plate 204 and inserts the central locating pin 216 into the central opening 206. In the illustrated embodiment, the fasteners clear the outer periphery 224 of the lower plate due to the distance between the peripheral slots 208B being closer to the central opening 206. However, in other embodiments, the plate 204 is otherwise configured to accept the fasteners 218A, 218B. For example, cutouts with large portions that are sized to accept the head 222 of the fastener and smaller portions that are sized to fit more closely around the shaft of the fastener may be employed.

In one exemplary embodiment, the central locating pin 216 is longer than the fasteners 218, such that the central locating pin can be partially inserted into the central opening 206 before turning the seat assembly to cause the fasteners 218 to clear the outer periphery of the lower plate. When the central pin 216 is in the central opening 206 and the fasteners 218 are outside the lower plate, the offset retractable pin 220 is compressed by engagement with the lower plate 204. The user turns the seat assembly 102 in the opposite direction (as opposed to the direction the seat was turned to cause the fasteners to clear the outer periphery of the lower plate) to cause the fasteners 218 to enter the slots 208 and the retractable pin 220 to enter the offset opening 210. Referring to FIG. 4A, the heads 222 of the fasteners 218 engage the lower plate 204 to prevent the lower plate 204 from moving away from the upper plate 202. The retractable pin 220 engages the wall of the offset opening 210 to prevent rotation of the lower plate 204 relative to the upper plate. As such, the seat assembly 102 is securely mounted to the chassis 112 by the quick release assembly 200.

The central locating pin 216 and the central opening 206 may take a wide variety of different configurations. Any configuration capable of locating the upper plate 202 with respect to the lower plate 204 may be employed. In one exemplary embodiment, the locating pin 216 and the central opening 206 are configured to bring somewhat initially misaligned upper and lower plates 202, 204 into alignment. This can be accomplished in a variety of different ways. For example, the central locating pin 216 can be tapered as shown, the central opening 206 can be tapered, or both the pin 216 and opening can be tapered. Such a self alignment feature makes it easier for the user to assemble the seat assembly 102 with the chassis 112.

To disconnect the seat assembly 102 from the chassis 112, the user actuates a release mechanism 230 (schematically illustrated by FIG. 4). The release mechanism 230 retracts the offset pin 220 from the offset opening 210. The release mechanism may take a wide variety of different forms. Examples include, but are not limited to, handles, cables, cam arrangements, linkages, solenoids, and similar arrangements. Any structure or mechanism capable of retracting the pin can be used. Once the offset pin 220 is retracted, the user simply rotates the seat assembly 102 to move the fasteners 218 out of the slots 208 and lifts the seat assembly 102 off of the chassis 112.

Figure 2A:
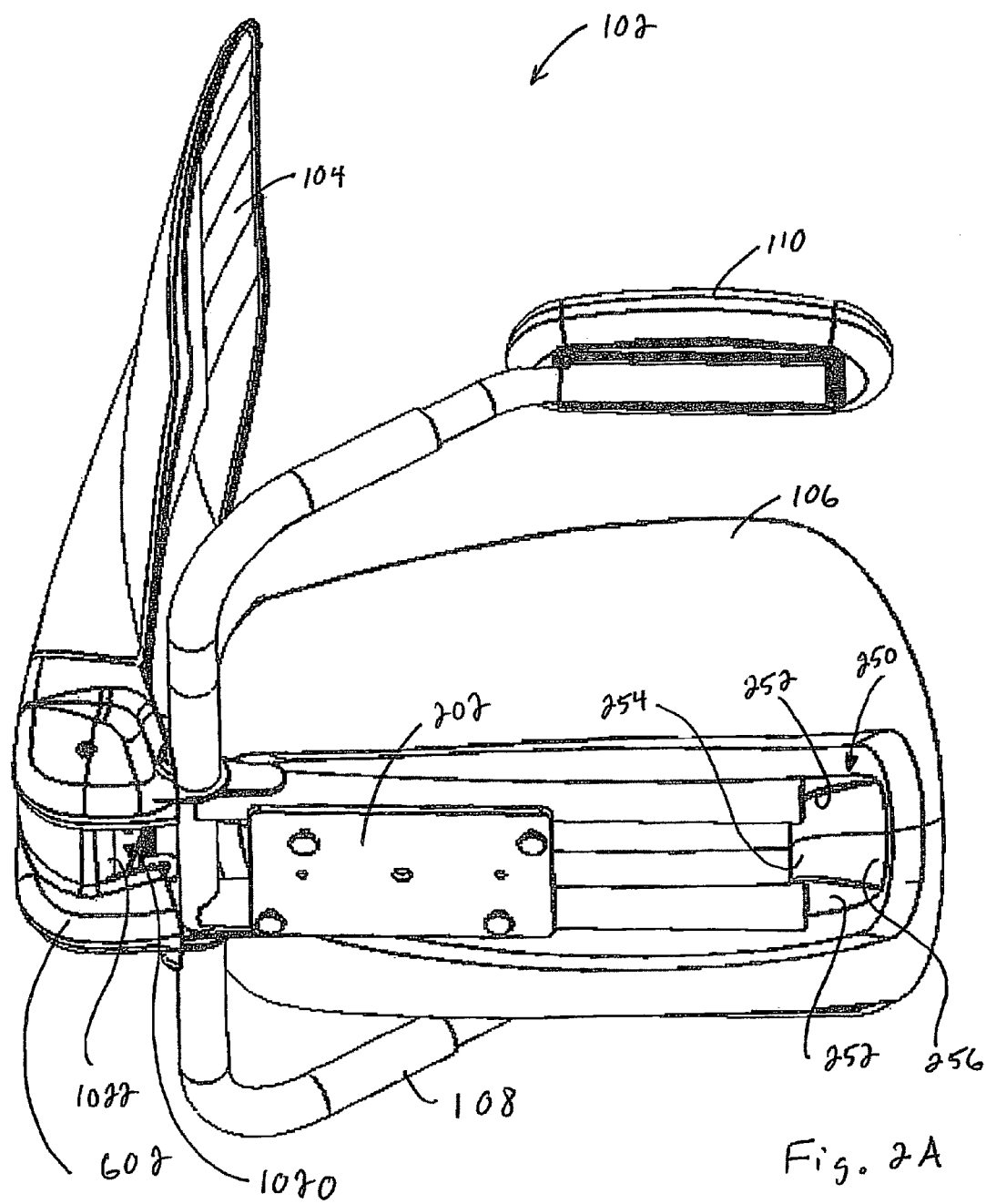
FIG. 2A is a perspective view of a seat assembly of the conveyance illustrated by FIGS. 1 and 2.

In one exemplary embodiment, the seat assembly 102 includes one or more handles to facilitate the rotation and lifting of the seat assembly 102 off of the chassis. Any type and number of handles may be used. Referring to FIG. 2A, a front handle 250 and a rear handle 1022 are included in the illustrated embodiment. The front handle and rear handles 250, 1022 may take a wide variety of different forms. In the illustrated embodiment, the front handle 250 is integrally molded with the seat bottom 106. The front handle 250 comprises side walls 252 and sloping front and rear surface 254, 256 to form a recess that is sized to accept a user's hand. The illustrated rear handle 1022 comprises a tube with a shroud 602 disposed around it. The shroud 602 includes a cutout 1020 (see FIG. 10A) to provide access to the rear handle 1022.

The quick release assembly 200 can be coupled to the seat assembly 102 and the chassis 112 in a wide variety of different ways. For example, any manner of connecting the upper plate 202 to the seat assembly 102 and connecting the lower plate 204 to the chassis 112 can be employed. Referring to FIG. 2, the upper plate 202 is fixed to the seat assembly 102 in the illustrated embodiment. A seat support member 316 is disposed on central frame member 302 and includes a receiving portion 324 having one or more apertures therein. An inner seat support member 318, such as a tube, is fixed to the lower plate 204 (see FIG. 3). The receiving portion 324 telescopically receives the inner seat support member 318, therein for adjusting and fixing the floor-to-seat height of the wheelchair. The floor to seat height of the wheelchair is adjusted and fixed through the use of a plurality of apertures 320 in inner seat support member 318, which are aligned with the apertures 325 in the receiving portion 324. A suitable fastener is then used through the appropriately aligned apertures to fix or maintain them in position. The fastener may be of an easily removable type not requiring the use of tools.

Referring to FIG. 4B, in an exemplary embodiment an electrical connection 400 between the joystick 124 and motors and/or circuitry that controls motors that drive the drive wheels 114, 116 is made by the quick release assembly 200 upon coupling of the seat assembly 102 to the chassis 112. The quick release assembly that provides an electrical connection 400 between the joystick 124 and motors and/or circuitry that controls motors that drive the drive wheels 114, 116 may be used with the illustrated seat 102 and chassis 112 or any other wheelchair seat and chassis. As such, coupling of the seat assembly 102 to the chassis 112 automatically electrically connects the joystick 124 to the chassis 112. This may be accomplished in a wide variety of different ways. For example, first and second connector components 402, 404 may be arranged to mate upon coupling of the quick release assembly 200. The first and second connector components 402, 404 may be configured to mate upon coupling of the quick release assembly 200 in a wide variety of different ways. For example, the first connector component 402 may be provided on the upper plate 202 and the second connector component 404 may be provided on the second plate 204, such that the first ands second connector components 402, 404 mate upon connection of the seat assembly 102 with the chassis. For example, one or more of the central opening 206/central pin 216, slots 208/fasteners 218, and offset opening 210/retractable pin 220 can include or be replaced by the electrical connection 400 or the electrical connection may be provided at another area of the quick release assembly. In the example illustrated by FIG. 4B, the central pin 216 is replaced by or includes the connector component 402 and the central opening 206 is replaced by or includes the connector component 404.

Figure 5:
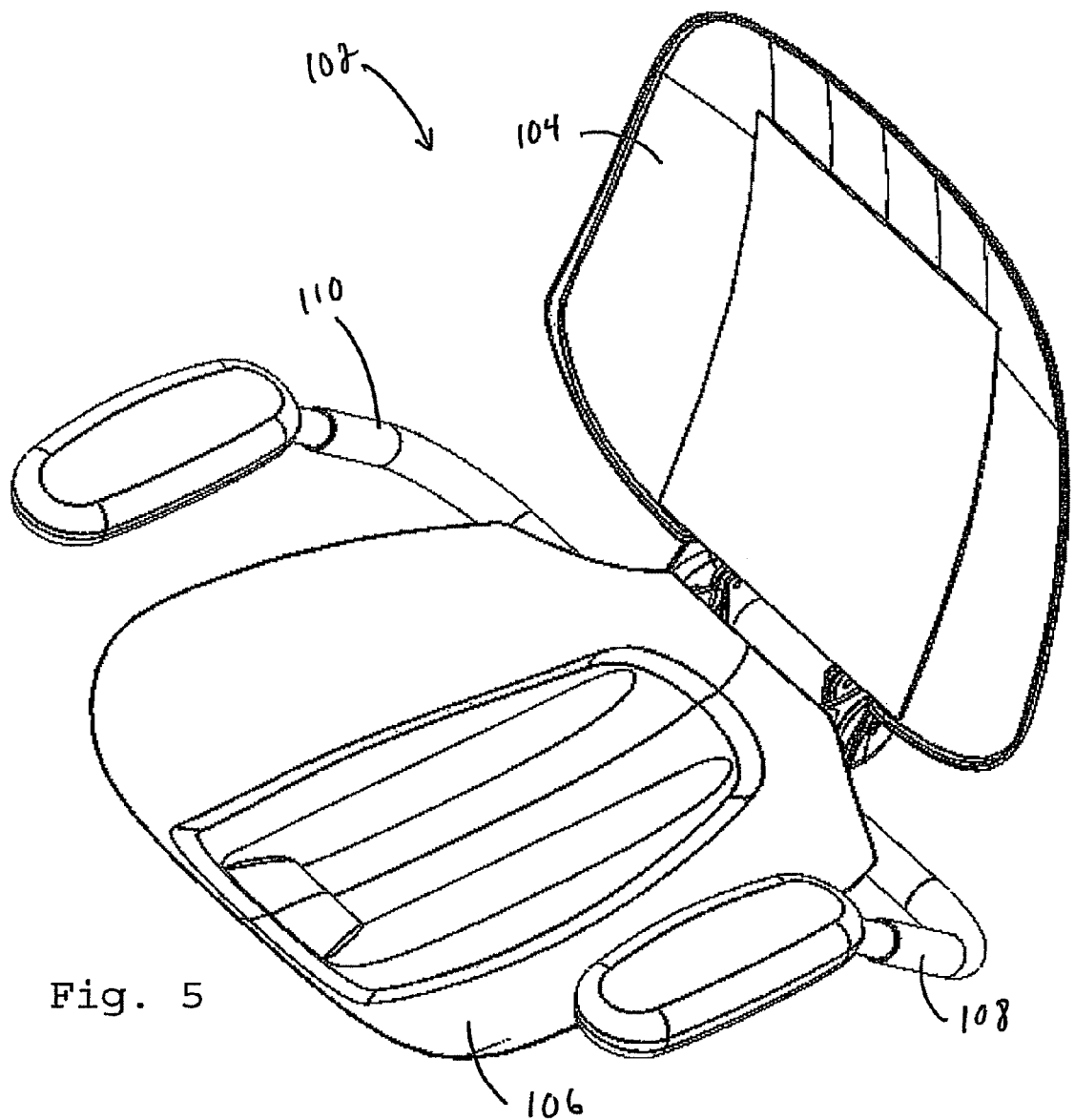
FIG. 5 is a perspective view of an exemplary embodiment of a seat assembly.
Figure 5D:
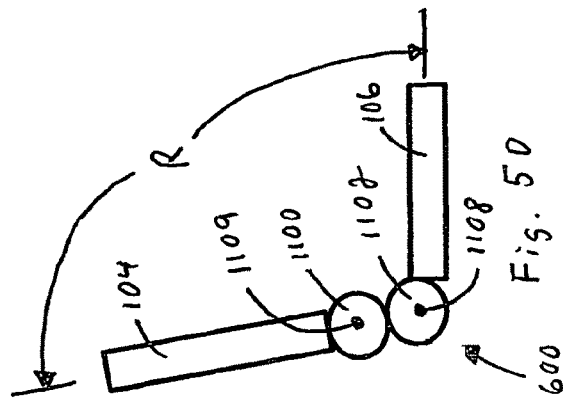
FIG. 5D is a view that shows the seat back returned from the position shown in FIG. 5C to the position shown in FIG. 5B.
Figure 5C:
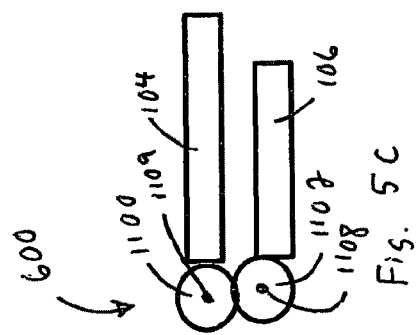
FIG. 5C is a view similar to FIG. 5B with the seat back folded from the position shown in FIG. 5B.

FIG. 5 is a perspective view of an exemplary seat assembly 102 and FIGS. 5A-5D are schematic illustrations of the exemplary seat assembly. In an exemplary embodiment, the seat assembly 102 has a seat adjustment and folding assembly 600 (see FIG. 5A and FIG. 6). The schematic representations of FIGS. 5A-5D illustrate that the seat adjustment and folding assembly 600 can take a wide variety of different forms. The compact and unitary form shown in FIG. 6 is one of the many forms that the seat adjustment and folding assembly 600 may take. In the embodiment illustrated by FIG. 6, the seat back 104, seat bottom 106, and armrests assemblies 108 and 110 are all adjustably mounted to the seat adjustment and folding assembly 600. However, in other embodiments, not all of the seat back 104, seat bottom 106, and armrests assemblies 108 and 110 are mounted to or adjustably mounted to the seat adjustment and folding assembly 600. In the embodiment illustrated by FIGS. 5 and 6, the upper plate 402 of the quick release assembly 200 and a shroud 602 are also connected to the seat adjustment and folding assembly 600. The upper plate 402 is illustrated as being fixedly connected to the seat adjustment and folding assembly 600. However, the upper plate 402 may be adjustably coupled to the seat adjustment and folding assembly 600. For example, the upper plate 402 may be adjustably coupled to the seat adjustment and folding assembly 600 to allow fore/aft, side to side, tilting and/or rotational positioning of the seat assembly 102 with respect to the chassis 112.

Figure 7:
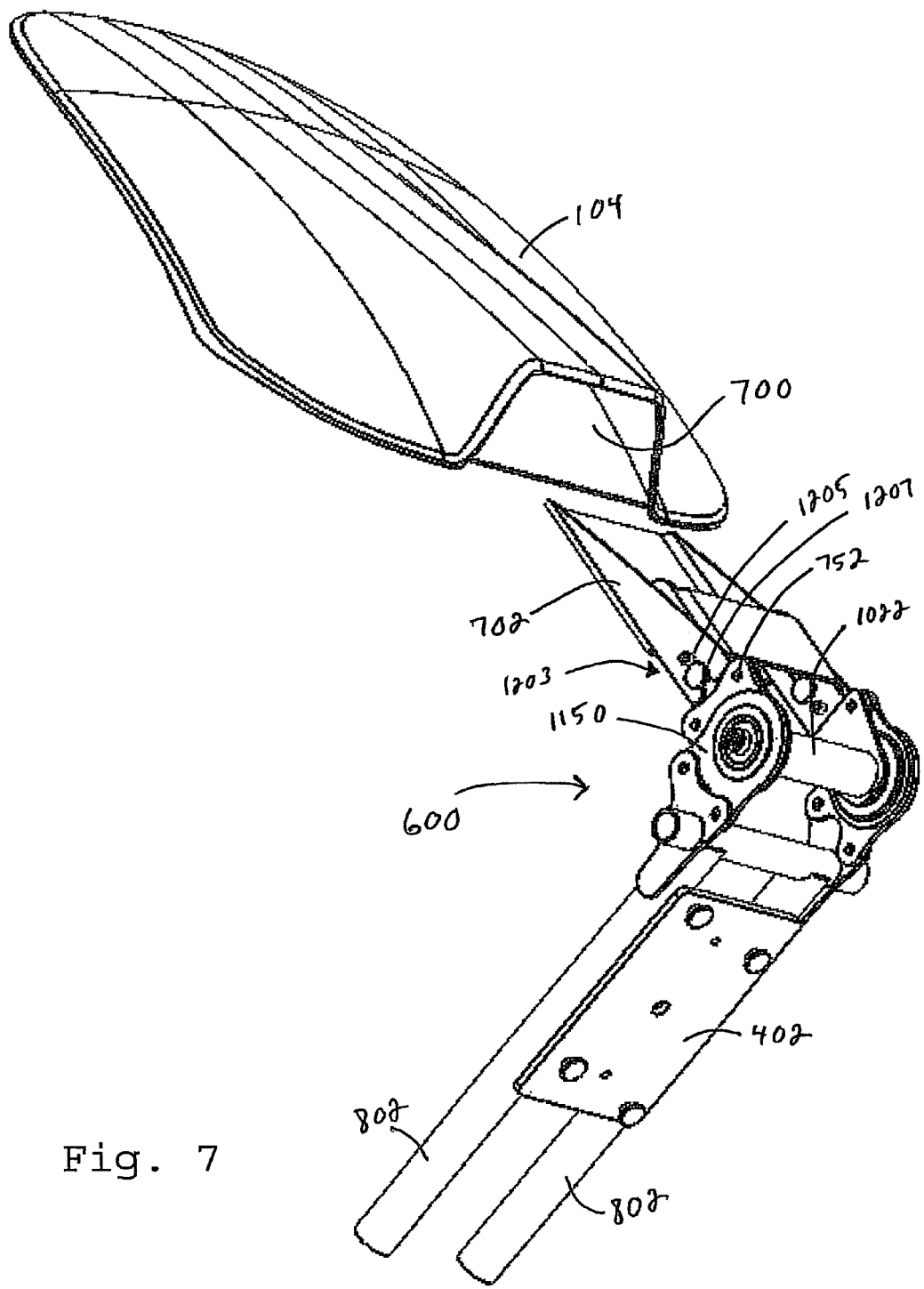
FIG. 7 is an exploded perspective view of an exemplary embodiment of a seat adjustment and folding assembly and an exemplary embodiment of a seat back.

FIG. 7 is an exploded perspective view of the seat adjustment and folding assembly 600 and the seat back 104. The seat back 104 can be connected to the seat adjustment and folding assembly 600 in a wide variety of different ways. In the illustrated embodiment, the seat back 104 includes a pocket 700 that accepts a back support member 702 of the seat adjustment and folding assembly 600. In one embodiment, the back support member 702 may be fixedly connected in the pocket 700. In another embodiment, the back support member 702 is adjustably coupled in the pocket 700. For example, the pocket 700 may telescopically receive the back support member 702, therein for adjusting and fixing the height of the seat back. 104 relative to the seat bottom 106. A wide variety of different coupling arrangements can be employed to releasably fix the position of the seat back 106 on the back support member 702. The seat back height may be adjusted and fixed through the use of a plurality of apertures (not shown) in the back support member 702, which are aligned with the apertures (not shown) in the pocket 702 in a manner similar to the coupling of the seat support members 316, 318. A suitable fastener is then used through the appropriately aligned apertures to fix or maintain them in position. The fastener may be of an easily removable type not requiring the use of tools.

Figure 8:
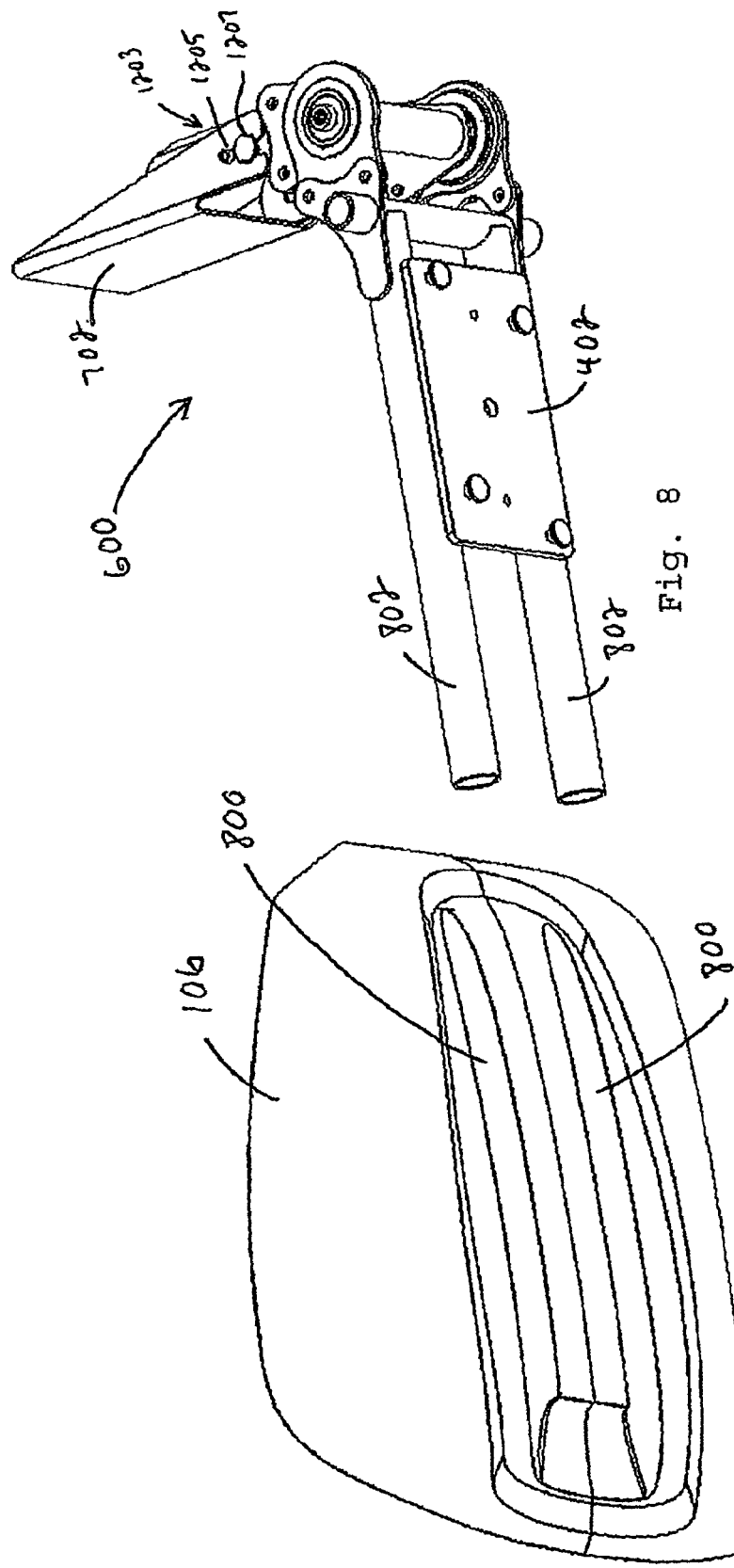
FIG. 8 is an exploded perspective view of the seat adjustment and folding assembly and an exemplary embodiment of a seat bottom.

FIG. 8 is an exploded perspective view of the seat adjustment and folding assembly 600 and the seat bottom 106. The seat bottom 106 can be connected to the seat adjustment and folding assembly 600 in a wide variety of different ways. In the illustrated embodiment, the seat bottom 106 includes a pair of recesses 800 or grooves that accept a pair of bottom support tubes 802 of the seat adjustment and folding assembly 600. The illustrated bottom support tubes 802 are circular in cross-section, but the bottom support tubes 802 may have any shape. For example, the bottom support tubes 802 may be square or rectangular in cross-section. Further, the tubes may be replaced with solid members or plates. The recesses 800 and bottom support tubes 802 can be replaced with any telescoping arrangement. For example, the recesses 800 or grooves can be replaced with a pocket or pockets that accept the tubes 802. In another embodiment, the bottom support tubes 802 are adjustably coupled in the recesses 800. For example, the recesses 800 may slidably receive the bottom support tubes 802, therein for adjusting and fixing the depth of the seat bottom 106 relative to the seat back 104 (See FIGS. 33A, 33B, 34A, and 34B). A wide variety of different coupling arrangements can be employed to releasably fix the position of the seat bottom 106 on the bottom support tubes 802. The seat back depth may be adjusted and fixed through the use of a plurality of apertures (not shown) in the support tubes 802, which are aligned with the apertures (not shown) in the seat bottom 106 in a manner similar to the coupling of the seat support members 316, 318. A suitable fastener can then be inserted through the appropriately aligned apertures to fix or maintain them in position. The fastener may be of an easily removable type not requiring the use of tools. In another embodiment, the seat bottom 106 may be fixedly connected to the bottom support tubes 802.

Figure 9:
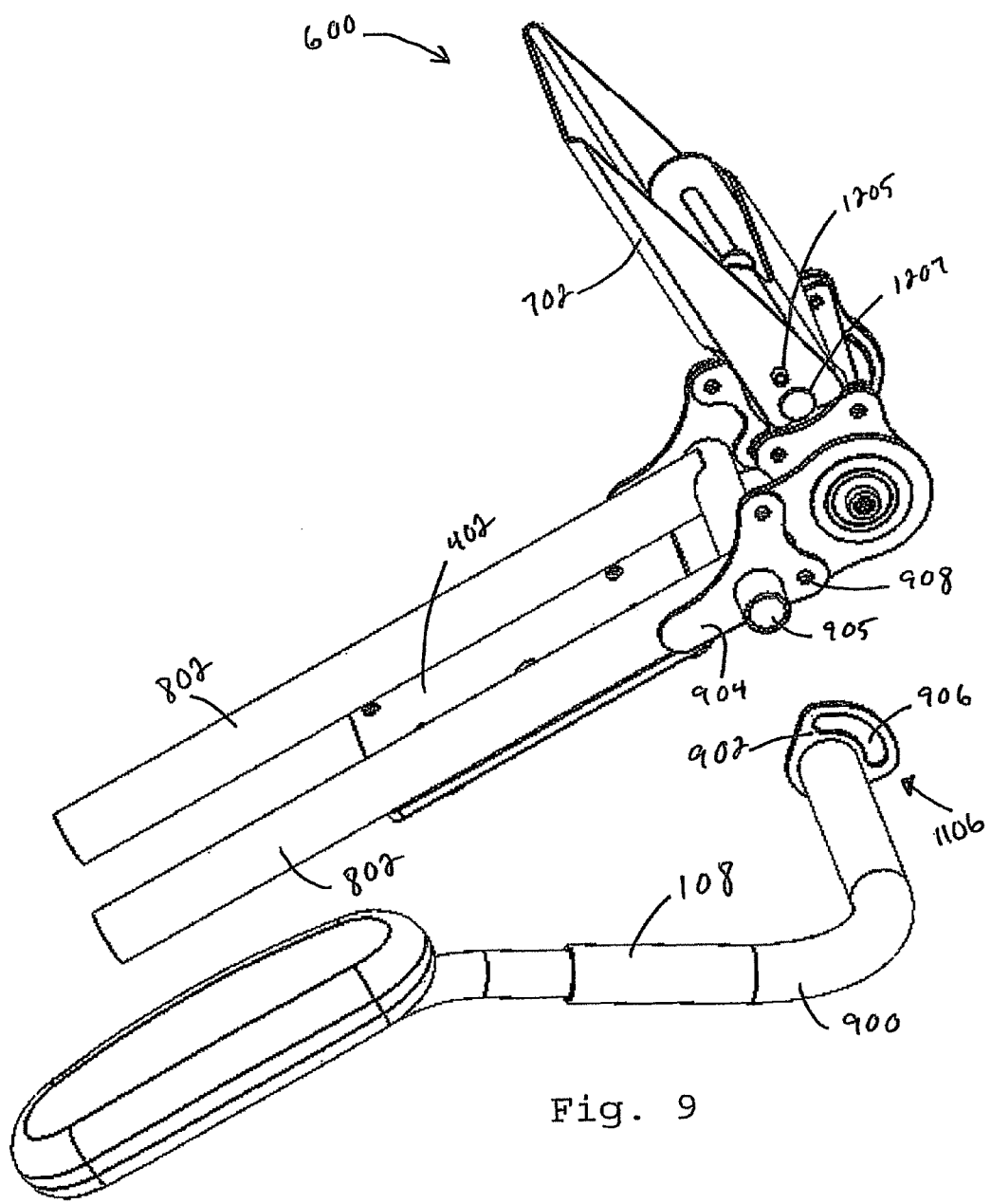
FIG. 9 is an exploded perspective view of the seat adjustment and folding assembly and an exemplary embodiment of a seat armrest assembly.

FIG. 9 is an exploded perspective view of the seat adjustment and folding assembly 600 and the armrest assembly 108. In one exemplary embodiment, the armrest assembly 110 is a mirror image of the armrest 108 and the armrest assembly 110 is coupled to the folding assembly 600 in the same manner as the armrest assembly 108 (see FIG. 5). As such, only the coupling of the armrest assembly 108 to the folding assembly 600 is described in detail herein. The armrest assembly 108 can be connected to the seat adjustment and folding assembly 600 in a wide variety of different ways. In the illustrated embodiment, the armrest assembly 108 includes a support tube 900 that is fixed to a first mounting bracket 902. The illustrated support tube 900 is circular in cross-section, but the support tube can have any shape. For example, the support tube 900 may be elliptical, square, or rectangular in shape. Further, the support tube 900 may be replaced with a non-tubular structure, such as a plate. The seat adjustment and folding assembly 600 includes a tube stub 905 that is fixed to a second mounting bracket 904. In the illustrated embodiment, the support tube 900 receives the tube stub 905, such that the support tube 900 is rotatable on the tube stub 905. The first mounting bracket 902 includes a slot 906 that is in alignment with a fastener accepting hole 908. As such, the armrest 108 is pivotable on the seat adjustment and folding assembly 600. In one exemplary embodiment, a suitable fastener, such as a screw or a quick release fastener is placed through the slot and in the fastener accepting hole 908 and fixes the first bracket 902 to the second bracket 904 to fix the position of the armrest assembly 108 relative to the seat bottom 106. A wide variety of different coupling arrangements can be employed to releasably fix the position of the armrest assembly 108 on the tube stub 905. In another embodiment, the armrest assembly 108 may be fixedly connected to the seat adjustment and folding assembly 600.

Figure 10:
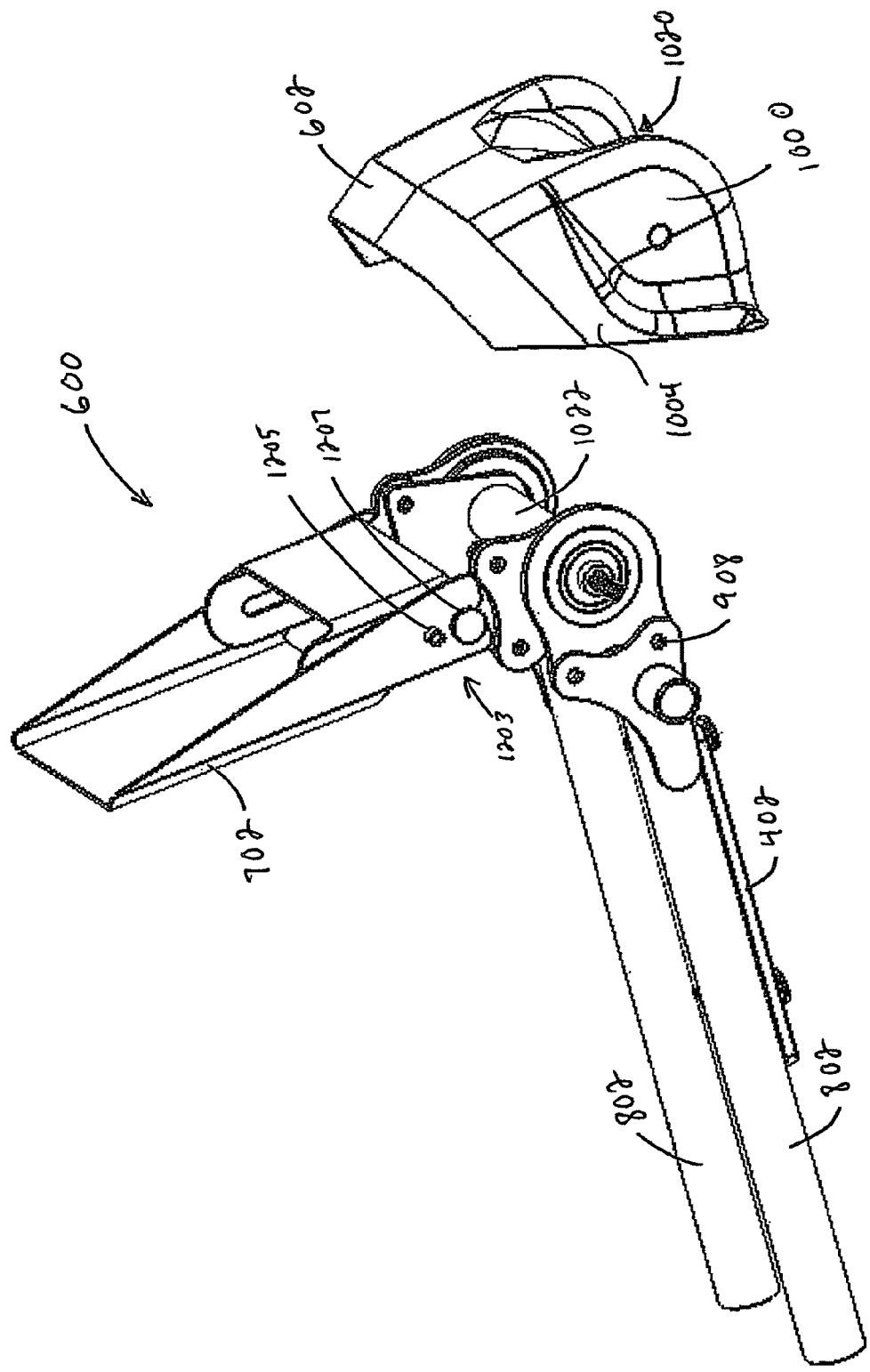
FIG. 10 is an exploded perspective view of the seat adjustment and folding assembly and an exemplary embodiment of a shroud.
Figure 10A:
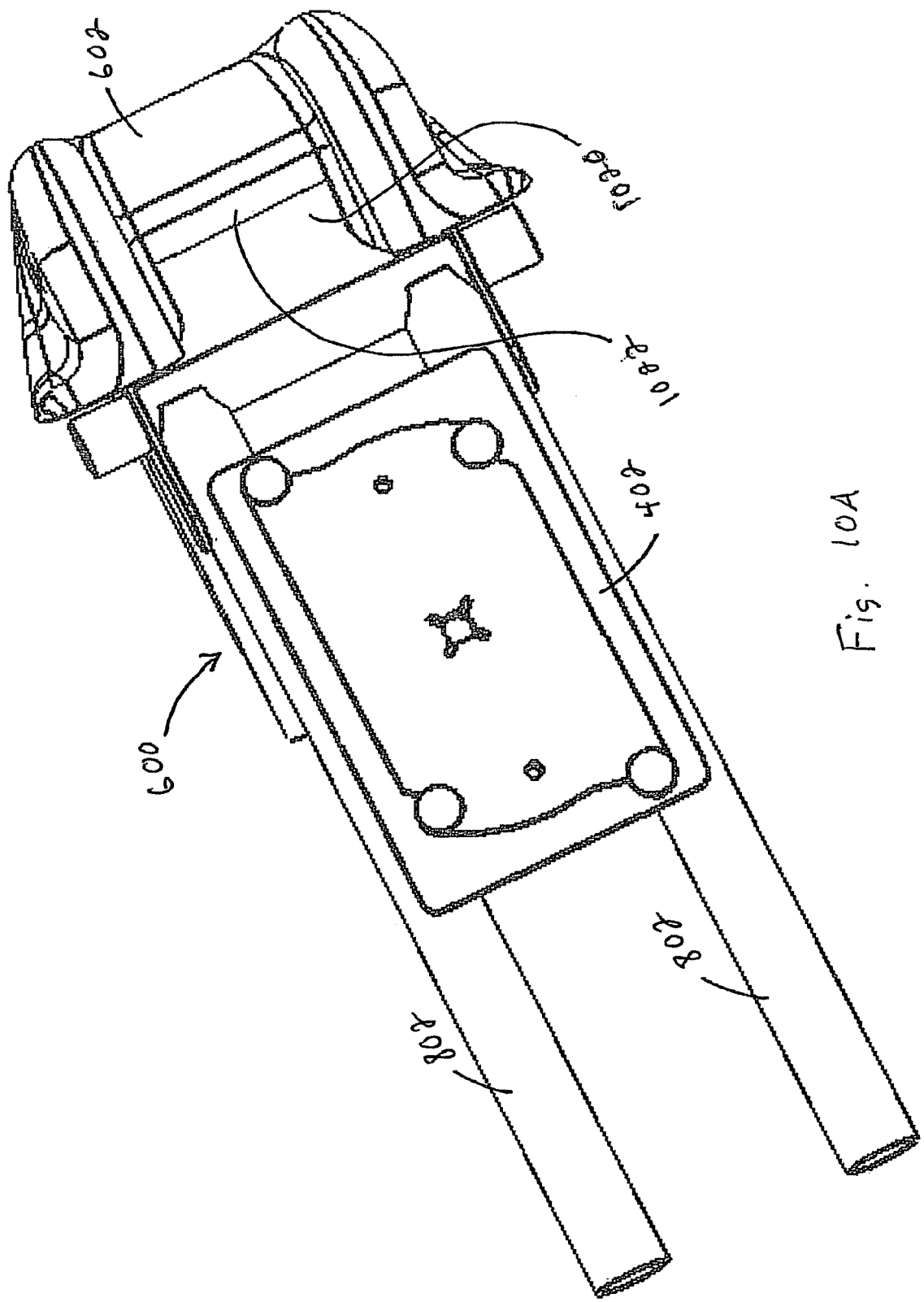
FIG. 10A is a perspective view of the seat adjustment and folding assembly and an exemplary embodiment of a shroud.

FIG. 10 is an exploded perspective view of the seat adjustment and folding assembly 600 and the shroud 602. The shroud 602 may be connected to the seat adjustment and folding assembly 600 in any suitable manner. The shroud 602 covers portions of the seat adjustment and folding assembly 600 that are not covered by the seat back 104 or the seat bottom 106. The illustrated shroud 602 includes recessed side walls 1000. The recessed side walls 1000 may be dimensioned to accept a recline mechanism control knob 1002 (see FIG. 11), such that the recline mechanism control knob 1002 optionally does not extend past or substantially past a side 1004 of the shroud 602. Referring to FIG. 10A, the shroud 602 includes a cutout 1020. The cutout 1020 provides access to a handle 1022 of the seat adjustment and folding assembly 600. The handle 1022 allows the seat assembly 102 to be lifted off of the chassis. Further, the handle 1022 allows the seat assembly 102 to be easily carried (like a suitcase) when the seat assembly 102 is folded (see FIG. 20A).

Figure 11A:
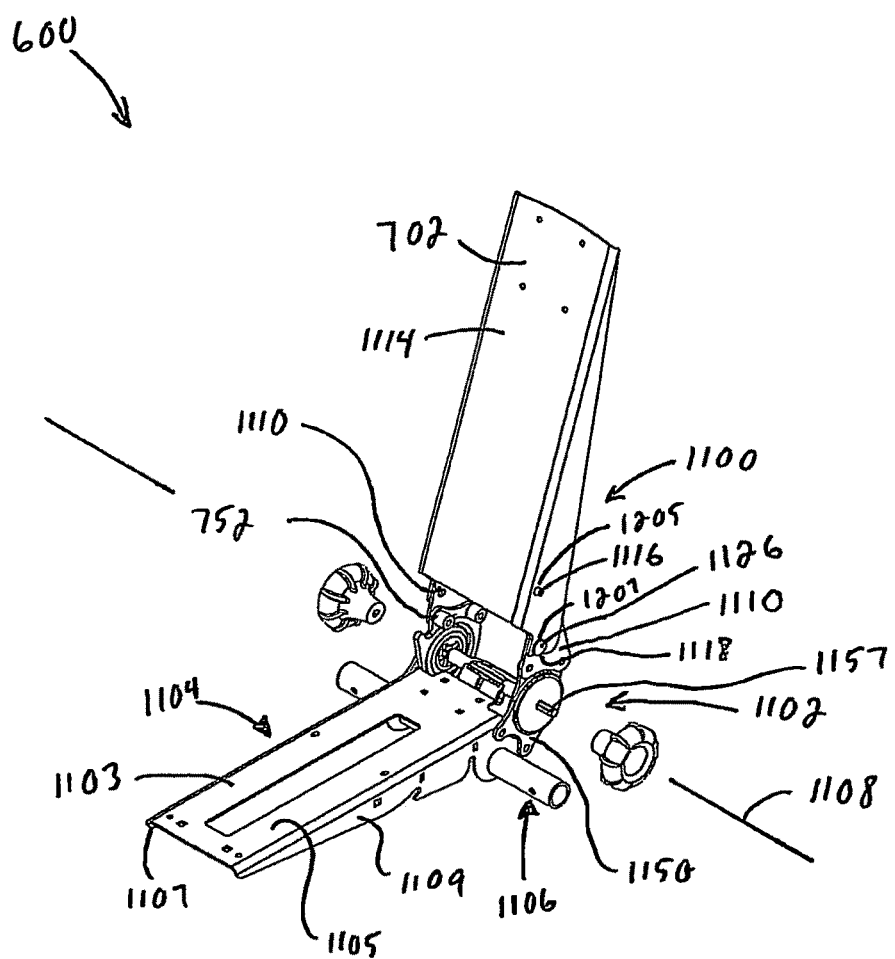
FIG. 11A is a perspective view of another exemplary embodiment of a seat adjustment and folding assembly.
Figure 12:
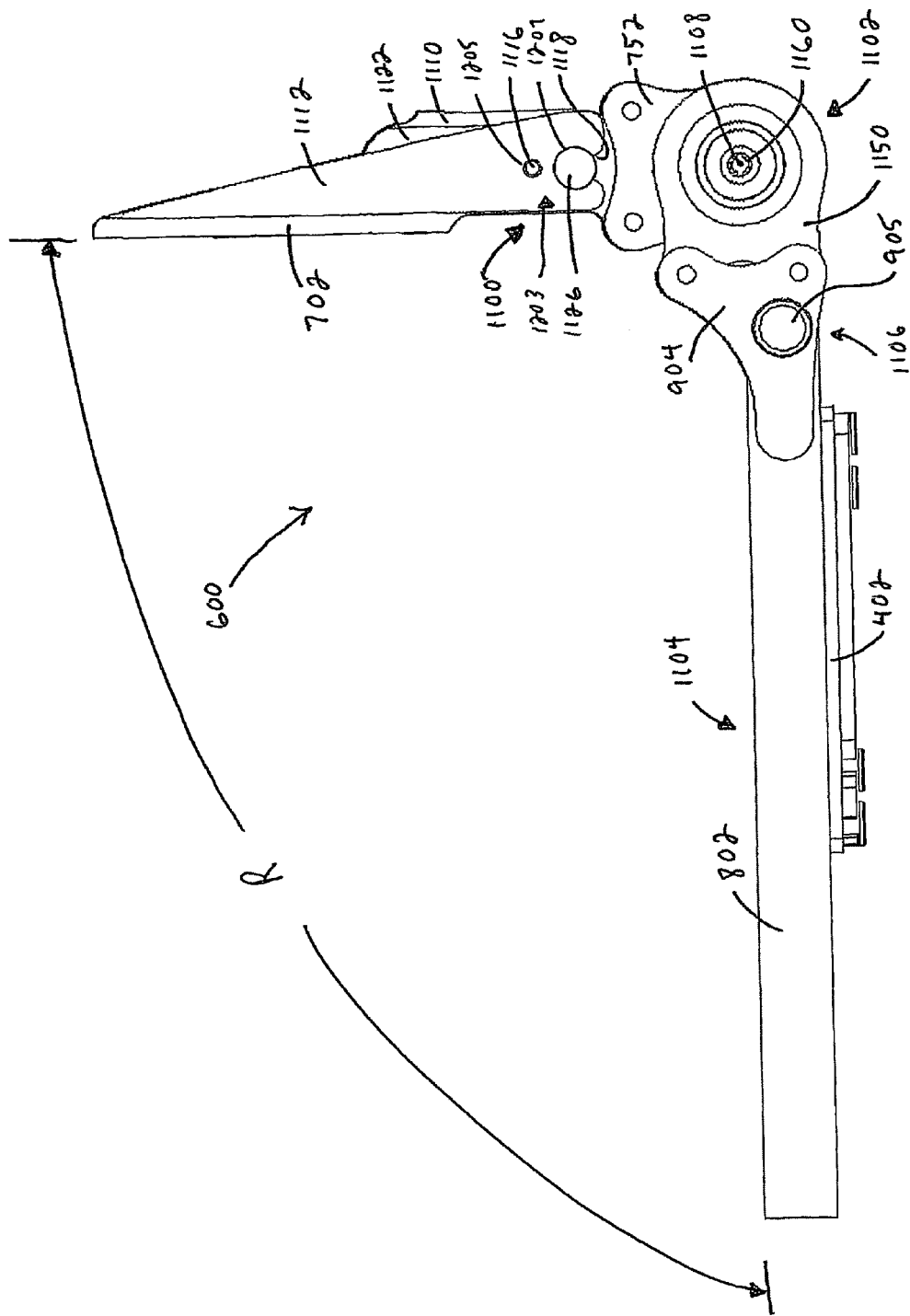
FIG. 12 is a side view of the seat adjustment and folding assembly of FIG. 11.
Figure 13:
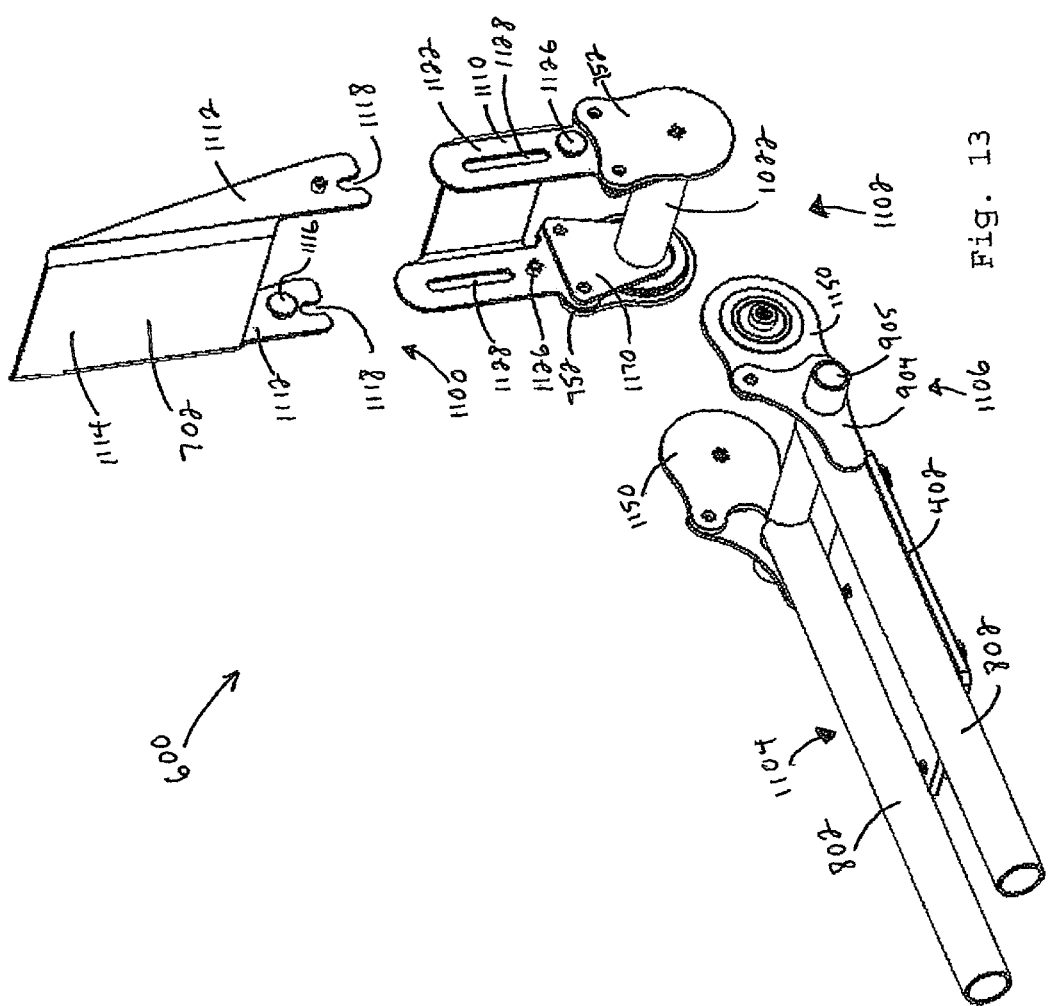
FIG. 13 is an exploded perspective view of the seat adjustment and folding assembly of FIG. 11.

FIGS. 11, 12, and 13 are perspective, side, and exploded views of the seat adjustment and folding assembly 600. The seat adjustment and folding assembly 600 may include one or more of a seat back folding mechanism 1100, a seat back recline mechanism 1102, a seat bottom mounting assembly 1104, and armrest mounting assembly 1106.

Referring to FIGS. 5A-5D, in one exemplary embodiment, seat adjustment and folding assembly 600 allows for adjusting a recline angle R between the seat back 104 and a seat bottom 106 and for folding the seat back 104 toward the seat bottom 106. For example, assembly 600 may include a seat back recline mechanism 1102, and a seat back folding mechanism 1100. The seat back recline mechanism 1102 and the seat back folding mechanism 1100 can take a wide variety of different forms.

In one exemplary embodiment, the seat back recline mechanism 1102 and the seat back folding mechanism 1100 couple the seat back 104 to the seat bottom 106. For example, the seat back recline mechanism 1102 and the seat back folding mechanism 1100 may be connected to a seat back support 702 for supporting the seat back 104 and a seat bottom support 1103 for supporting the seat bottom. Or, the seat back recline mechanism 1102 and the seat back folding mechanism 1100 may be connected directly to the seat back 104 and the seat bottom 106.

Figure 5B:
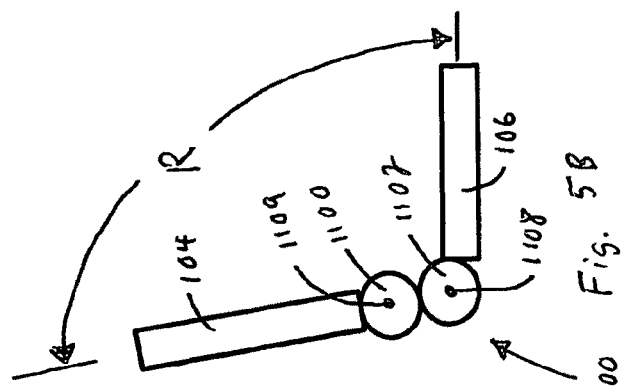
FIG. 5B is a view similar to FIG. 5A with a seat back reclined from the position shown in FIG. 5A.
Figure 5A:
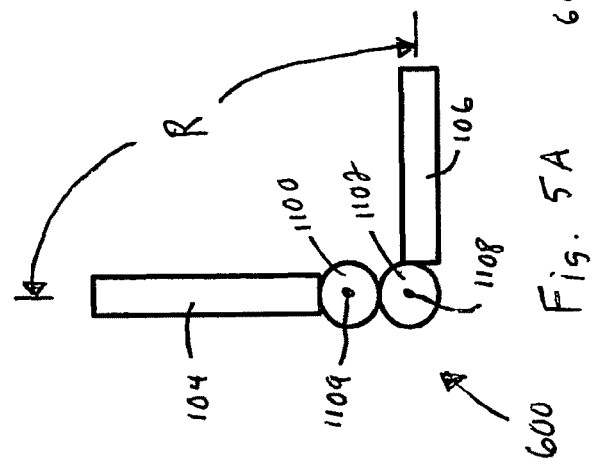
FIG. 5A is a schematic illustration of an exemplary embodiment of a seat with a seat adjustment and folding mechanism.
Figure 6:
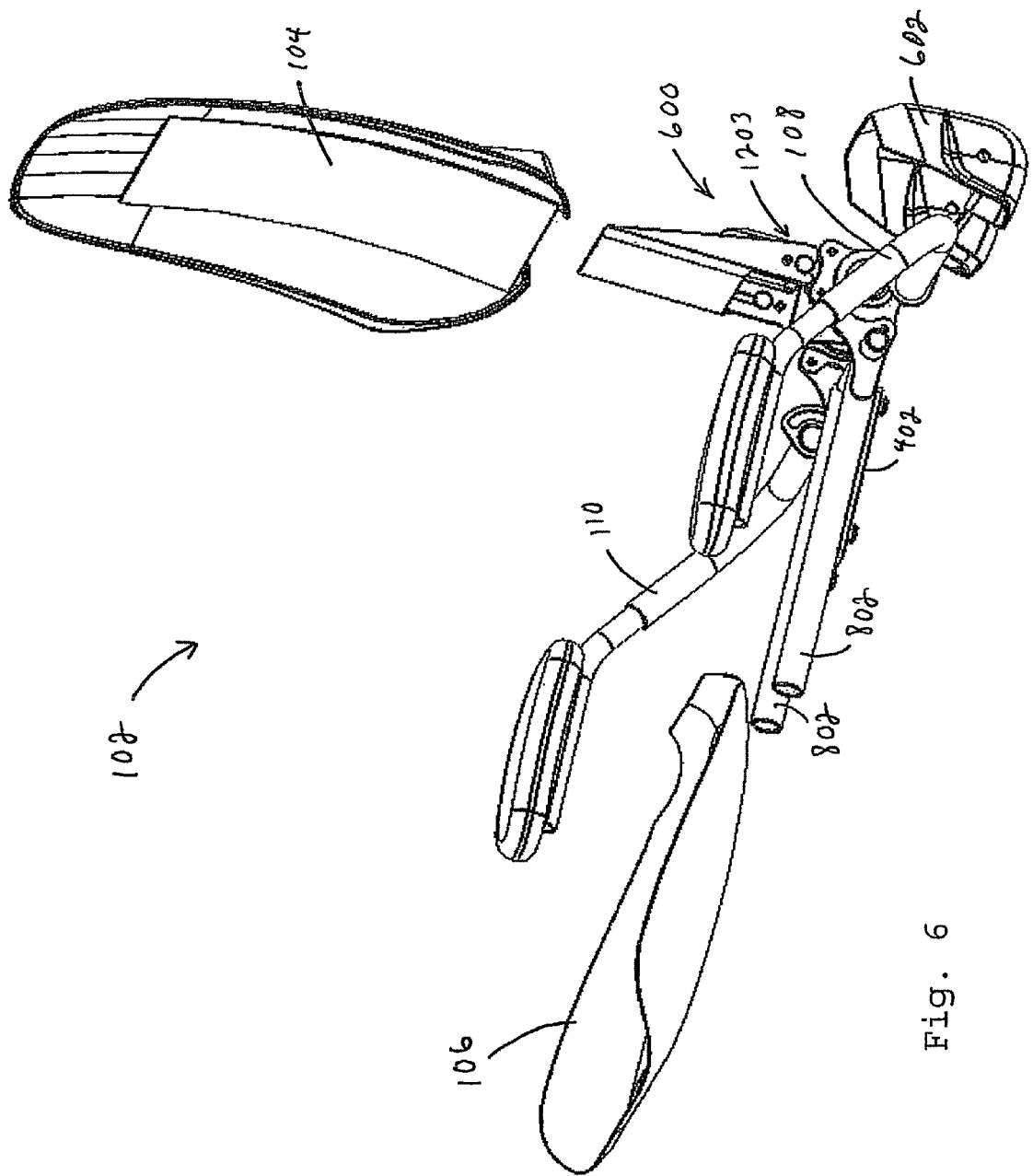
FIG. 6 is an exploded perspective view of the seat assembly illustrated by FIG. 5.

In an exemplary embodiment, the seat adjustment and folding assembly 600 the seat back 104 can be adjusted to a desired recline angle R at a seating position selected by the user (See FIG. 5B). The seat back can be folded down from the seating position (See FIG. 5B) to a folded position (See FIG. 5C) and back up to the seating position (See FIG. 5D), without disturbing a recline angle R between the seat back 104 and the seat bottom 106 that is set by the user. For example, the seat back recline mechanism 1102 may facilitate pivoting and setting the position of the seat back 104 with respect to the seat bottom 106 at a user selected recline angle R. The seat folding mechanism 1100 may facilitate pivoting of the seat back 104 with respect to the seat bottom to fold the seat back from the seating position to the folded position. The seat back folding mechanism 1100 may facilitate pivoting of the seat back 104 with respect to the seat bottom 106 such that the seat back is returned to the seating position at the user selected recline angle R unless the seat back recline mechanism 1102 is adjusted. That is, the user selected recline angle R is not disturbed by folding the seat back 104 from the seating position, to the folded position 106, and back to the seating position. This allows a user to easily adjust the recline angle R, fold seat back toward the seat bottom, and back to the user's selected recline angle R.

The seat adjustment and folding assembly 600 can be configured to allow the seat back 104 to be folded down from the seating position (See FIG. 5) to the folded position (See FIG. 20) and back up to the seating position, without disturbing a recline angle R in a wide variety of different ways. In the example illustrated by FIGS. 5A-5D, by separating a recline axis 1108 from a folding axis 1109, the seat can be folded down from a seating position to a folded position and back up to the seating position, without disturbing the recline angle R set by the user. In one exemplary embodiment, the seat back recline mechanism 1102 facilitates pivoting of the seat back 104 and/or seat back support 702 (when included) about a first or recline axis 1108 with respect to the seat bottom 106 and/or seat bottom support 1103 (when included) to allow adjustment and setting of the recline angle R. In this embodiment, the seat folding mechanism 1100 facilitates pivoting of the seat back 104 and/or seat back support 702 (when included) about a second or folding axis 1109 with respect to the seat bottom 106 and/or seat bottom support (when included) to allow folding of the seat back 104 toward the seat bottom 106.

In one exemplary embodiment, the seat back folding mechanism 1100 comprises a lockable pivotable connection 1203 between the seat back 104 and the recline mechanism 1102 (See schematic illustrations of FIGS. 5E-5G). The lockable pivotable connection can take a wide variety of different forms. In one embodiment, the lockable pivotable connection 1203 includes a pivotable connection 1205 and a locking arrangement 1207. The locking arrangement 1207 sets the position of the seat back 104 with respect to the recline mechanism when the locking arrangement 1207 is locked (See FIGS. 5E and 5F). In the exemplary embodiment, the seat back 104 can be folded down when the locking arrangement is unlocked (See FIG. 5G). In one exemplary embodiment, the lockable pivotable connection 1203 is unlocked by lifting the seat back 104 support with respect to the seat bottom 106 as indicated by arrow 1700. However, the lockable pivotable connection 1203 may be configured to be unlocked in a wide variety of different ways.

The seat back folding mechanism 1100 can take a wide variety of different forms. In an exemplary embodiment, the seat back folding mechanism 1100 may allow the seat back 104 to be folded along an axis that is elevated from a recline axis 1108 of the seat back. This can be accomplished in a wide variety of different ways. For example, any mechanism that provides a pivotable connection that is selectively lockable above a recline axis can be used. In the embodiment illustrated by FIGS. 11-13, the seat back folding mechanism 1100 includes the back support member 702 and a base member 1110. The illustrated back support member 702 includes a pair of spaced side walls 1112 that are connected by a center wall 1114. However, the back support member may take a wide variety of different forms. For example, the back support member 702 may be made from any combination of tubes, plates and other members. In one exemplary embodiment, the back support member 702 is constructed from tubes having square or rectangular cross-sections and/or flat or bent sheet material.

Figure 16:
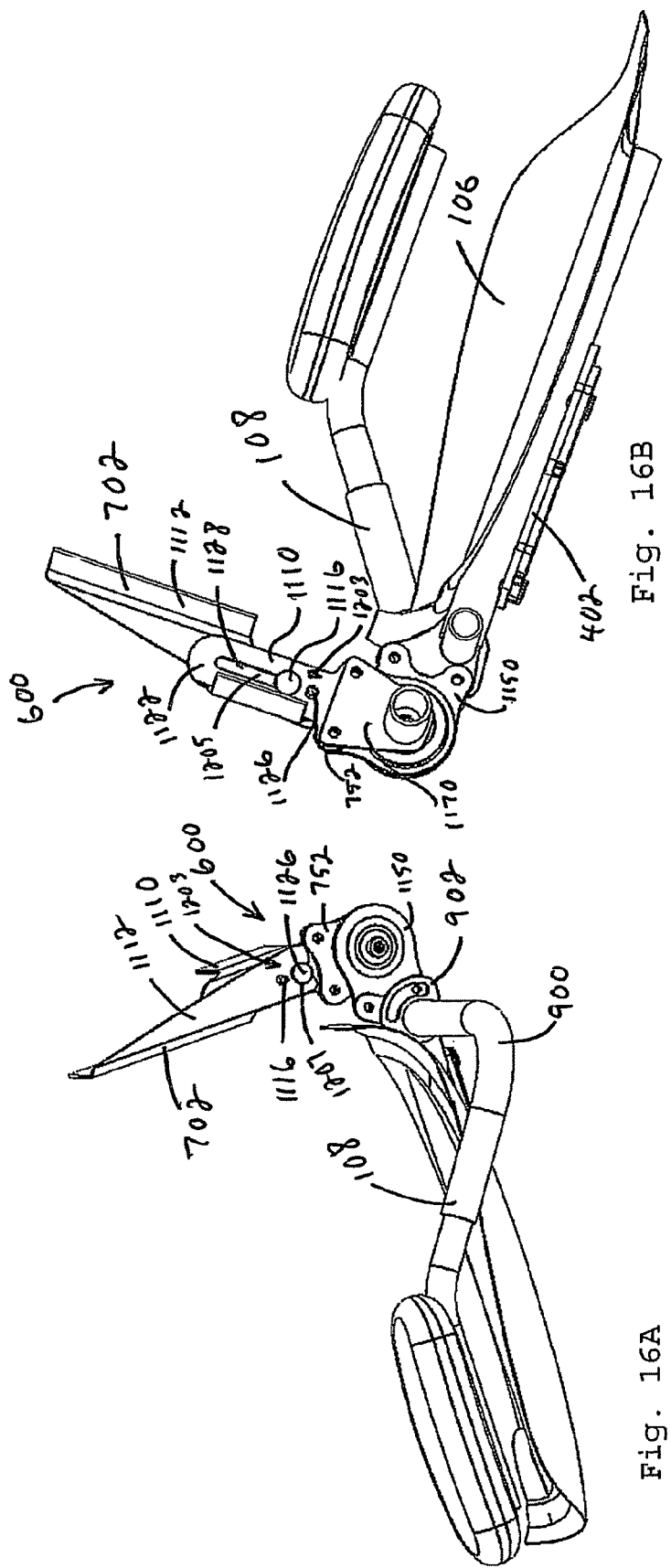
FIG. 16A is a sectioned perspective view of the seat assembly with the seat back removed.
FIG. 16B is a sectioned perspective view of the seat assembly with the seat back removed.

In the illustrated embodiment, fasteners 1116 are connected to the side walls 1112. The side walls 1112 also include open ended slots 1118. The base member 1110 includes a pair of spaced side walls 1122. Fasteners 1126 are connected to the side walls 1122. The side walls 1122 also include slots 1128. In the illustrated embodiment, the side walls 1112 of the back support member 702 are disposed on the outside of the side walls 1122 of the base member 1110. However, the side walls 1112 of the back support member 702 may be disposed on the inside of the side walls 1122 of the base member 1110. Referring to FIGS. 11, 16A, and 16B, the fasteners 1116 are disposed in the slots 1128 to couple the back support member 702 to the base member 1110.

When the back support member 702 is in a locked position (FIGS. 11, 12, 16A, 16B), the fasteners 1126 are disposed in the open ended slots 1118 to fix the position of the back support member 702 relative to the base member 1110. In other embodiments, the fasteners 1126 and open ended slots are replaced with other releasable locking arrangements. Similarly, in other embodiments, the slots 1128 and fasteners 1116 can be replaced with other arrangements that allow for rotation of the back support member 702 relative to the base member 1110 once the releasable locking arrangement is unlocked.

Figure 14:
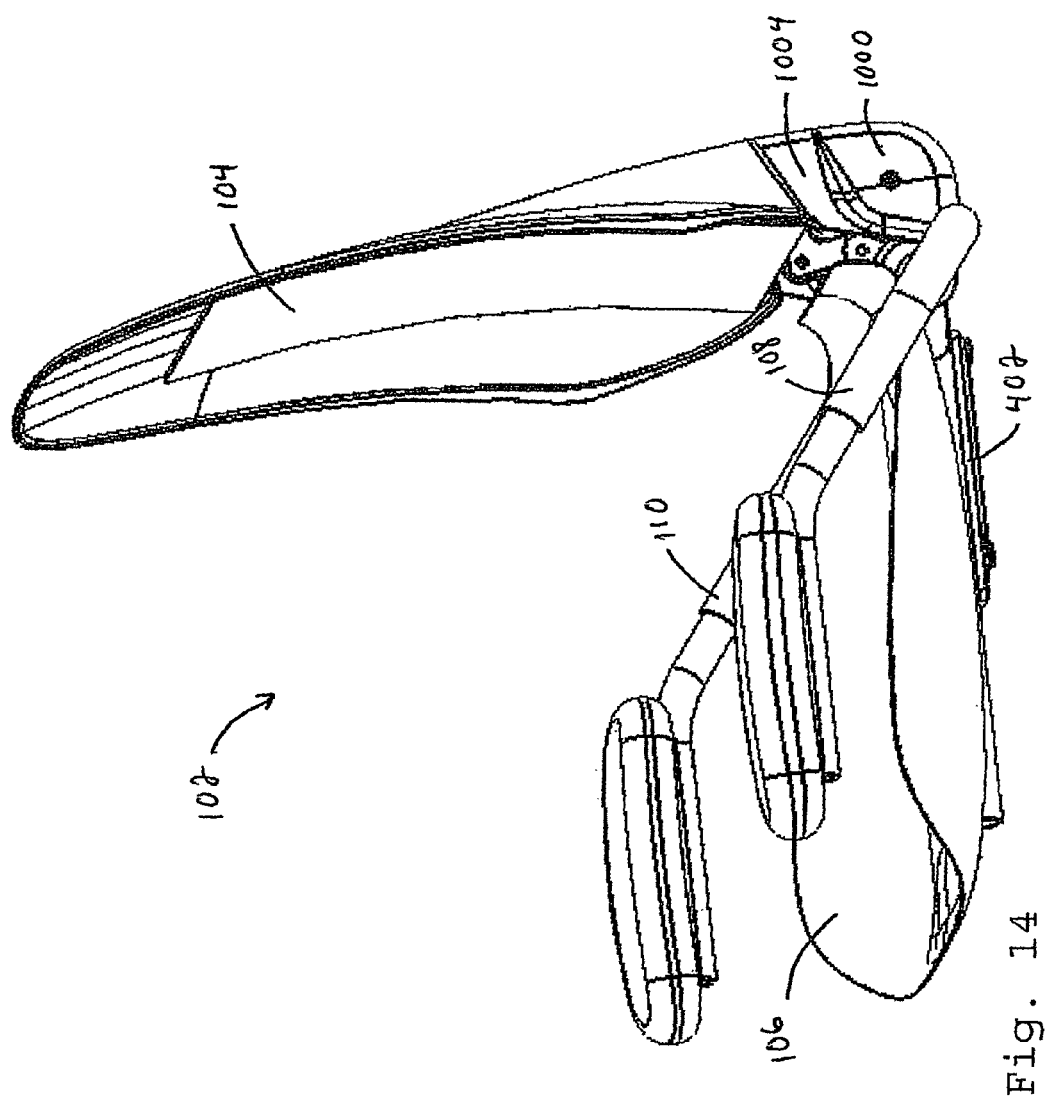
FIG. 14 is a perspective view of the seat assembly with the seat back in an upright position.
Figure 15:
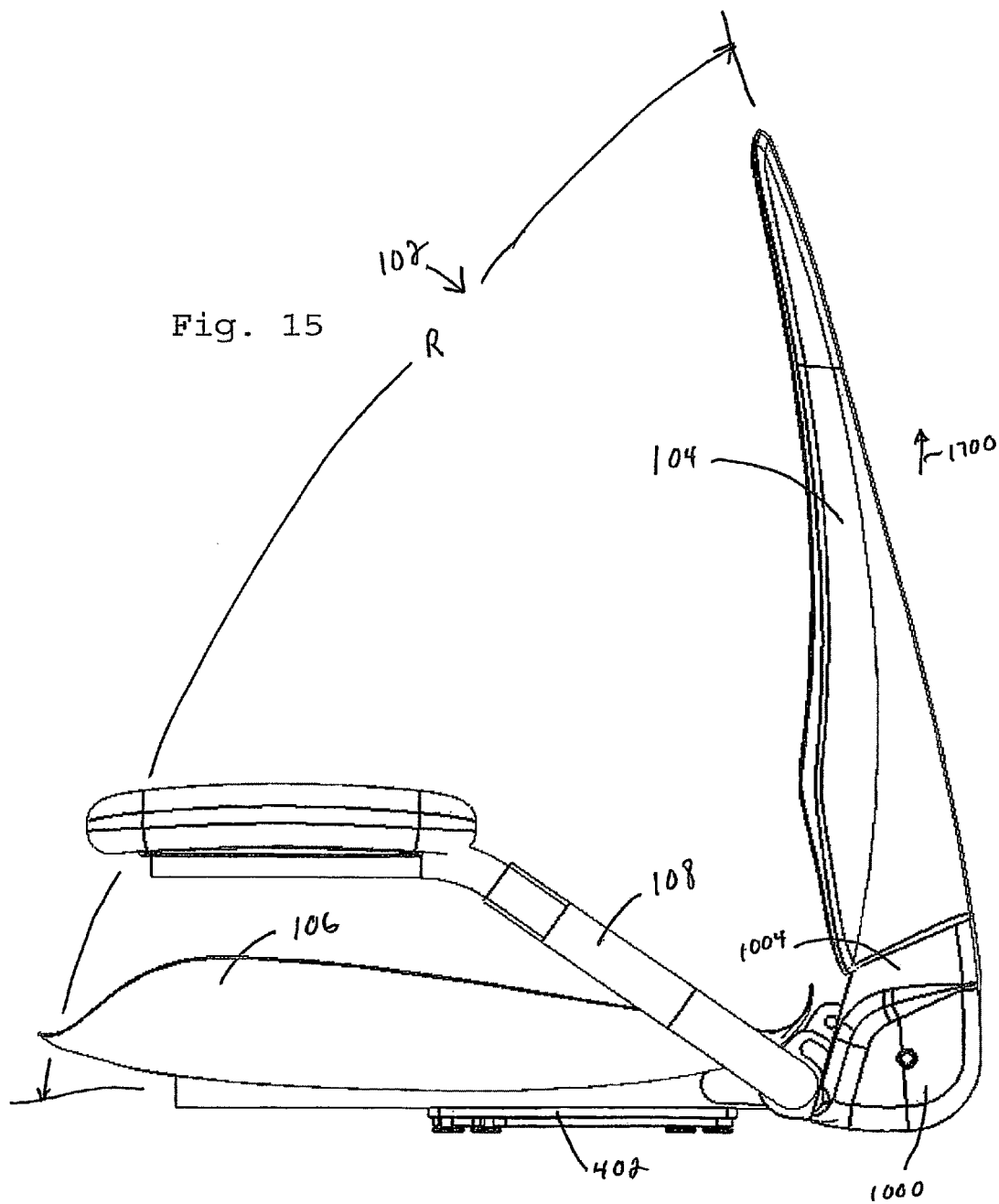
FIG. 15 is a side view of the seat assembly with the seat back in the upright position.
Figure 17:
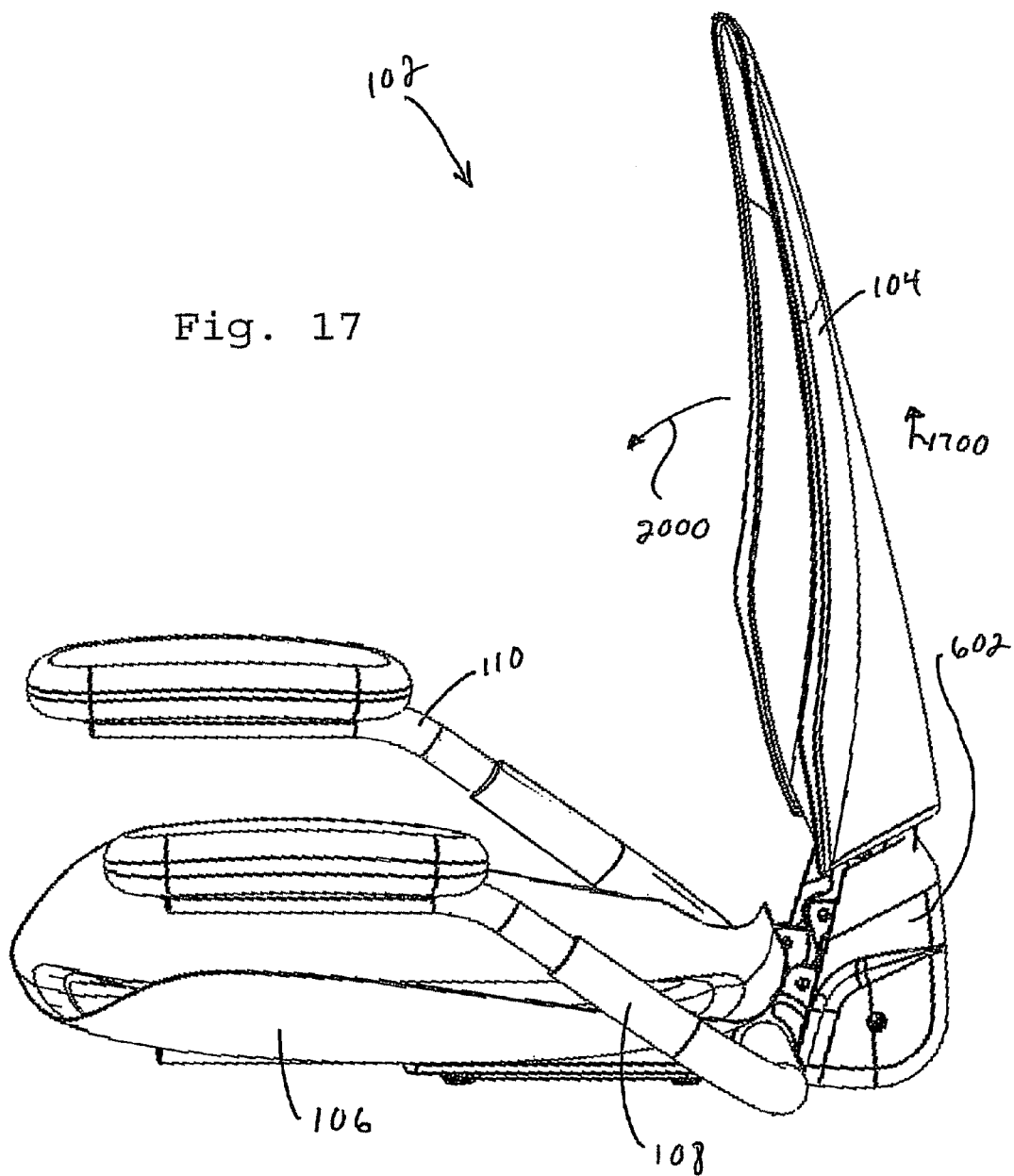
FIG. 17 is a perspective view of the seat assembly with the seat back in a release position.
Figure 18:
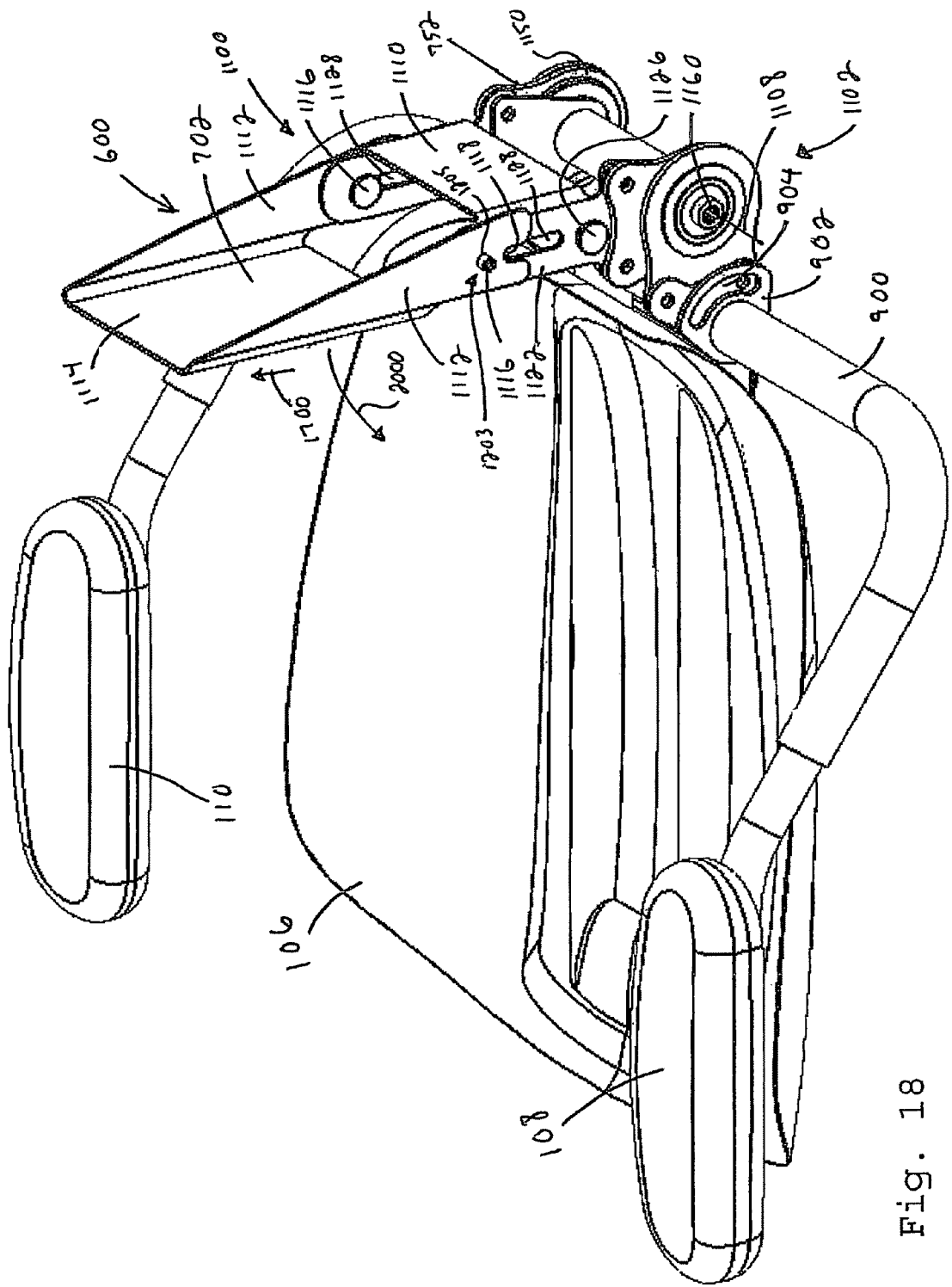
FIG. 18 is a perspective view of the seat assembly in the release position with the seat back removed.
Figure 19:
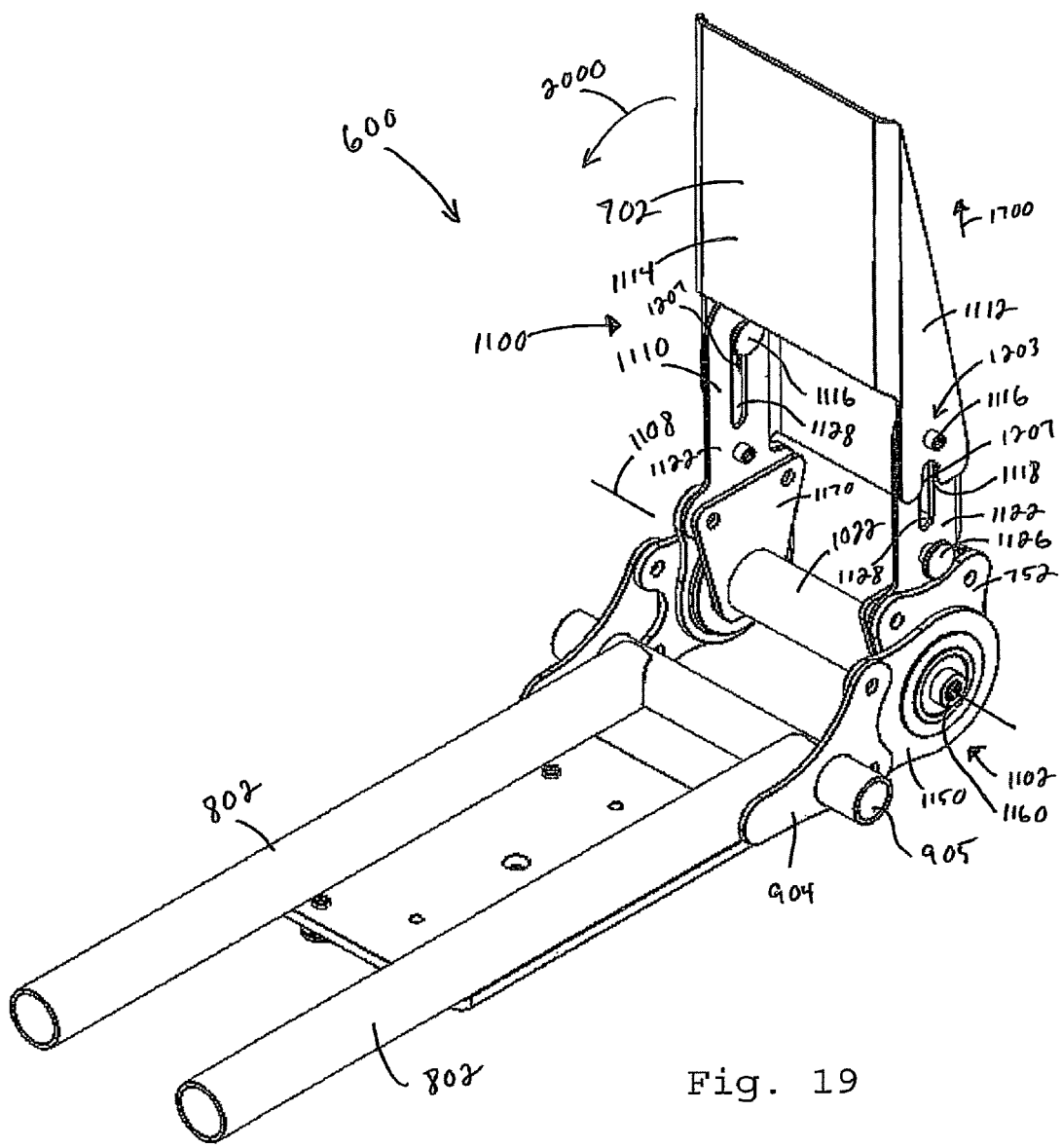
FIG. 19 is a perspective view of the seat adjustment and folding assembly in the release position.

FIGS. 14 and 15 illustrate the seal assembly 104 with the seat back in an upright and locked position. FIG. 17 illustrates the seat assembly with the seat back 104 moved to a released position and FIGS. 18 and 19, illustrate the seat back folding mechanism 1110 in the released position. The seat back folding mechanism 1110 may be moved to the released position by pulling the seat back 104 and the attached back support member 702 upward as indicated by arrow 1700. In the exemplary embodiment, this releasing may be done regardless of the recline angle set by the recline mechanism 1102. The fasteners 1116 slide in the slots 1128 and the open ended slots 1118 slide off of the fasteners 1126. Referring to FIGS. 18 and 19, once the open ended slots 1118 are disengaged from the fasteners 1126, the support member 702 is unlocked from and free to rotate or pivot with respect to the base member 1110.

Figure 20:
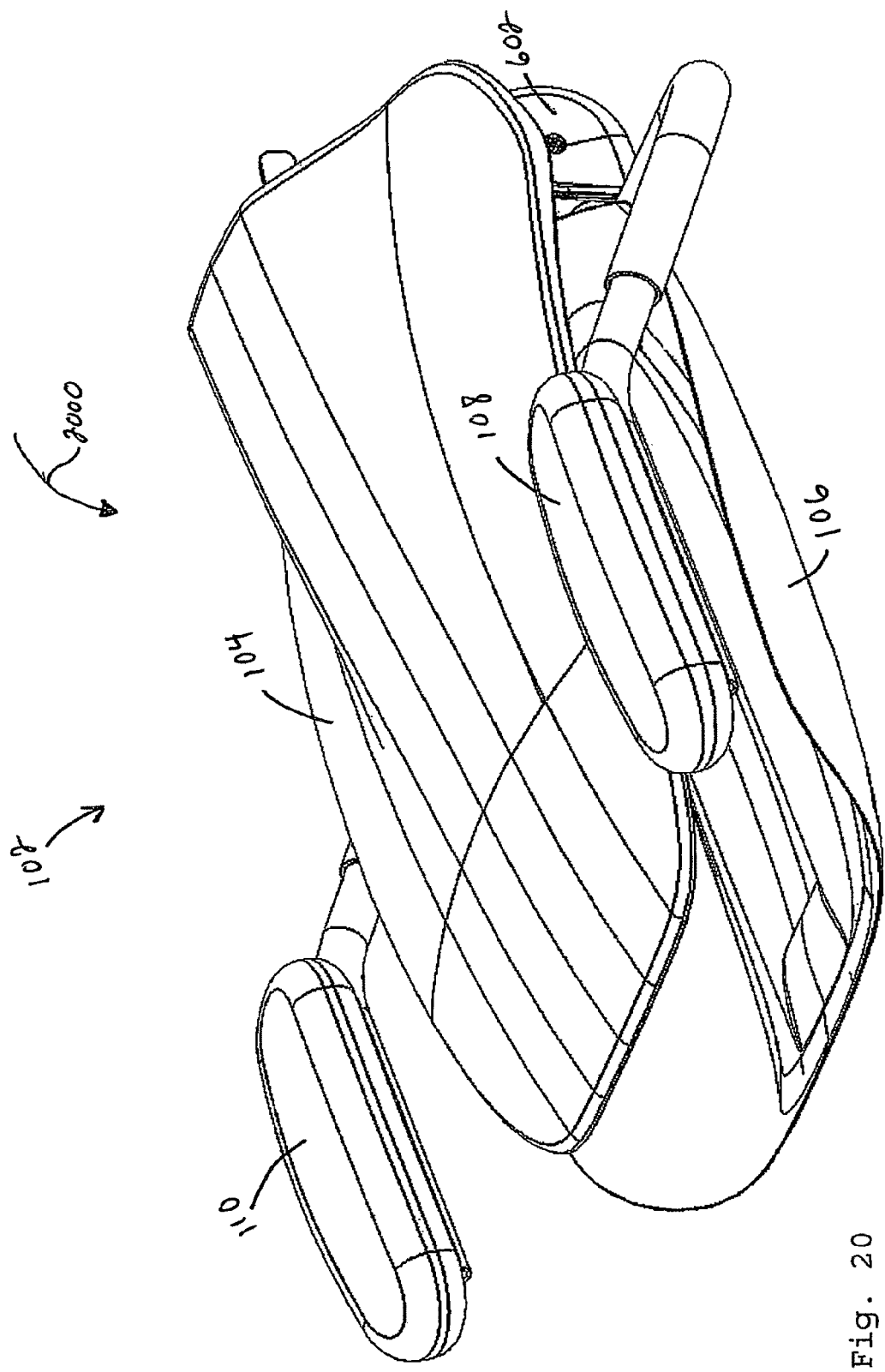
FIG. 20 is a perspective view of the seat assembly with the seat back in a folded position.
Figure 20A:
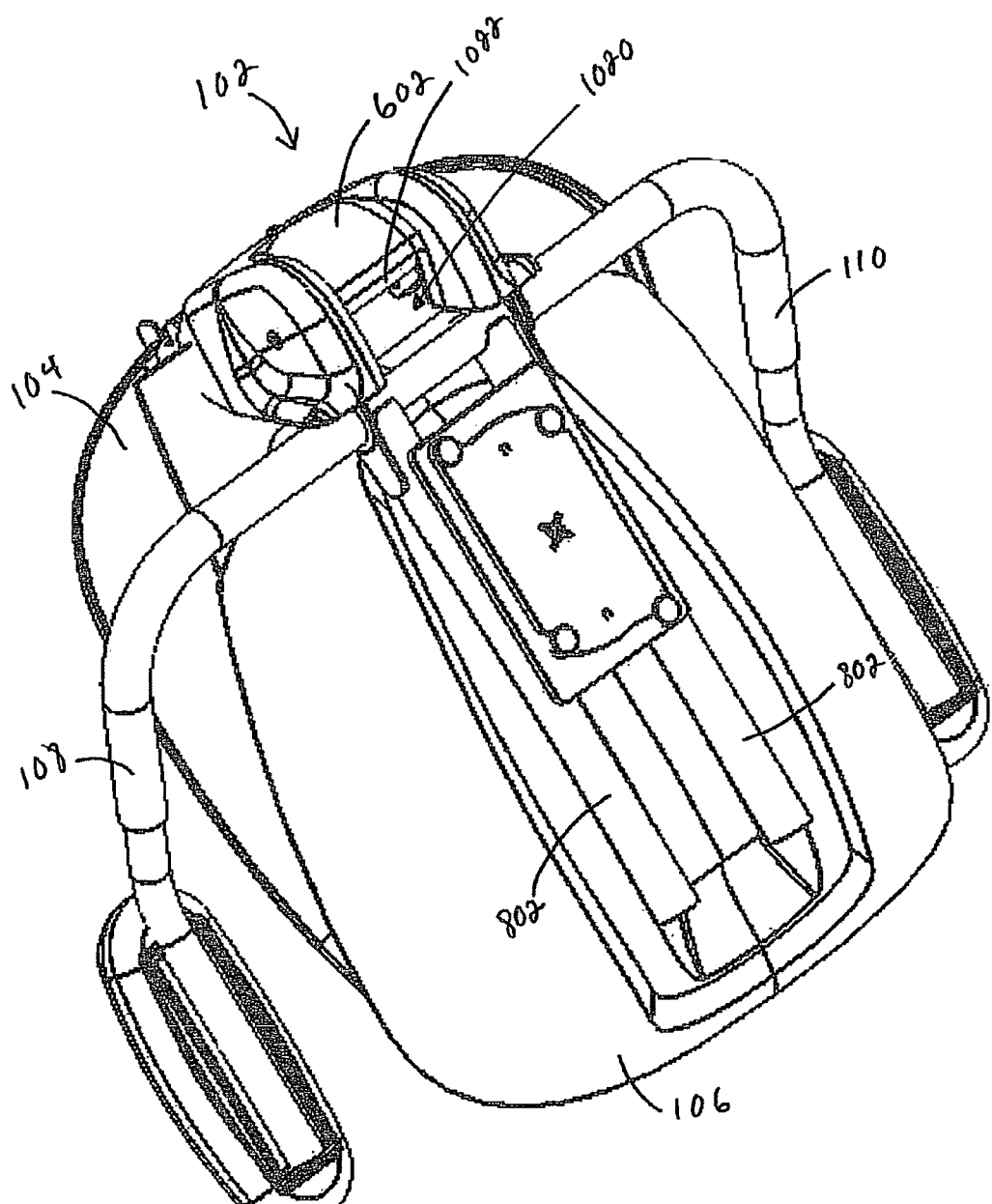
FIG. 20A is a perspective view of the seat assembly with the seat back in a folded position.
Figure 21:
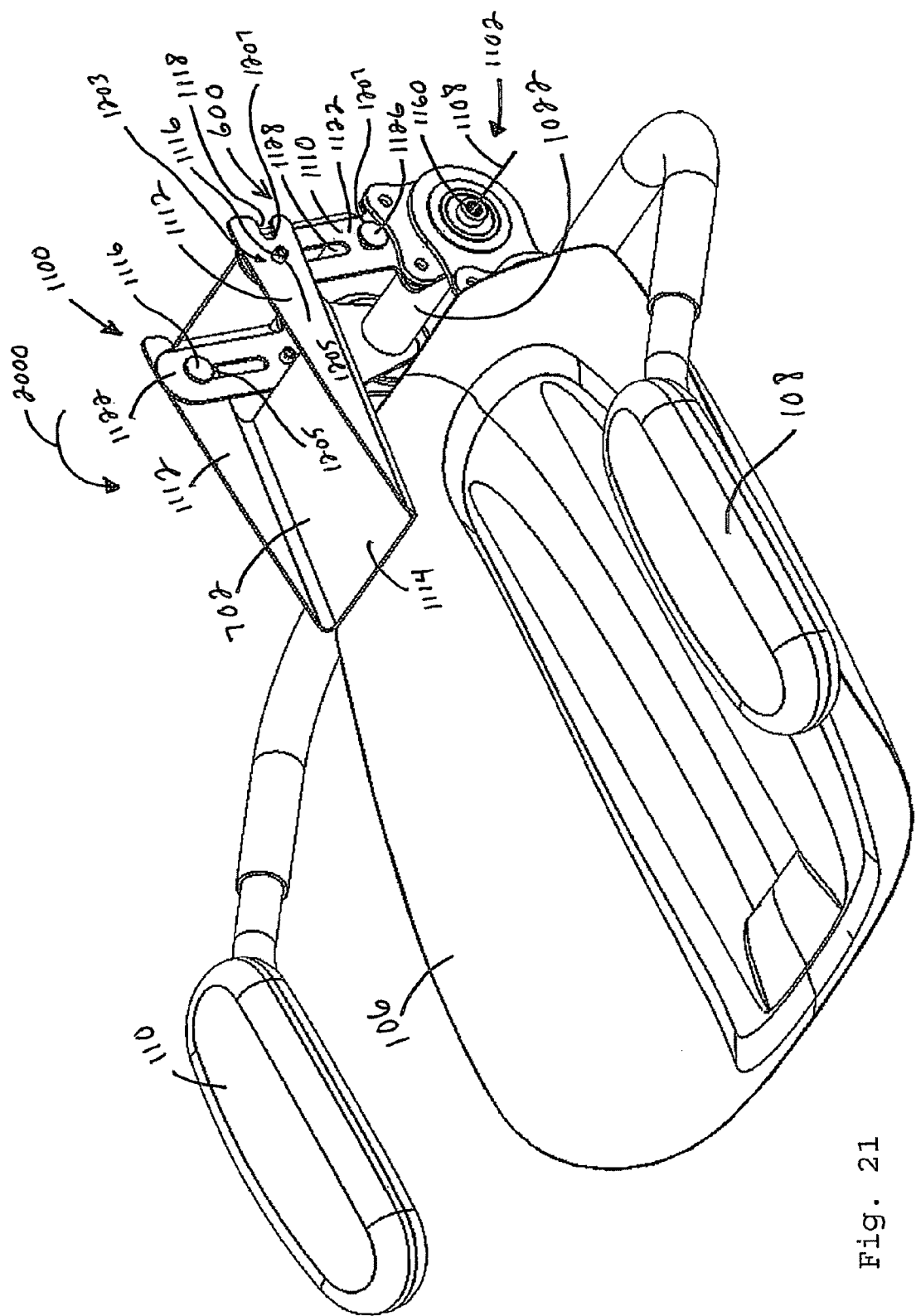
FIG. 21 is a perspective view of the seat assembly in the folded position with the seat back removed.
Figure 22:
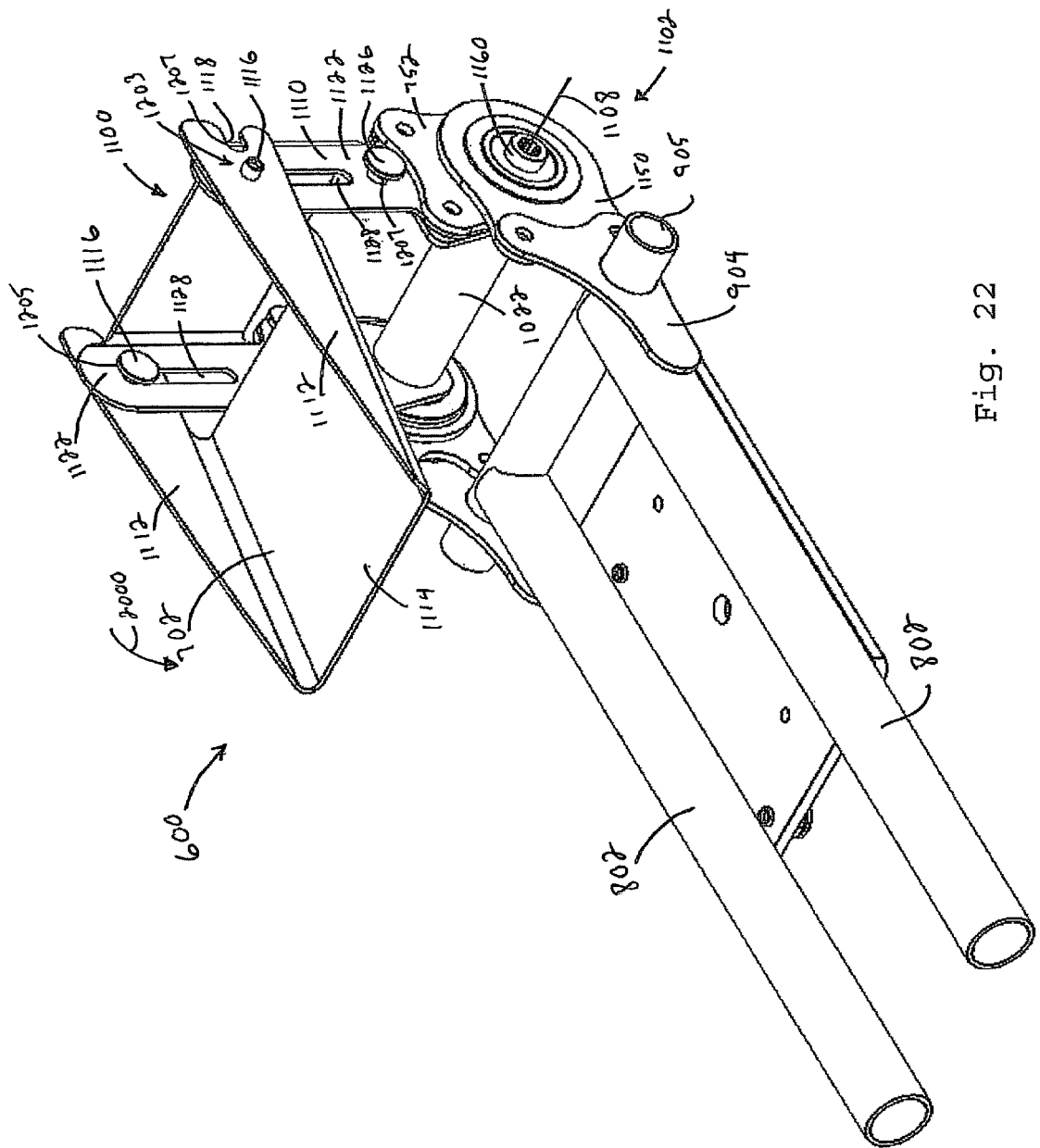
FIG. 22 is a perspective view of the seat adjustment and folding assembly in the folded position.

FIG. 20 illustrates the seat assembly with the seat back 104 moved to a folded position and FIGS. 20 and 21, illustrate the seat back folding mechanism 1100 in the folded position. The seat back folding mechanism 1100 may be moved to the folded position by simply rotating the seat back 104 and the attached back support member 702 as indicated by arrow 2000. This folding does not effect the recline angle that is set by the recline mechanism 1102. The fasteners 1116 are rotatable in the slots 1128 after the folding mechanism is moved to the release position. Referring to FIG. 20, fasteners 1116 rotate in the slots 1128 a distance above the pivot axis 1108 of the recline mechanism 1102. This allows the seat back 104 to be folded substantially parallel to the seat bottom 106 when cushions (not shown) are disposed on the seat back 104 and the seat bottom 106. As such, the seat assembly 102 takes a compact and easily transportable form when in the folded position. Referring to FIG. 20A, the seat assembly includes the handle 1022. The handle 1022 is positioned at the rear of the seat assembly 102 and allows the seat to be carried in a manner similar to a suitcase or briefcase when the seat assembly is folded. When the seat assembly 102 is to be used again, the seat back is rotated such that the open ended slots 1118 are aligned with the fasteners 1126. The seat back 104 is lowered such that the slots 1118 engage the fasteners 1126 to lock the support member 702 to the base member 1110. Since the recline angle R set by the recline mechanism 1102 is not changed by operation of the folding mechanism 1100, the seat back 104 returns to the set recline angle R.

Referring to FIGS. 11, 12, and 13, the seat back recline mechanism 1102 can take a wide variety of different forms. In an exemplary embodiment, the seat back recline mechanism 1102 allows the seat back 104 to be reclined or pivoted along a the recline axis 1108 of the seat back. This can be accomplished in a wide variety of different ways. For example, any mechanism that provides a pivotable connection that is selectively lockable or settable can be used. The seat back recline mechanism 1102 may comprise a settable pivotable connection between the seat bottom 106 and the seat folding mechanism 1100.

In an exemplary embodiment, the recline axis is generally aligned with the seat bottom 106. In the embodiment illustrated by FIGS. 11-13, the seat back recline mechanism 1102 includes the a back member 752 and a bottom member 1150. The back member 752 is pivotably connected to the bottom member 1150 and are selectively lockable at multiple rotational positions around the recline axis 1108. A wide variety of different mechanisms can be used for this pivotable connection and locking.

In one exemplary embodiment, the back member 752 is positionable at an infinite number of rotational positions relative to the bottom member 1150. Referring to FIG. 11, the position of the back member 752 relative to the bottom member 1150 is adjusted by rotating a shaft 1157 in a drive socket 1160, in an exemplary embodiment. The shaft may be driven by a recline adjustment knob 1002. The shaft 1157 and the knob 1002 may be attached to the recline mechanism. In an exemplary embodiment, an additional action by the user is not required to set the position of the back member 752 relative to the bottom member 1150 after the drive socket is rotated to move the seat back to the recline position. That is, the user simply lets go of the knob 1002 and the position of the seat back 104 relative to the seat bottom 106 is set. The illustrated recline mechanism 1102 is available from SKF International.

Referring to FIGS. 11-13, the back member 752 of the recline mechanism 1102 is fixed to the base member 1110 of the seat back folding mechanism 1100. The bottom member 1150 of the recline mechanism 1102 is fixed to the seat bottom mounting assembly 1104 and armrest mounting assembly 1106. A pair of recline mechanisms 1102 that are coupled together are included in the illustrated embodiment. However, any number of recline mechanisms may be included, depending on the application (i.e. for low weight applications a single recline mechanism may be used and for higher weight applications more recline mechanisms coupled together may be used. In the illustrated embodiment, the handle 1022 is connected between a pair of the back members 752 by a pair of brackets 1170.

Figure 23:
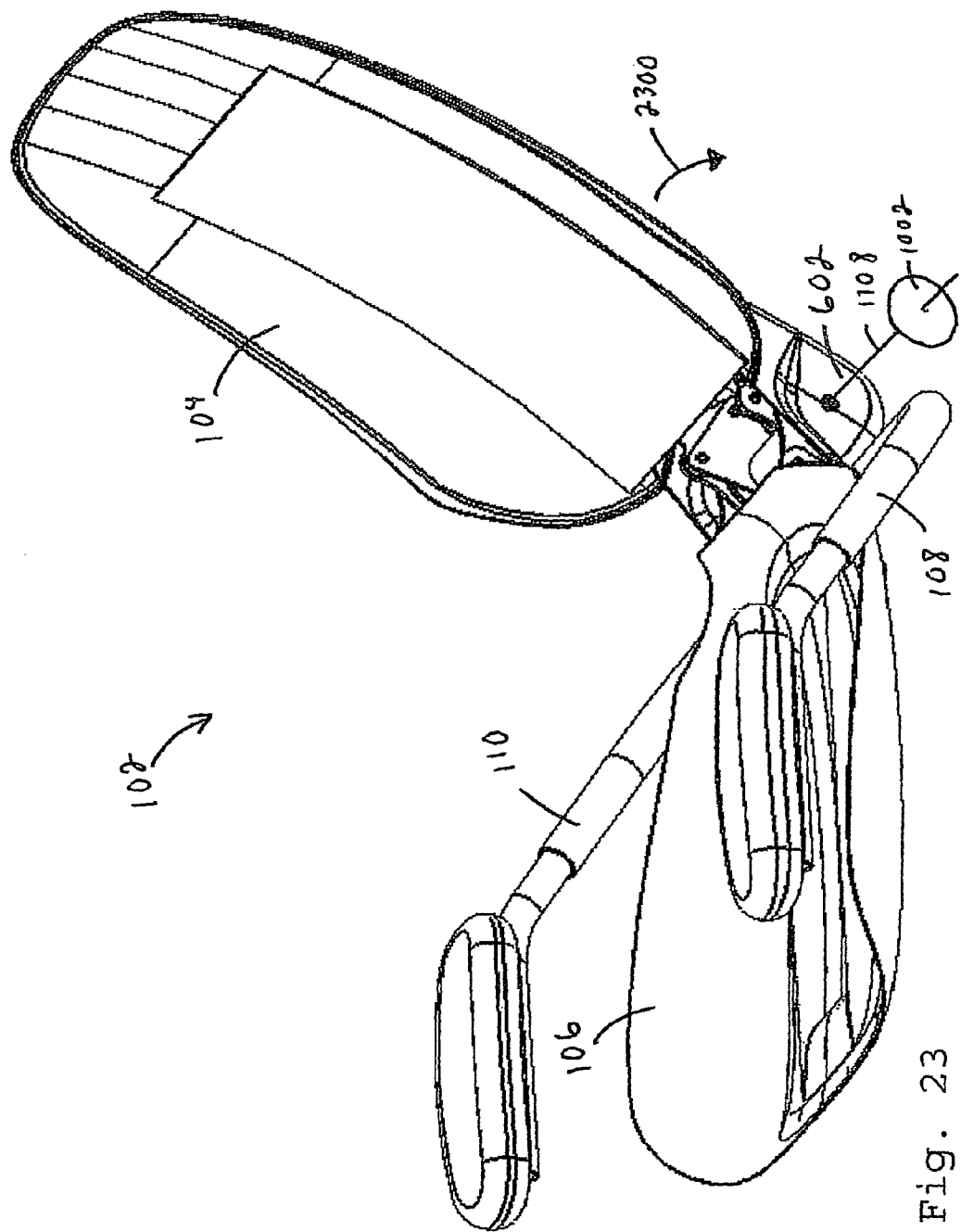
FIG. 23 is a perspective view of the seat assembly with the seat back in a reclined position.
Figure 24:
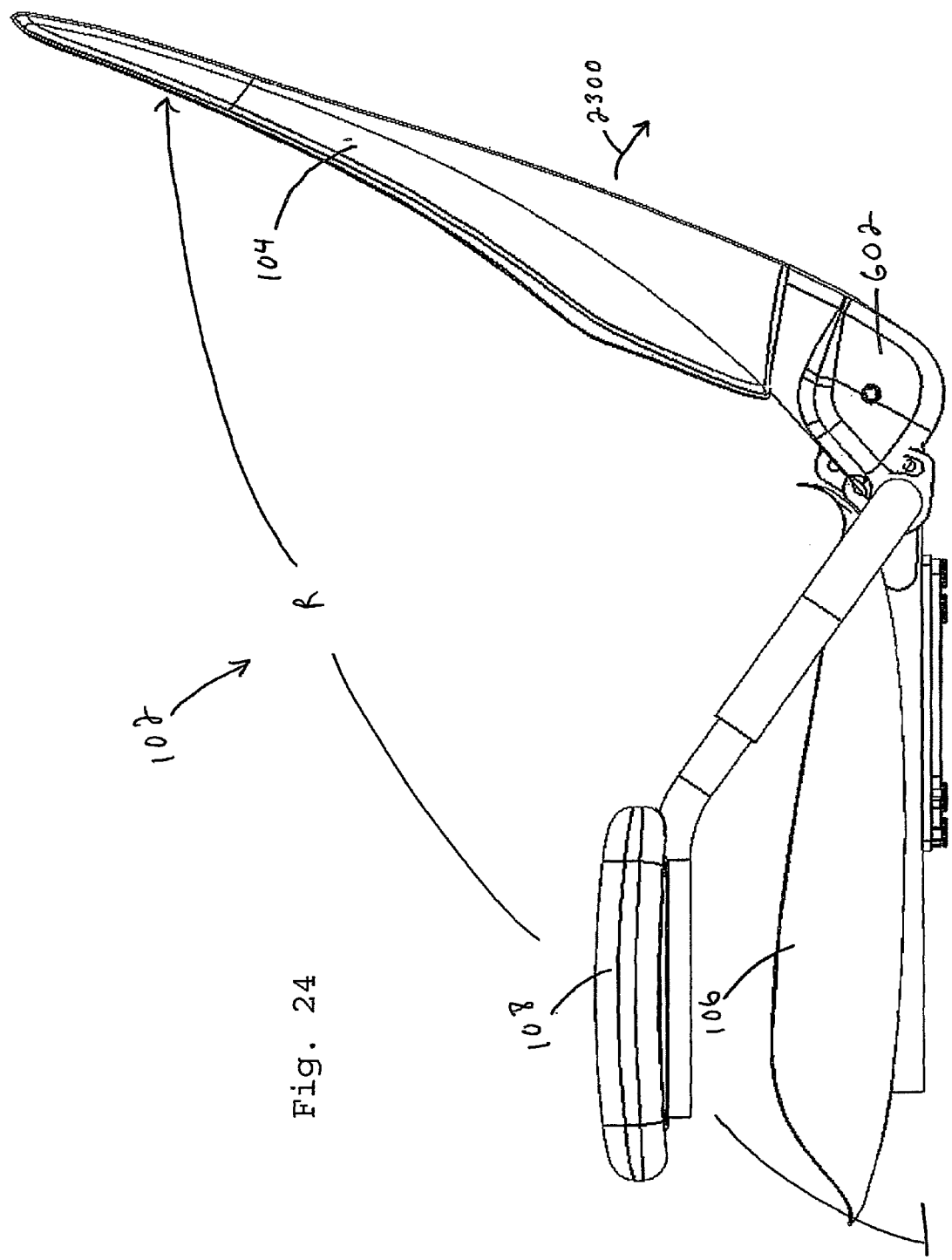
FIG. 24 is a side view of the seat assembly with the seat back in the reclined position.
Figure 25:
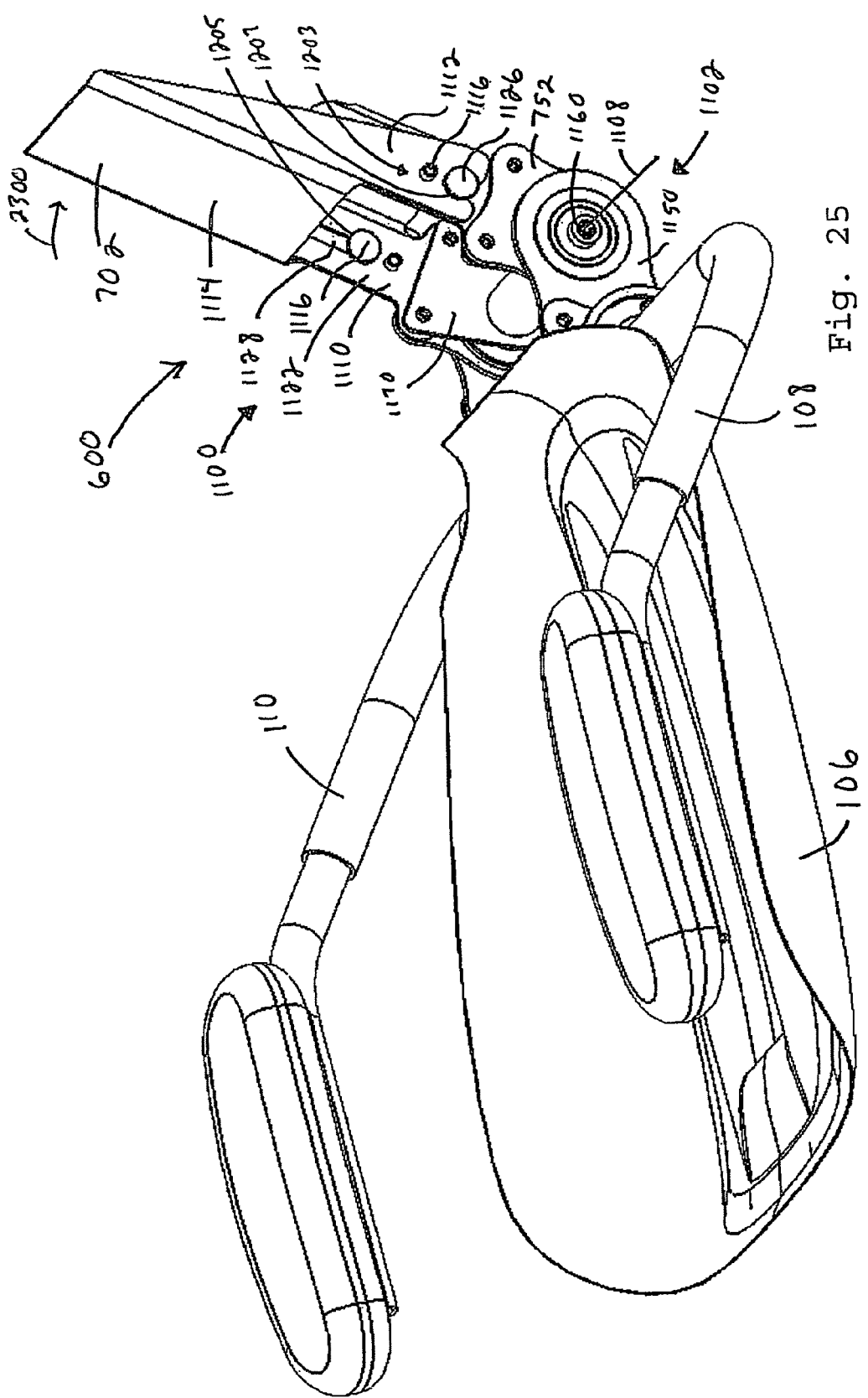
FIG. 25 is a perspective view of the seat assembly in the reclined position with the seat back removed.
Figure 26:
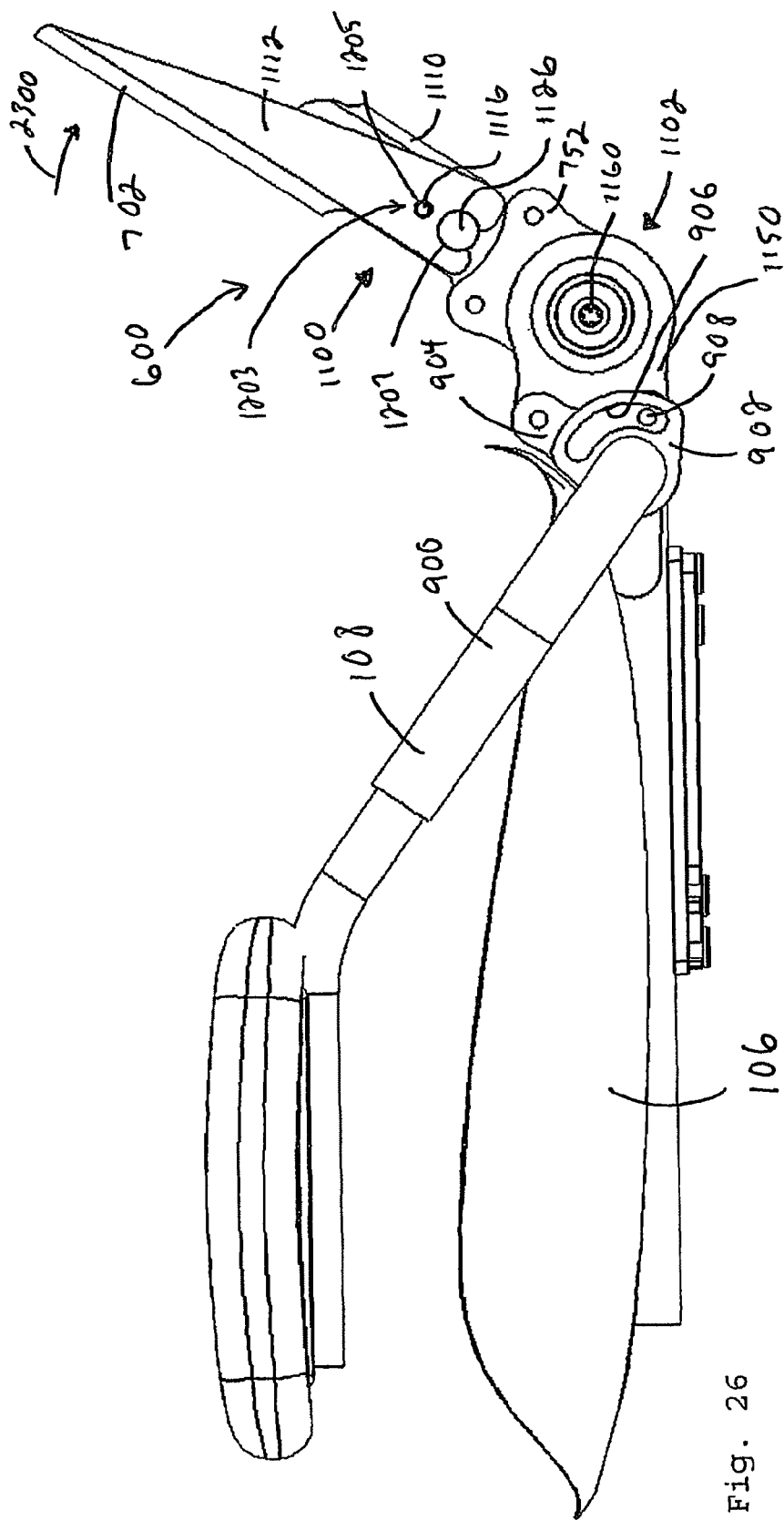
FIG. 26 is a side view of the seat assembly in the reclined position with the seat back removed.
Figure 27:
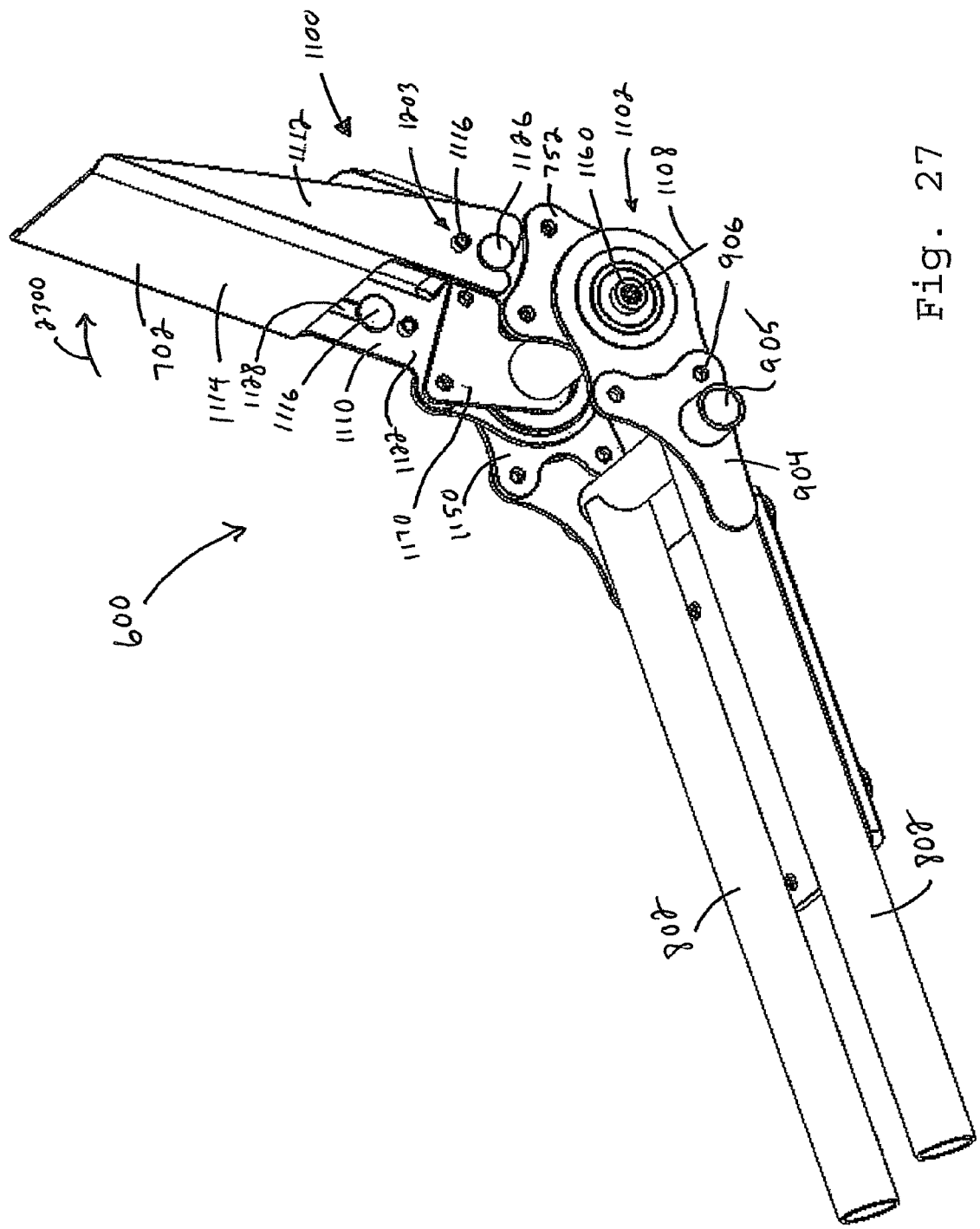
FIG. 27 is a perspective view of the seat adjustment and folding assembly in the reclined position.
Figure 28:
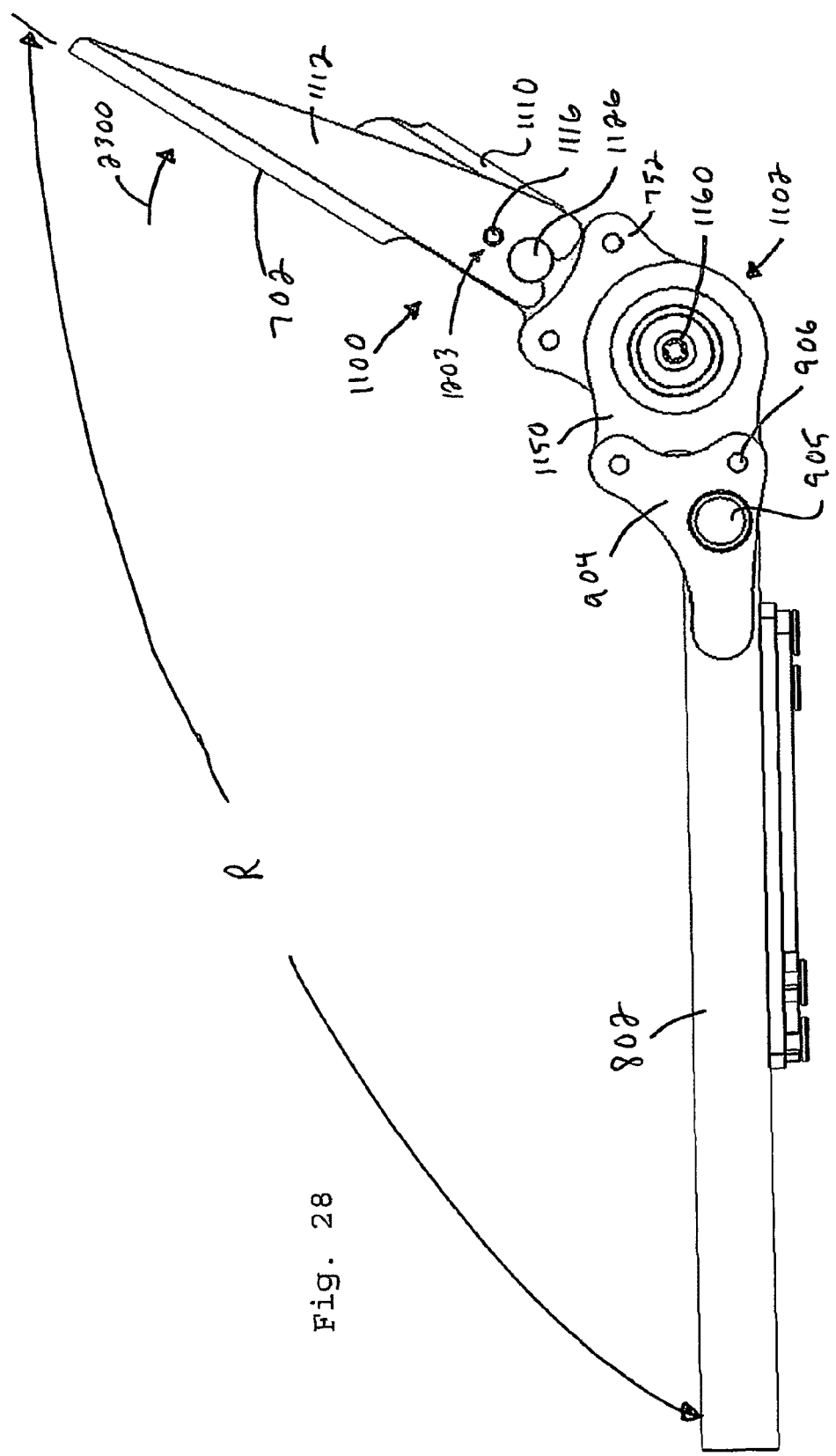
FIG. 28 is a side view of the seat adjustment and folding assembly in the reclined position.

FIGS. 23 and 24 illustrate the seat assembly with the seat back 104 moved to a reclined position and FIGS. 25-28 illustrate the seat back recline mechanism 1102 in a reclined position, with the seat back folding mechanism 1110 in the locked position. The seat back recline mechanism 1102 may be moved to the reclined position by simply rotating the knob 1002 (spaced apart from the recline mechanism 1102 in FIG. 23) to pivot the seat back 104 and the attached back support member 702 as indicated by arrow 2300.

Figure 29:
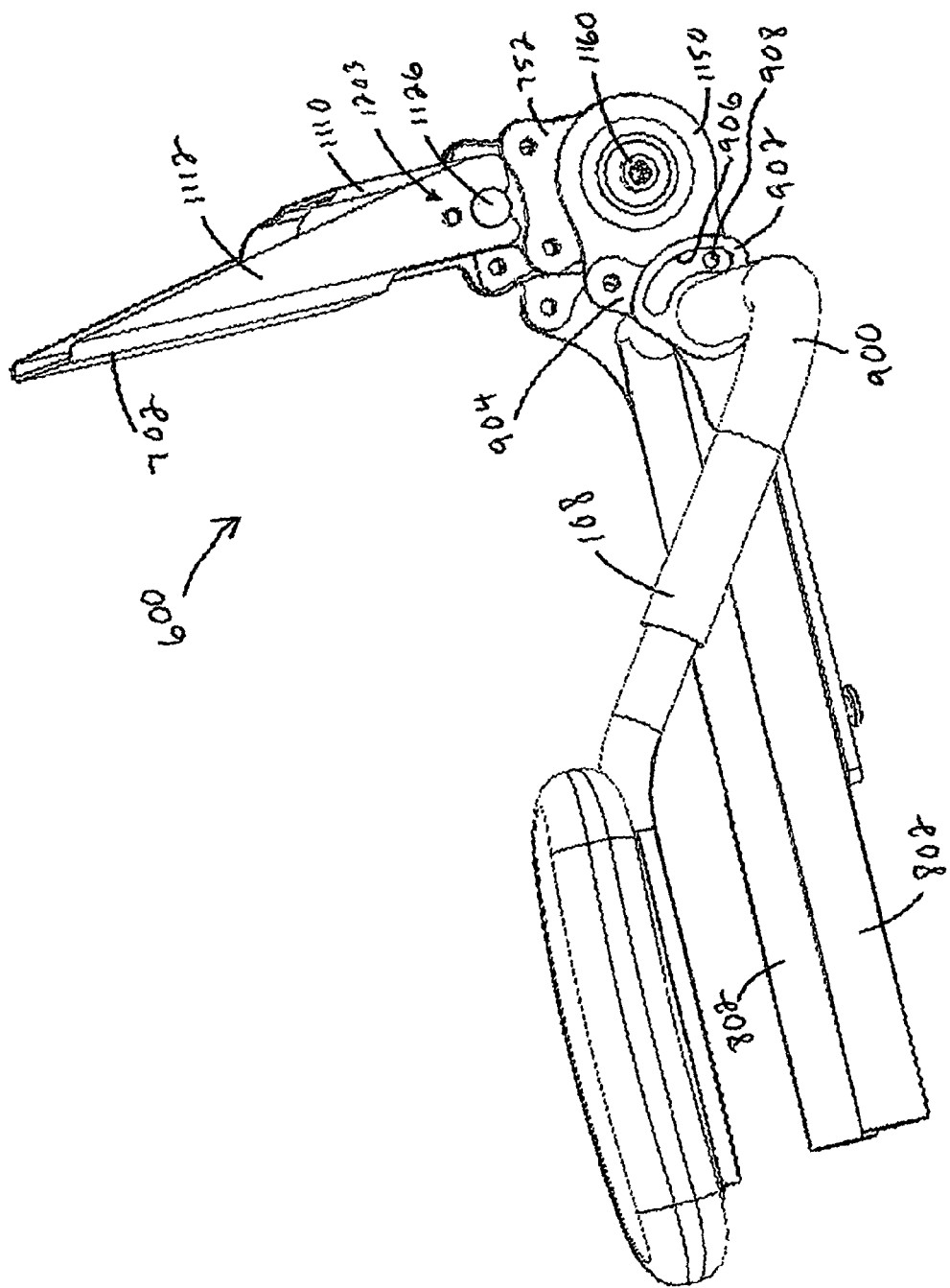
FIG. 29 is a perspective view of the seat adjustment and folding assembly and an armrest assembly.
Figure 30:
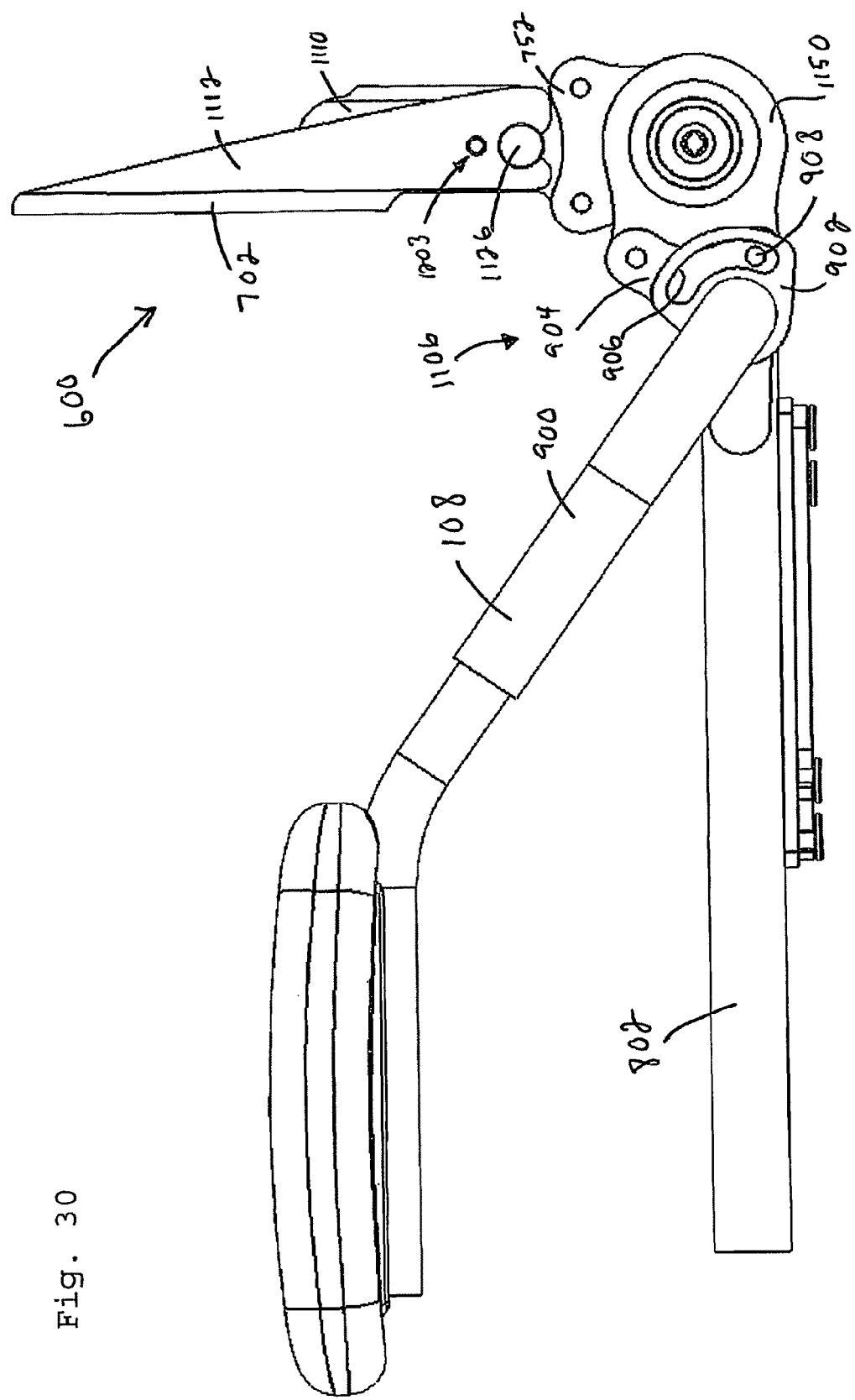
FIG. 30 is a side view of the seat adjustment and folding assembly and the armrest assembly.

The armrest mounting assembly 1106 can take a wide variety of different forms. FIGS. 9, 29 and 30 illustrate one embodiment of an armrest mounting assembly 1106. The illustrated armrest mounting assembly 1106 includes the support tube 900, the first mounting bracket 902, the second mounting bracket 904 and the tube stub 905. The tube stub 905 that is fixed to the second mounting bracket 904, which is fixed to the bottom member 1150 of the seat back recline mechanism 1102. As is described above, the support tube 900 is rotatable on the tube stub 905 and the slot 906 of the first mounting bracket 902 is in alignment with a fastener accepting hole 908. The screw or a quick release fastener is placed through the slot and in the fastener accepting hole 908 and fixes the first bracket 902 to the second bracket 904 to fix the position of the armrest assembly 108 relative to the seat bottom 106.

Figure 31:
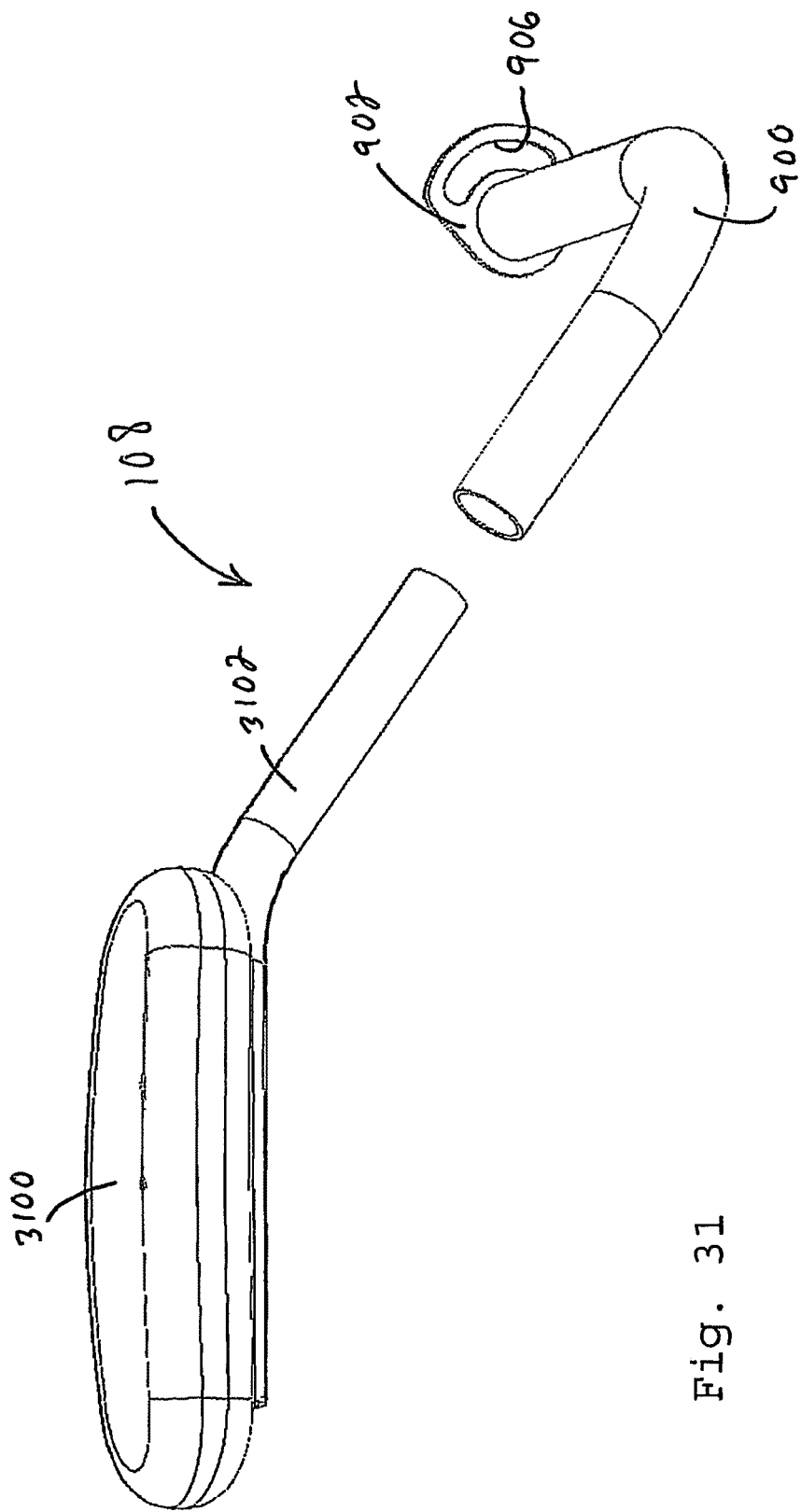
FIG. 31 is an exploded perspective view of an armrest assembly.

FIG. 31 is an exploded perspective view of the armrest assembly 108, in an embodiment where the armrest assembly is adjustable. In the illustrated embodiment, an armrest cushion 3100 is connected to a tube 3102 that is telescopically coupled to the support tube 900. The tubes 3102 and 900 can have any shape. For example, the tubes 3102 and 900 can be elliptical, square, or rectangular. Further, the tube 3102 and the support tube 900 can be replaced with any telescoping arrangement. For example, the tubes 3102 and 900 can be replaced with plates, bars, etc. A wide variety of different coupling arrangements can be employed to releasably fix the position of the armrest cushion with respect to the seat bottom 106. In the illustrated embodiment, the armrest cushion position 3100 may be adjusted and fixed through the use of a plurality of apertures (not shown) in the support tube 900, which are aligned with the apertures (not shown) in the tube 3100 in a manner similar to the coupling of the seat support members 316, 318. A suitable fastener can then be inserted through the appropriately aligned apertures to fix or maintain them in position. The fastener may be of an easily removable type not requiring the use of tools.

The seat bottom mounting assembly 1104 can take a wide variety of different forms. FIGS. 8, 32, 33A, 33B, 34A and 34B illustrate one embodiment of a seat bottom mounting assembly 1104. The illustrated seat bottom mounting assembly 1104 includes the recesses 800 or grooves that accept the pair of bottom support tubes 802 as described above. FIGS. 33A and 34A illustrate the seat back 104 positioned at a first seat depth where the seat back (supported by back support member 702) is relatively close to the seat bottom 106. FIGS. 33B and 34B illustrate the seat back 104 positioned at a second seat depth where the seat back (supported by back support member 702) is farther from the seat bottom 106. The seat back 104 can be locked at the depth shown in FIGS. 33A and 34B, the depth shown in FIGS. 33B and 34B, and at a plurality or infinite number of positions in between. A wide variety of different coupling arrangements can be employed to releasably fix the position of the seat bottom 106 on the bottom support tubes 802.

Figure 12A:
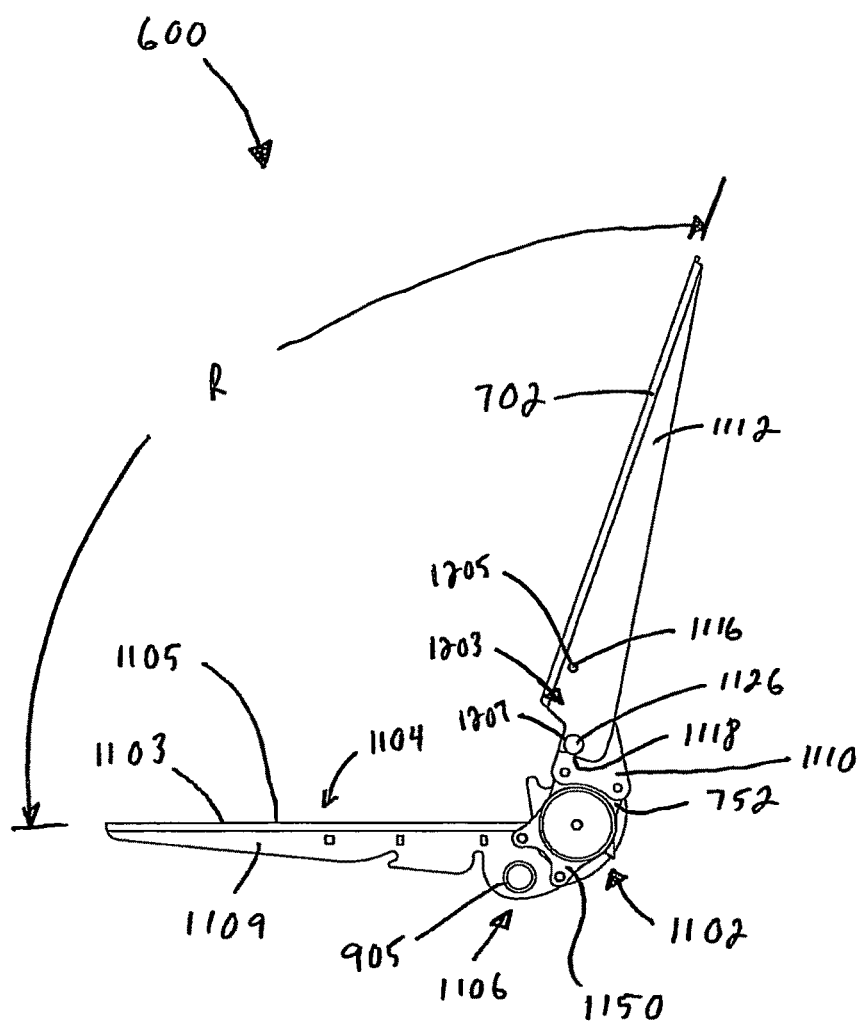
FIG. 12A is a side view of the seat adjustment and folding assembly of FIG. 11A.
Figure 13A:
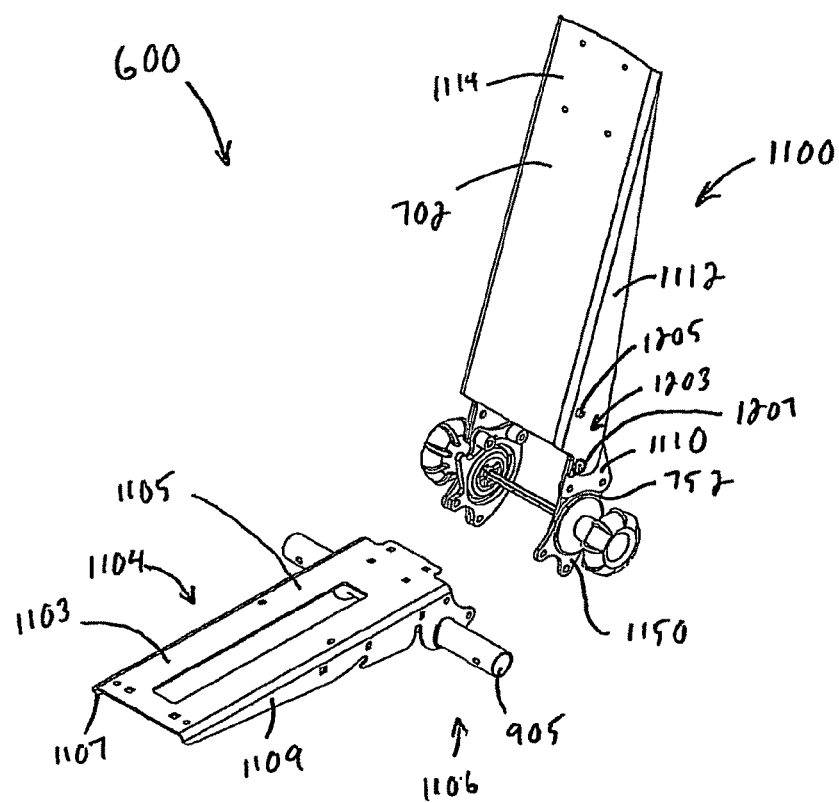
FIG. 13A is an exploded perspective view of the seat adjustment and folding assembly of FIG. 11A.

FIGS. 11A, 12A, and 13A are perspective, side, and exploded views of another embodiment of the seat adjustment and folding assembly 600. The seat back folding mechanism 1100, and seat back recline mechanism 1102 are structurally similar and function in substantially the same manner as in the embodiment illustrated by FIGS. 11, 12, and 13 and are therefore not described in detail again. In the embodiment illustrated by FIGS. 11A, 12A, and 13A the mounting brackets 904 of the armrest mounting assembly 1106 and the support tubes 802 of the seat bottom mounting assembly 1104 are replaced by a single member 1103. The member 1103 may take a variety of different forms. In the illustrated embodiment, the member 1103 includes a seat support wall 1105 and a pair of mounting walls 1107, 1109 that extend downward from the seat support wall 1105. The mounting walls 1107, 1109 are connected to the bottom members 1150 of the seat back recline mechanism 1102.

Figure 32:
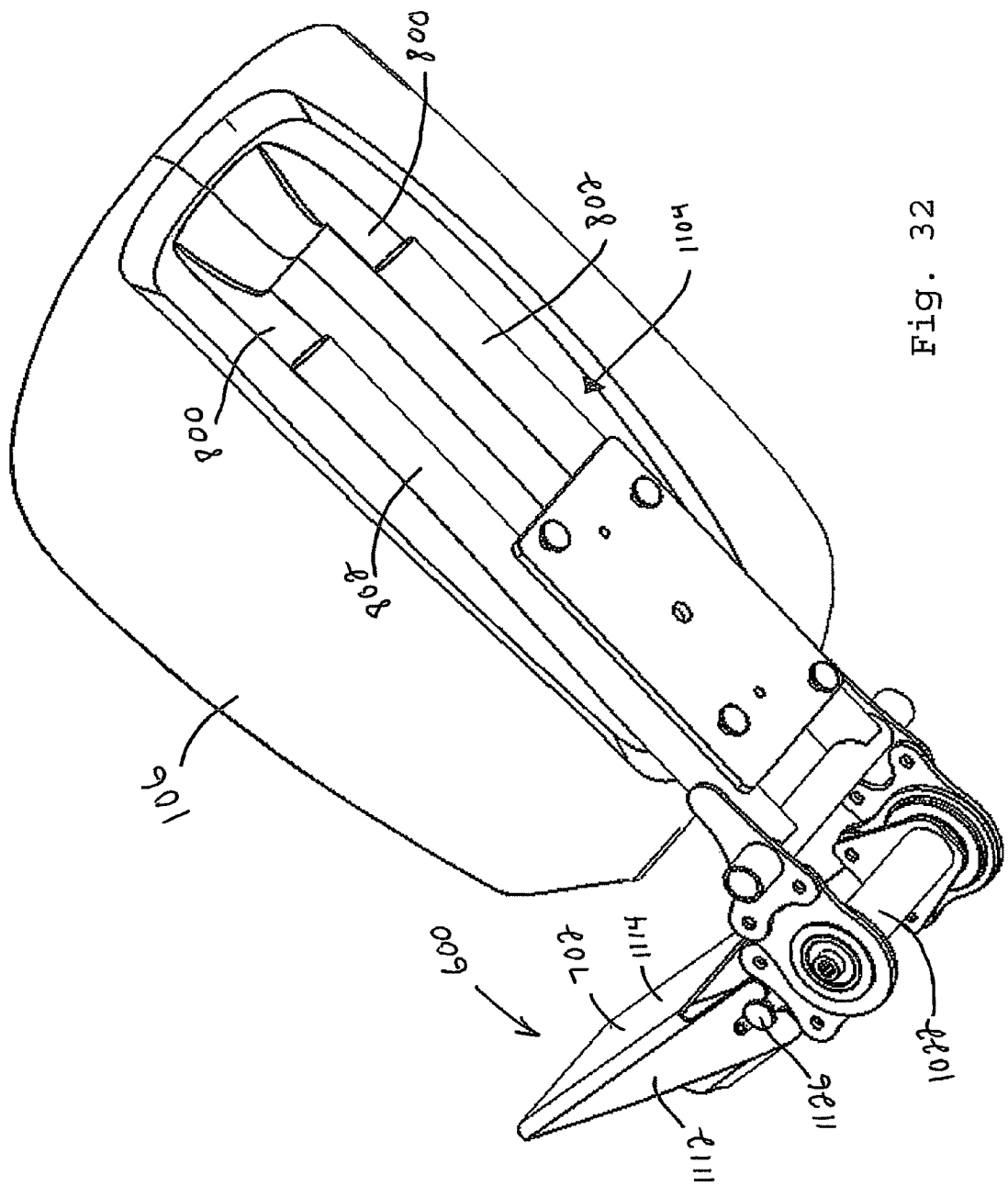
FIG. 32 is a perspective view illustrating the seat adjustment and folding assembly and the seat bottom.
Figure 32A:
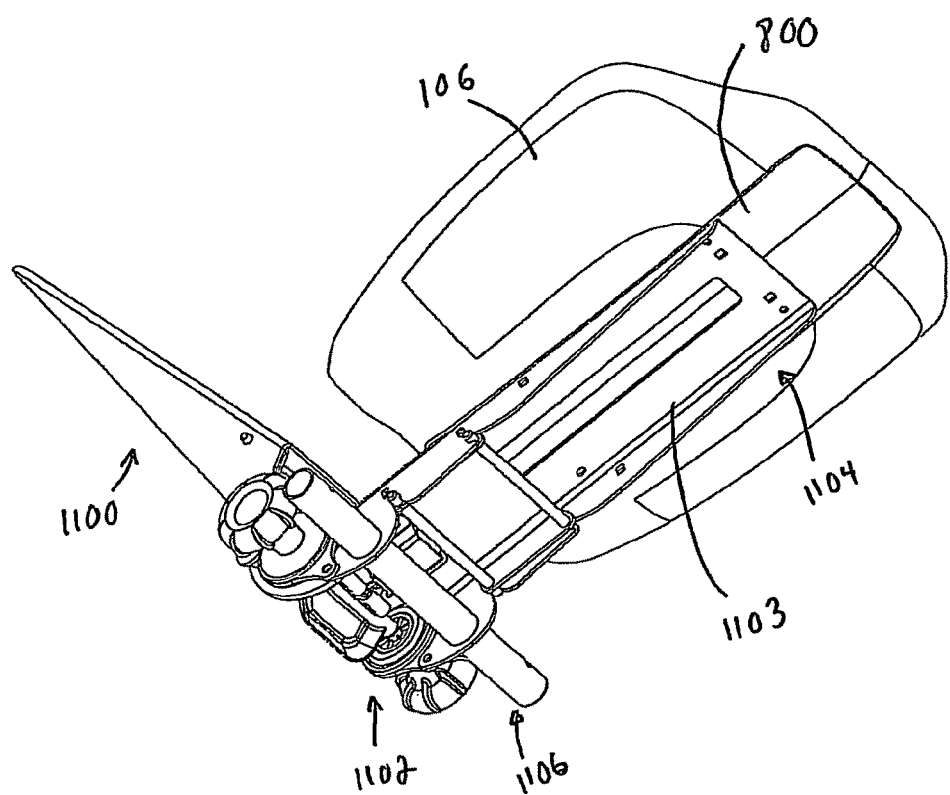
FIG. 32A is a perspective view illustrating the seat adjustment and folding assembly and the seat bottom of another exemplary embodiment.
Figure 33D:
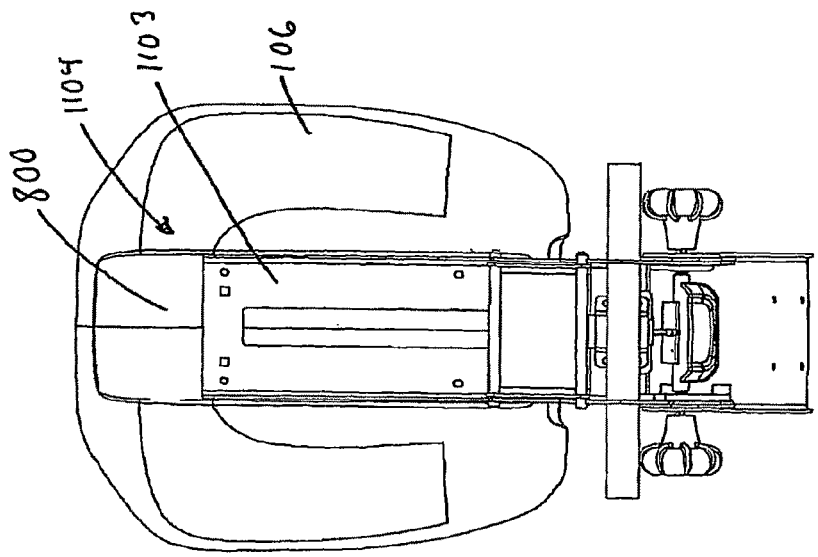
FIG. 33D is a bottom view illustrating the seat adjustment and folding assembly and the seat bottom of FIG. 32A, where the seat back is adjusted to a maximum seat depth.
Figure 33C:
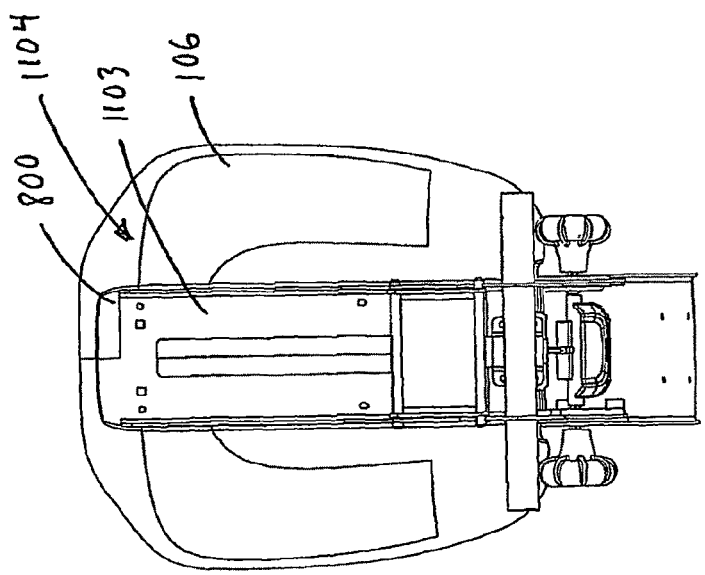
FIG. 33C is a bottom view illustrating the seat adjustment and folding assembly and the seat bottom of FIG. 32A, where the seat back is adjusted to a minimum seat depth.
Figure 35:
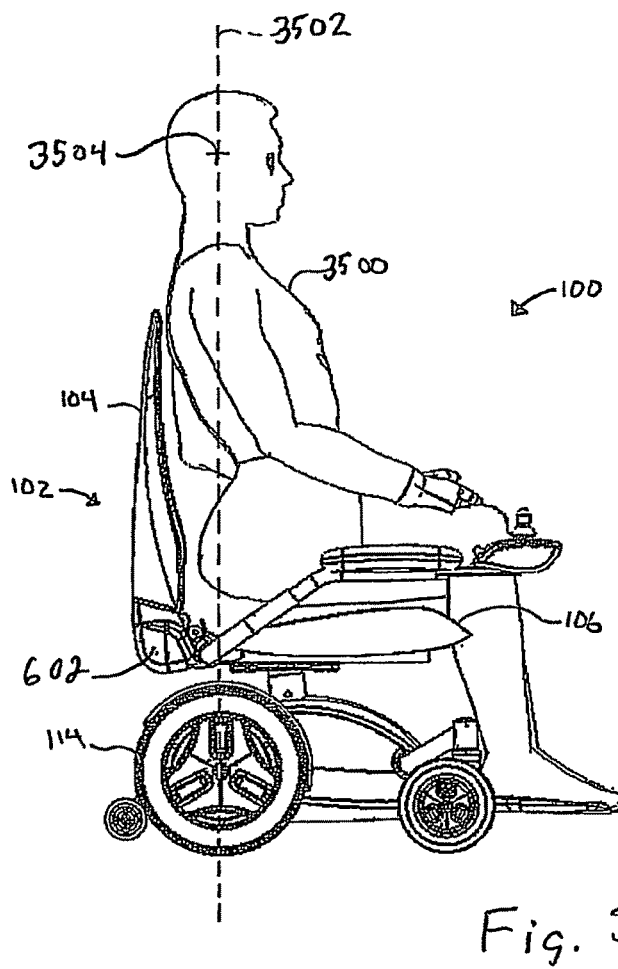
FIGS. 35 and 36 are side elevational and top plan views of one embodiment of a conveyance having an occupant seated therein.

FIGS. 32A, 33C, and 33D illustrate another embodiment of a seat bottom mounting assembly 1104. In this embodiment, the seat bottom mounting assembly 1104 includes a recess 800 or groove that accepts the member 1103. FIG. 33C illustrates a first seat depth where the seat back (supported by back support member 702) is relatively close to the seat bottom 106. FIG. 33D illustrates a the seat back (supported by back support member 702) positioned at a second seat depth where the seat back is farther away from the seat bottom 106. The seat back 104 can be locked at the depth shown in FIGS. 33C and 34C, the depth shown in FIGS. 33B and 34B, and at a plurality or an infinite number of positions in between. The seat back may be positioned closer to the seat back than shown in FIG. 33C and/or farther from the seat back than shown in FIG. 33D. A wide variety of different coupling arrangements can be employed to releasably fix the position of the seat bottom 106 on the member 1103.

FIGS. 37A-37G illustrate another embodiment of a quick-release assembly 3700. The quick release assembly 3700 includes an attachment plate 3704 (See FIG. 37E) and the seat support member 1003. The attachment plate 3704 is attached to the inner seat support member 318. In the illustrated embodiment, this attachment between the plate 3704 and the seat support member 318 is a fixed attachment. However, the attachment may be adjustable to accommodate tilting of the member 1003 relative to the inner seat support member 318, etc.

The illustrated attachment plate 3704 includes two sets of bosses 3708 and 3710 extending outward from attachment plate 3704. As shown in FIG. 37D, each set of bosses 3708 and 3710 includes two ends of a pin extending between two flanges of attachment plate 3704. However, other configurations are possible, e.g., fasteners extending from each side of the plate, bosses integrally fabricated with the plate, etc.

The seat support member 1003 includes two sets of slots or openings 3706 and 3712 disposed on either side of the seat plate. The slots 3706 extend vertically upward from the bottom of two flanges of the seat support member 1003. As shown, the slots 3706 are configured to mate with bosses 3708 of attachment plate 3704. The slots 3712 extend upward at an angle from the bottom of the two flanges of seat support member 1003. As shown, slots 3712 are configured to mate with bosses 3710 of attachment plate 3704.

The seat support member 1003 is configured to be removably coupled to attachment plate 3704. The connection between the seat support member 1003 and the attachment plate 3704 permits simple, repeated attachment and removal of seat assembly 102 with chassis 112. For example, a first end of seat support member 1003 having slots 3706 may be rotated upward to permit alignment of slots 3712 with bosses 3710 of the attachment plate 3704. In this position, the slots 3712 may be slid over bosses 3710. The first end of the seat support member 1003 may then be rotated downward such that slots 3706 are slid over bosses 3708 of the attachment plate 3704. In this configuration, the seat support member 1003 is attached to attachment plate 3704.

The quick release assembly 3700 may also include a seat latch assembly 3800 to prohibit movement of seat support member 1003 relative to attachment plate 3704. The illustrated release assembly 3700 facilitates simple attachment and removal of the seat support member 1003 with the attachment plate 3704, and thus simple attachment and removal of seat assembly 102 with chassis 112 (FIG. 1). Many configurations of the seat latch assembly are possible. Referring to FIG. 37D, the illustrated latch assembly 3800 includes a housing 3802, a latch member 3804, a shaft 3806, an handle 3807, and a biasing mechanism 3820 (FIG. 37C). The latch member 3804 is coupled to the handle 3807 by the shaft 3806. The handle 3807 is pivotally connected to the tilt mechanism 1102 via the tilt mechanism shaft 1157. However, the handle 3807 may be pivotally mounted in any manner or the handle may be configured such that pulling of the handle causes the handle to move in translation. Pulling of the handle 3807 moves the shaft 3806 and attached latch member 3804 between extended or locked and retracted or unlocked positions.

Figure 37A:
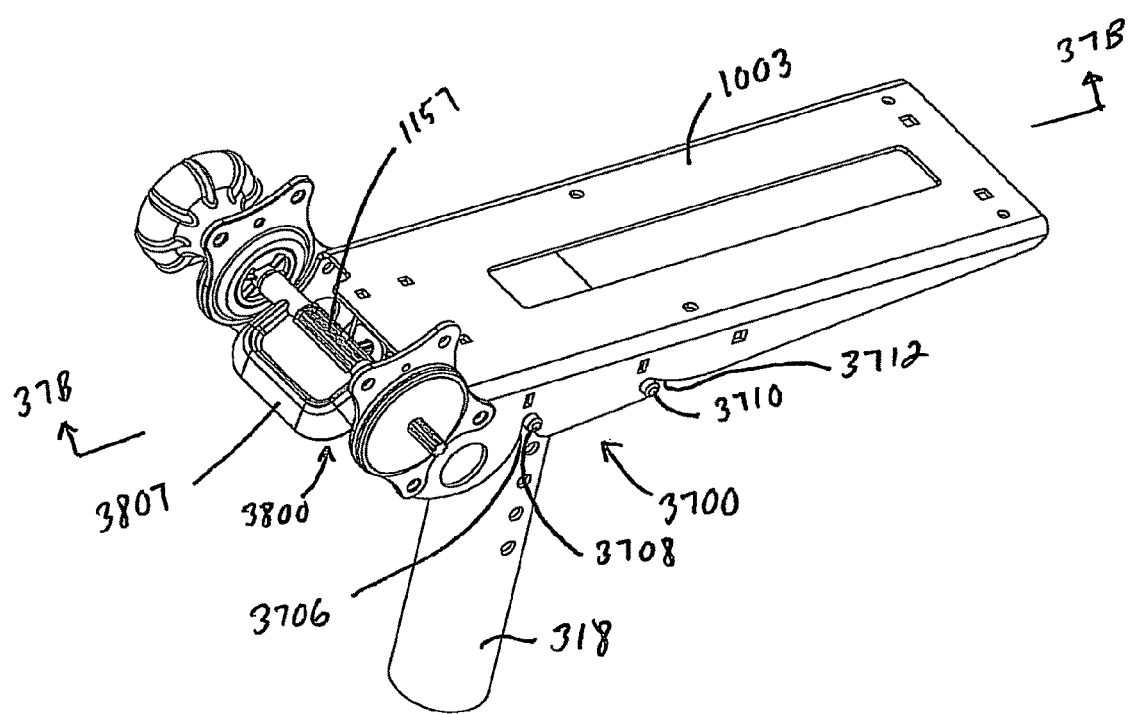
FIG. 37A is a perspective view of a quick release mechanism for a wheelchair seat.
Figure 37B:
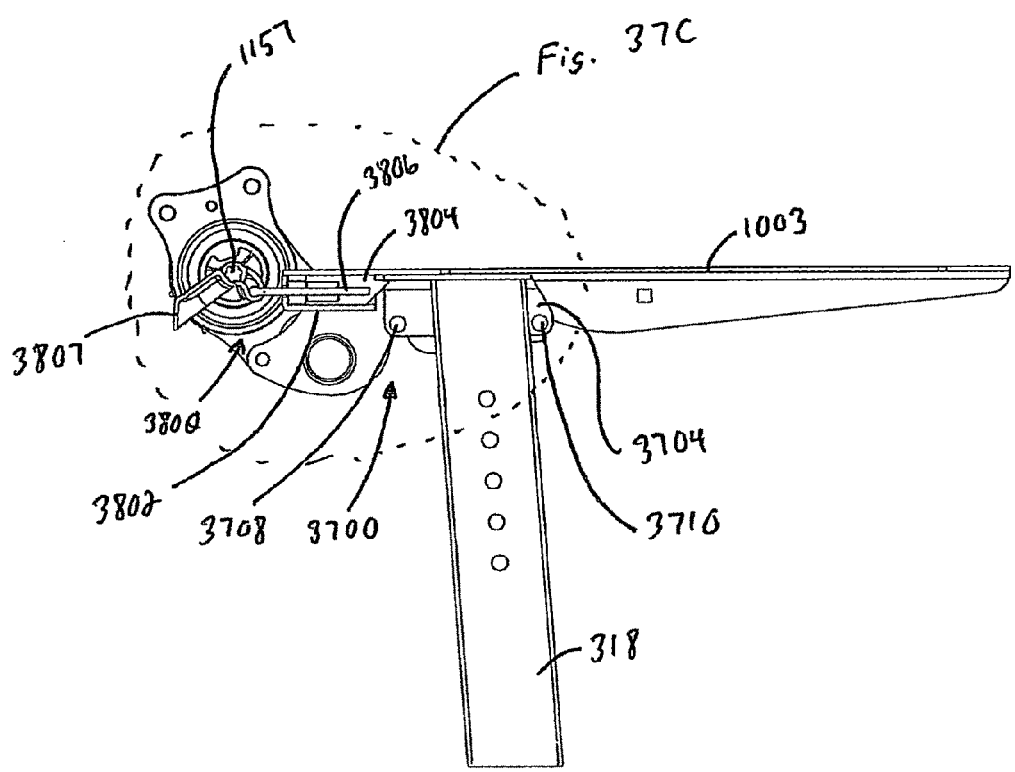
FIG. 37B is a sectional view taken along the plane indicated by lines 37B-37B in FIG. 37A.
Figure 37C:
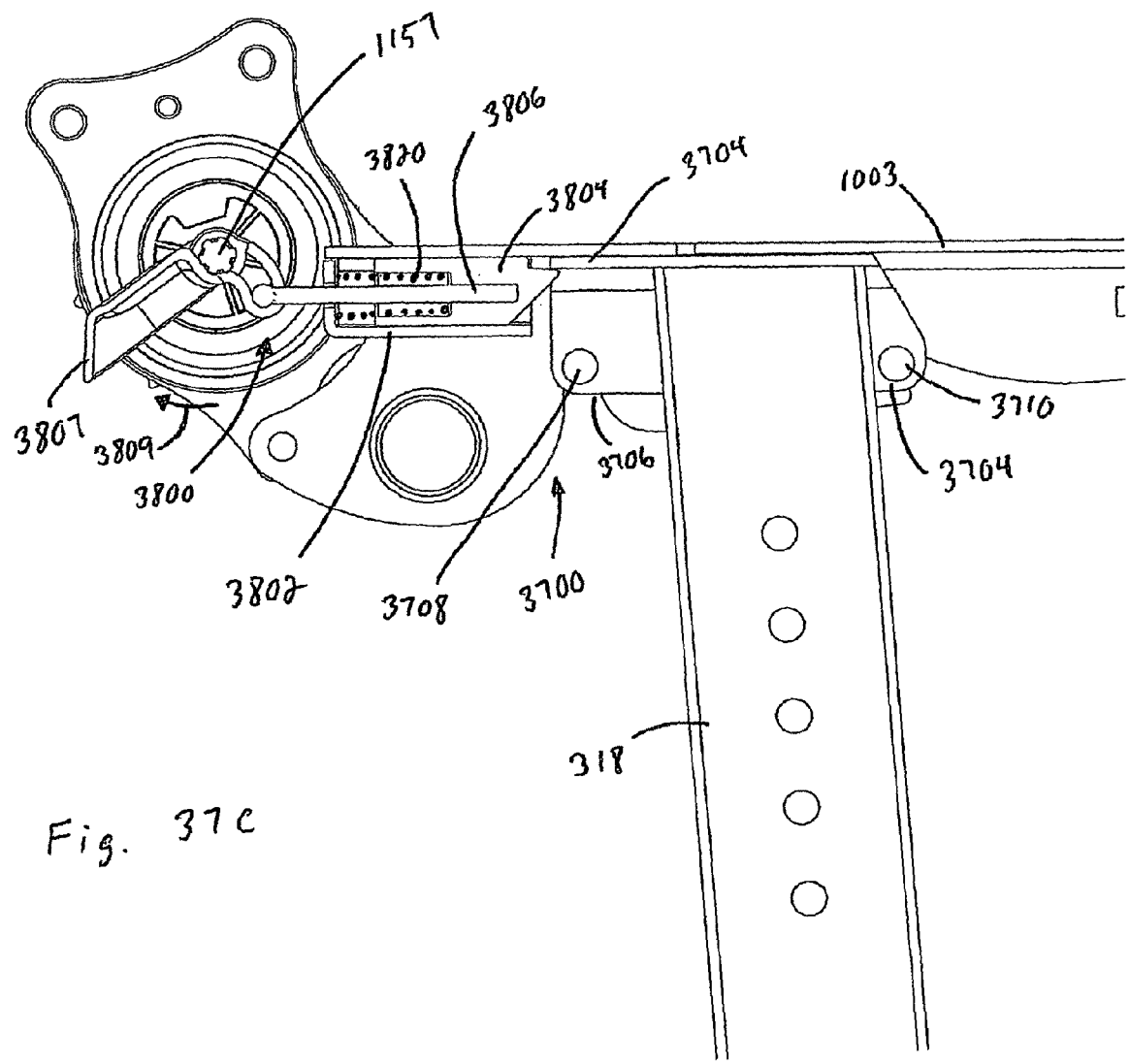
FIG. 37C is an enlarged view as indicated in FIG. 37B.
Figure 37D:
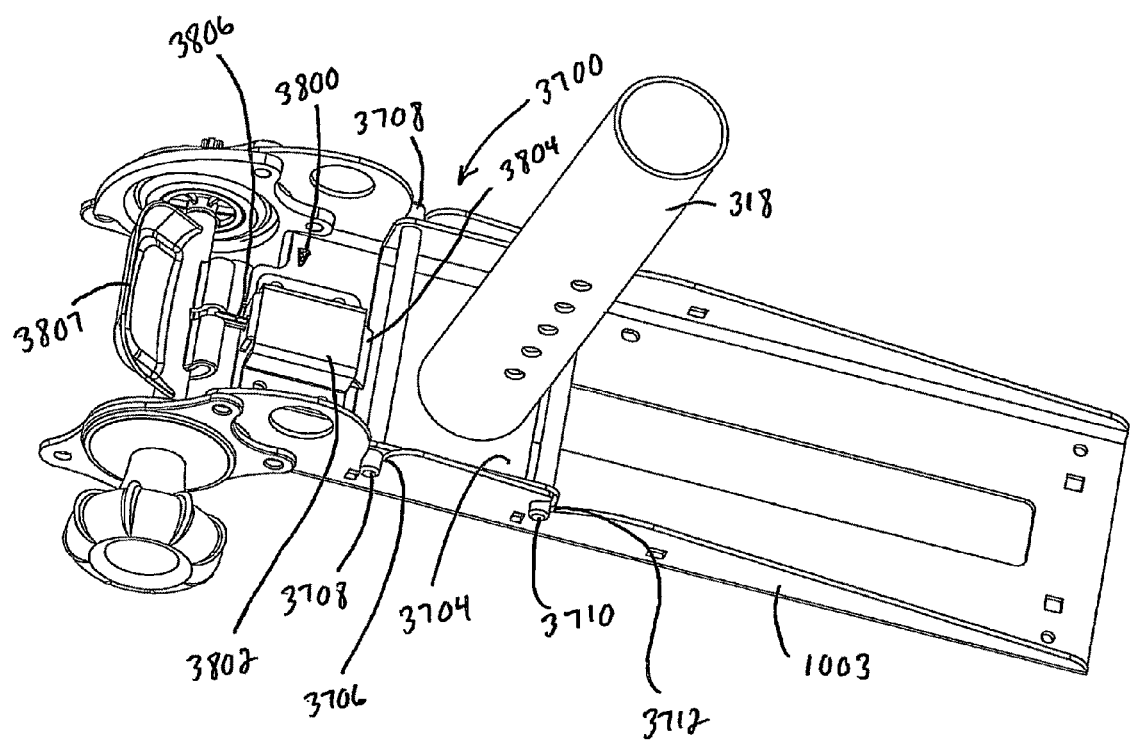
FIG. 37D is another perspective view of the quick release mechanism of FIG. 37A.
Figure 37E:
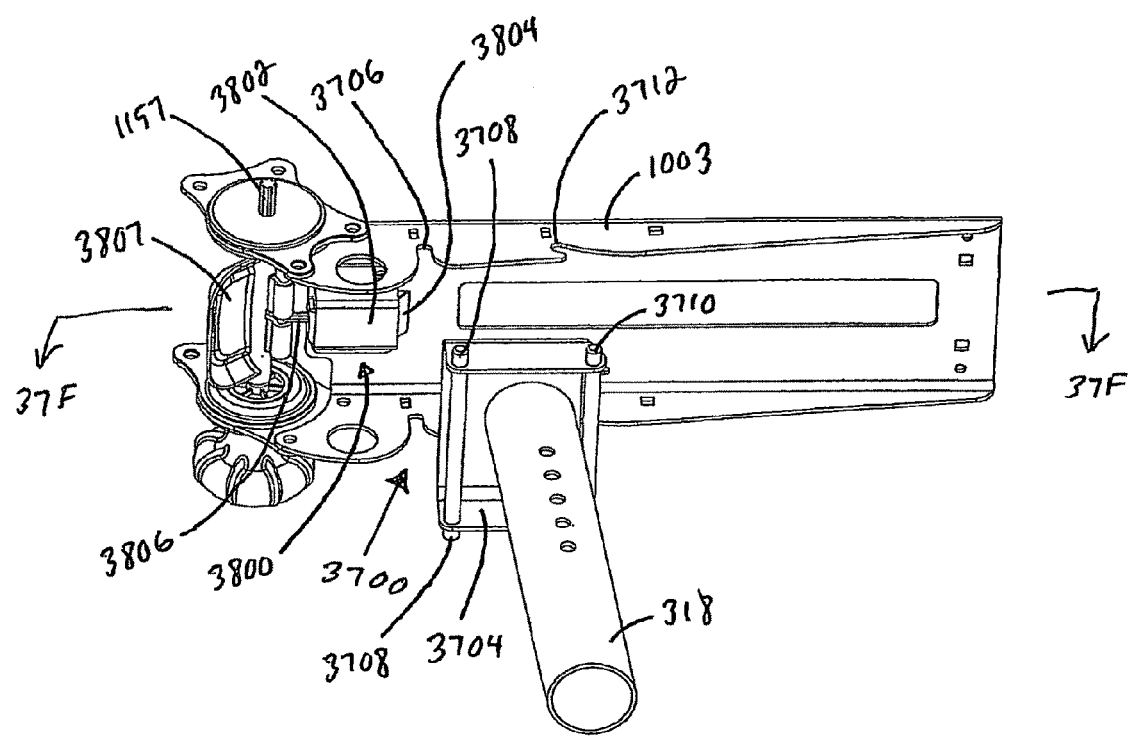
FIG. 37E is an exploded perspective view of the quick release mechanism of FIG. 37A.
Figure 37F:
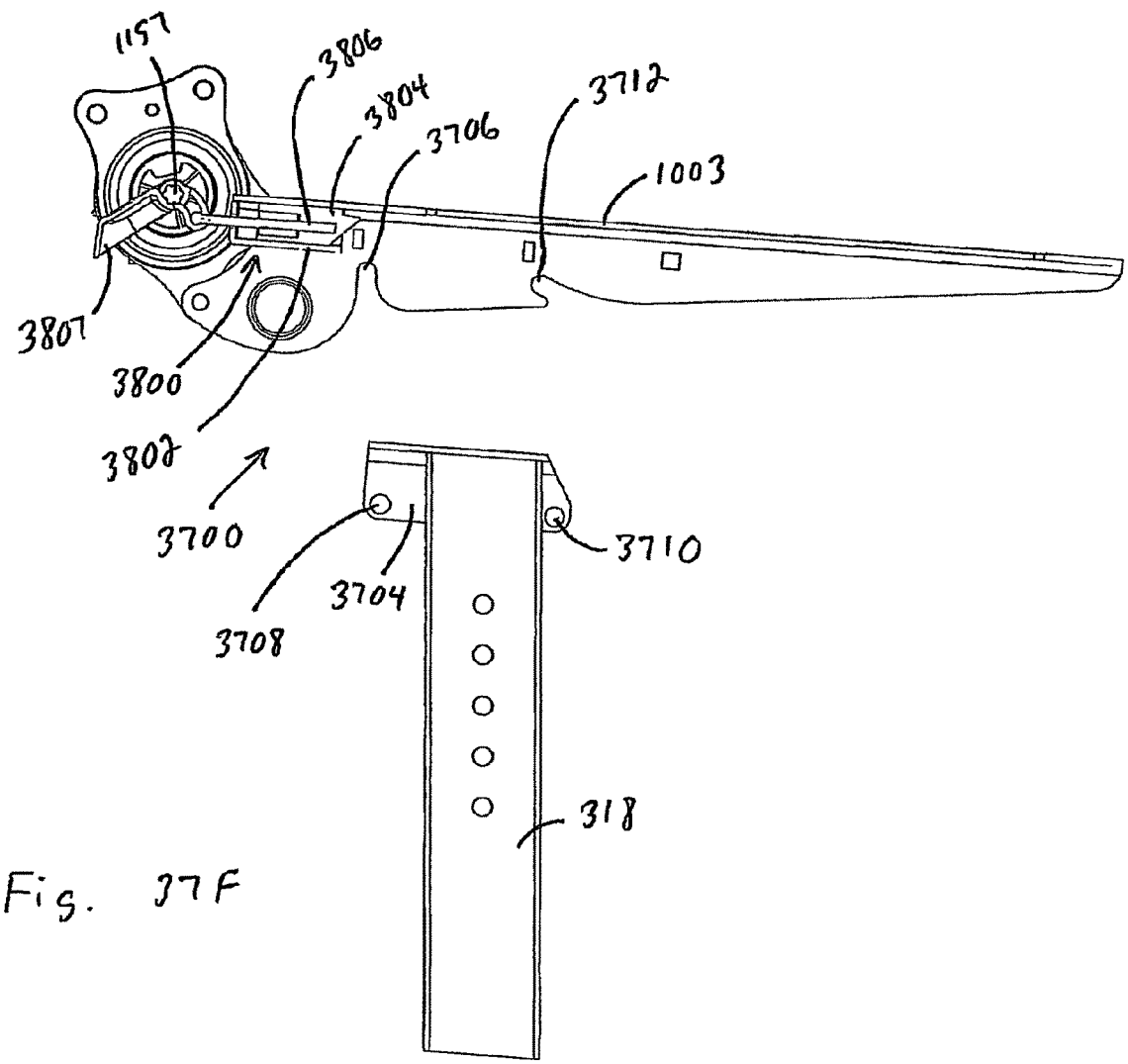
FIG. 37F is an exploded sectional view taken along the plane indicated by lines 37B-37B in FIG. 37A.
Figure 37G:
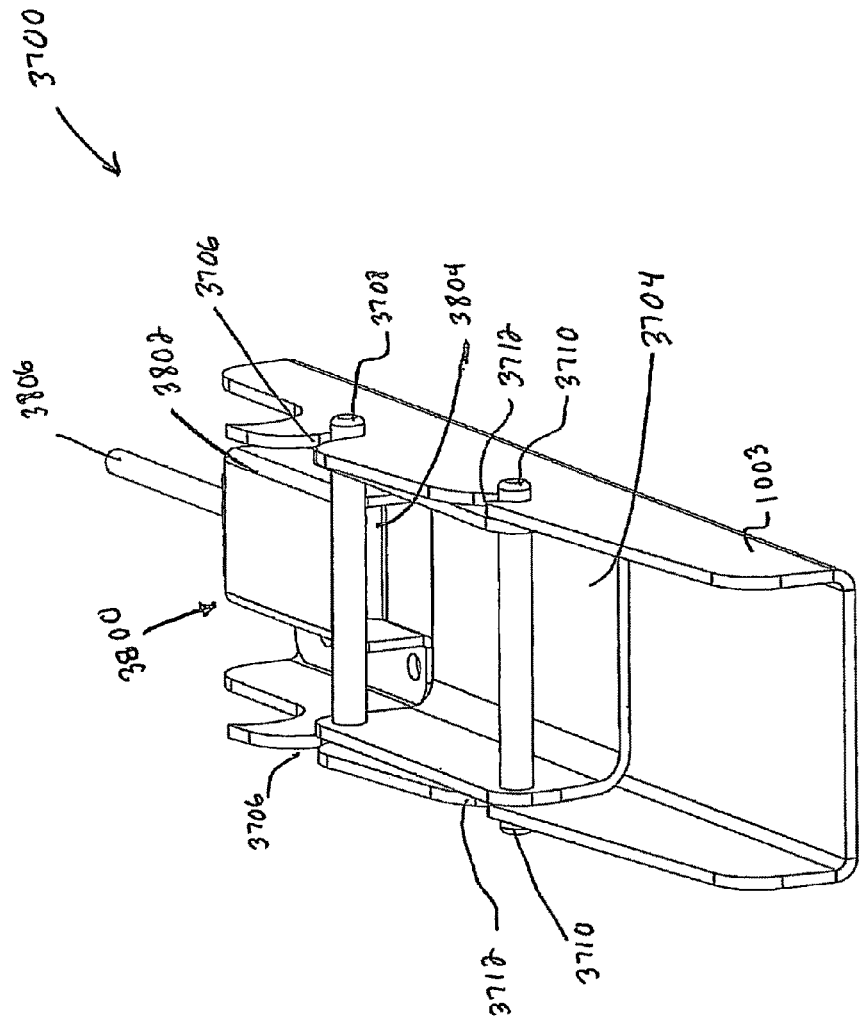
FIG. 37G is a perspective view of the quick release mechanism of FIG. 37A in a released condition.

FIGS. 37E and 37G are bottom perspective views of the quick release assembly 3700. In FIG. 37G, latch member 3804 is in a retracted or unlocked position and does not engage the attachment plate 3704. In FIG. 37E, the latch member 3804 is in an extended or locked position and engages the attachment plate 3704 to prohibit movement of seat support member 1003 relative to the attachment plate 3704.

FIGS. 37B and 37C are side elevational cross sectional views of the quick release assembly 3700 with the latch member 3804 in the extended or locked position. As shown in FIG. 37C, the biasing mechanism 3820 biases latch member 3804 into the extended position such that the tip of the latch member engages the edge of the attachment plate 3704. In this position, seat support member 1003 is prohibited from rotating upward or otherwise moving relative to attachment plate 3704. The seat support member 3702 may be released and permitted to rotate upward relative to attachment plate 3704 by rotating the handle 3807 as indicated by arrow 3809, which pulls the latch member 3804 against the biasing force of the biasing mechanism 3820 away from the attachment plate 3704. This unlocks the seat from the base. The illustrated biasing mechanism 3820 is a spring. However, other biasing mechanisms may be used with latch assembly 3800, such as an elastomeric material or compressible fluid. In some embodiments, no biasing mechanism is used, e.g., the latch member may be fixed in the extended and/or retracted position with the use of pin or other fastener.

Figure 37H:
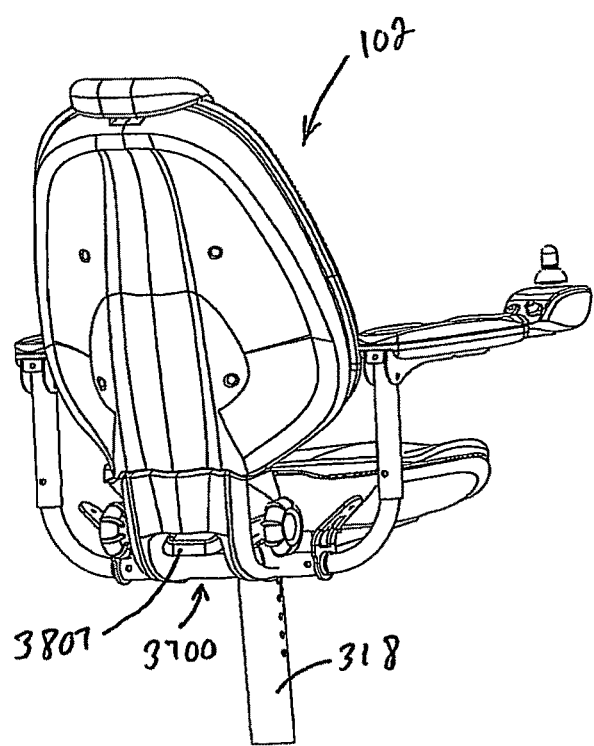
FIG. 37H is a perspective view of a seat assembly, showing a location of a handle of the quick release mechanism shown in FIG. 37A.
Figure 38A:
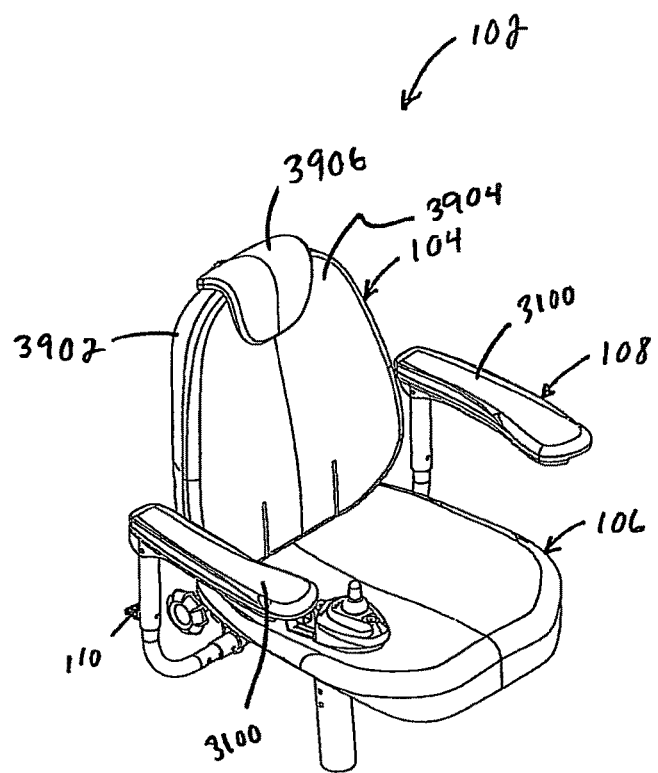
FIG. 38A is a perspective view of an exemplary embodiment of a seat assembly.
Figure 38B:
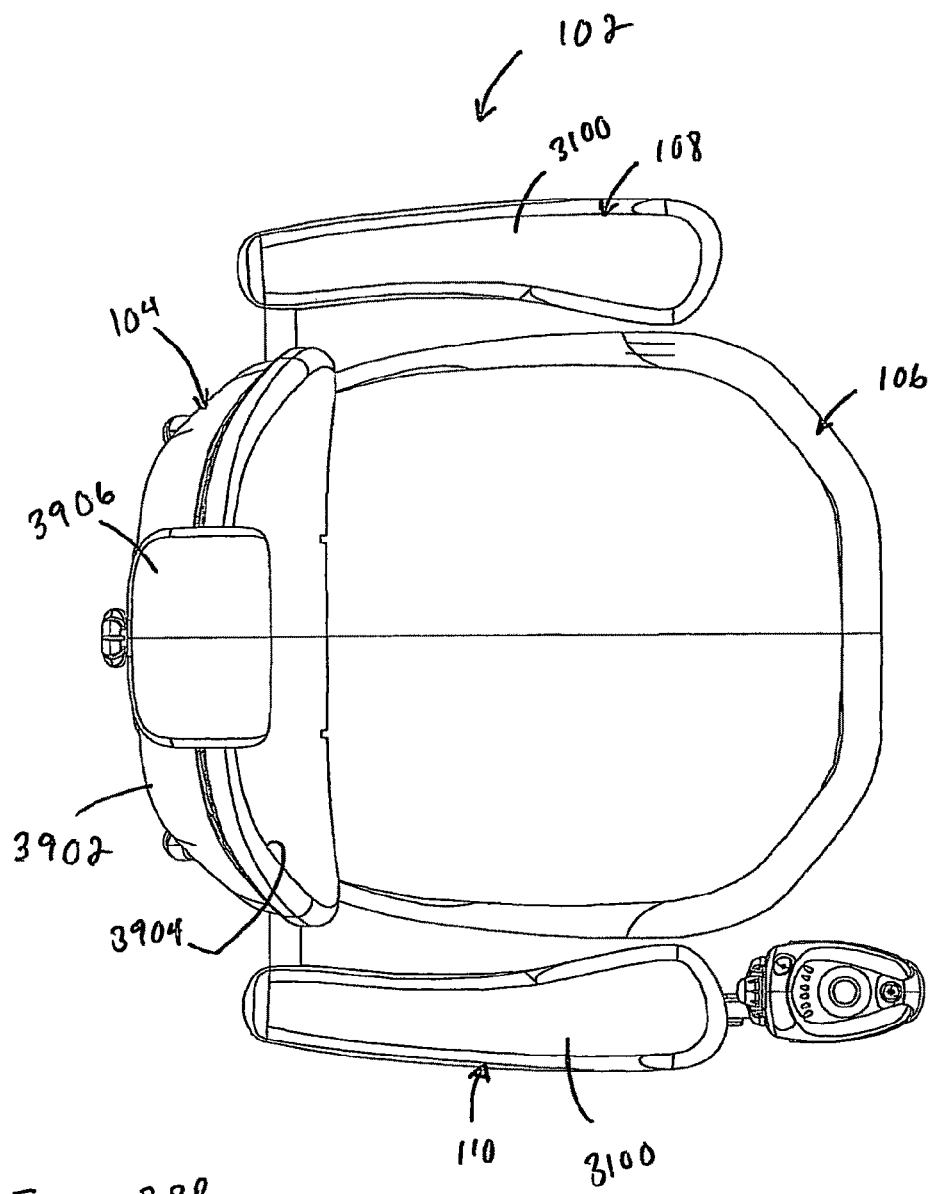
FIG. 38B is a top view of the seat assembly of FIG. 38A.
Figure 38C:
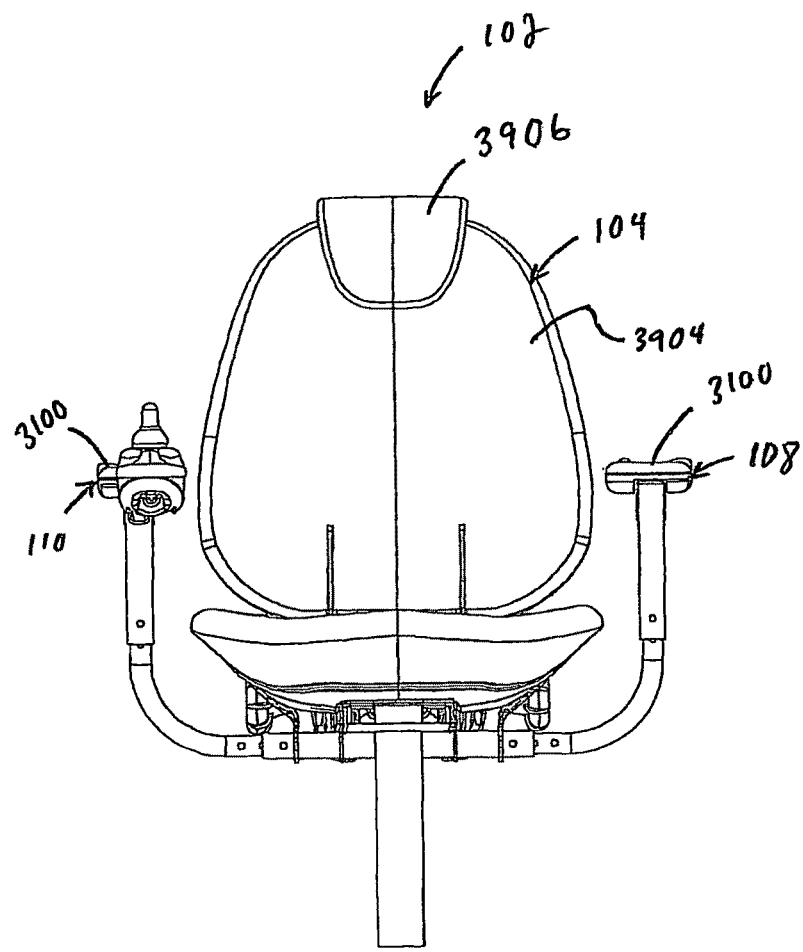
FIG. 38C is a front view of the seat assembly of FIG. 38A.
Figure 38D:
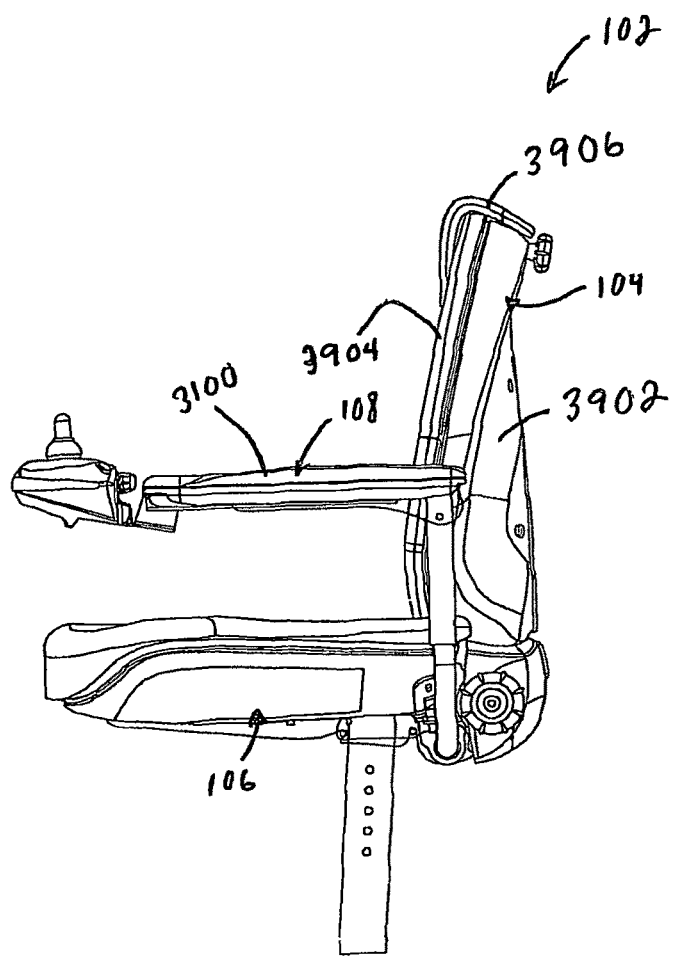
FIG. 38D is a front view of the seat assembly of FIG. 38A.

FIG. 37H illustrates that the handle 3807 is conveniently located at the center/back of the seat assembly 102. To release the seat assembly 102 from the chassis 112 (FIG. 1), the user simply pulls the handle 3807 to release the latch assembly 3800. The user then pivots the seat assembly 102 forward to remove the bosses 3708 from the slots 3706 and lifts the seat assembly 102 to remove the bosses 3710 from the slots 3712. To assemble the seat assembly 102 to the chassis 112, the bosses 3710 are placed in the slots 3712 and the seat is pivoted down such that the bosses 3708 are placed in the slots 3706. The angled tip of the latch member 3804 is pressed outward by engagement with the attachment plate 3704 and moves outward past the engagement plate against the force applied by the biasing member 3820. Once the latch member 3804 clears the attachment plate 3704, the biasing member 3820 returns the latch member 3804 to the locked position to secure the seat assembly 102 to the chassis 112.

Figure 39A:
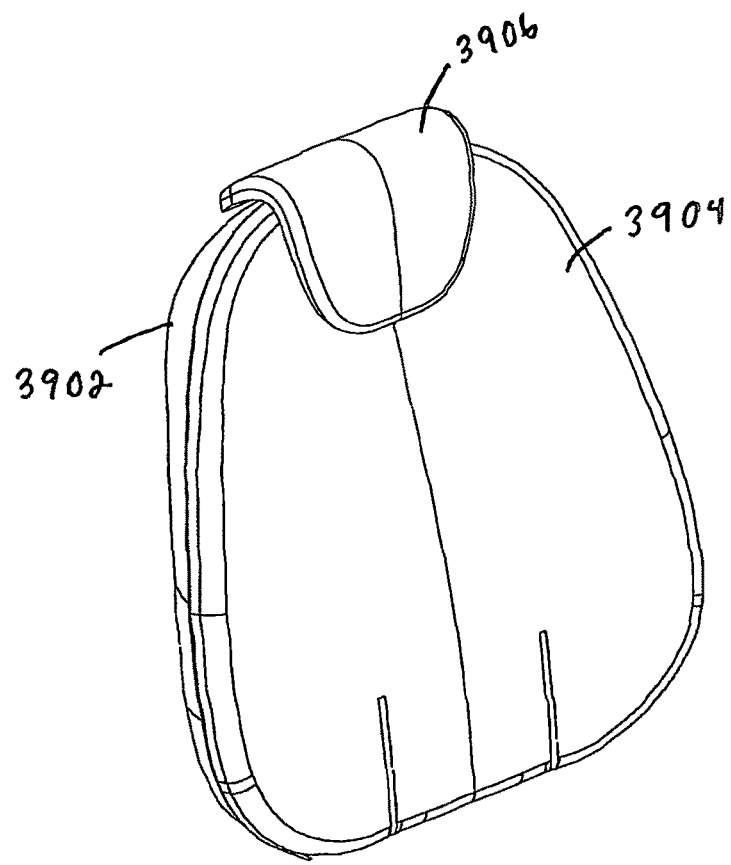
FIG. 39A is a perspective view of a seat back.
Figure 39B:
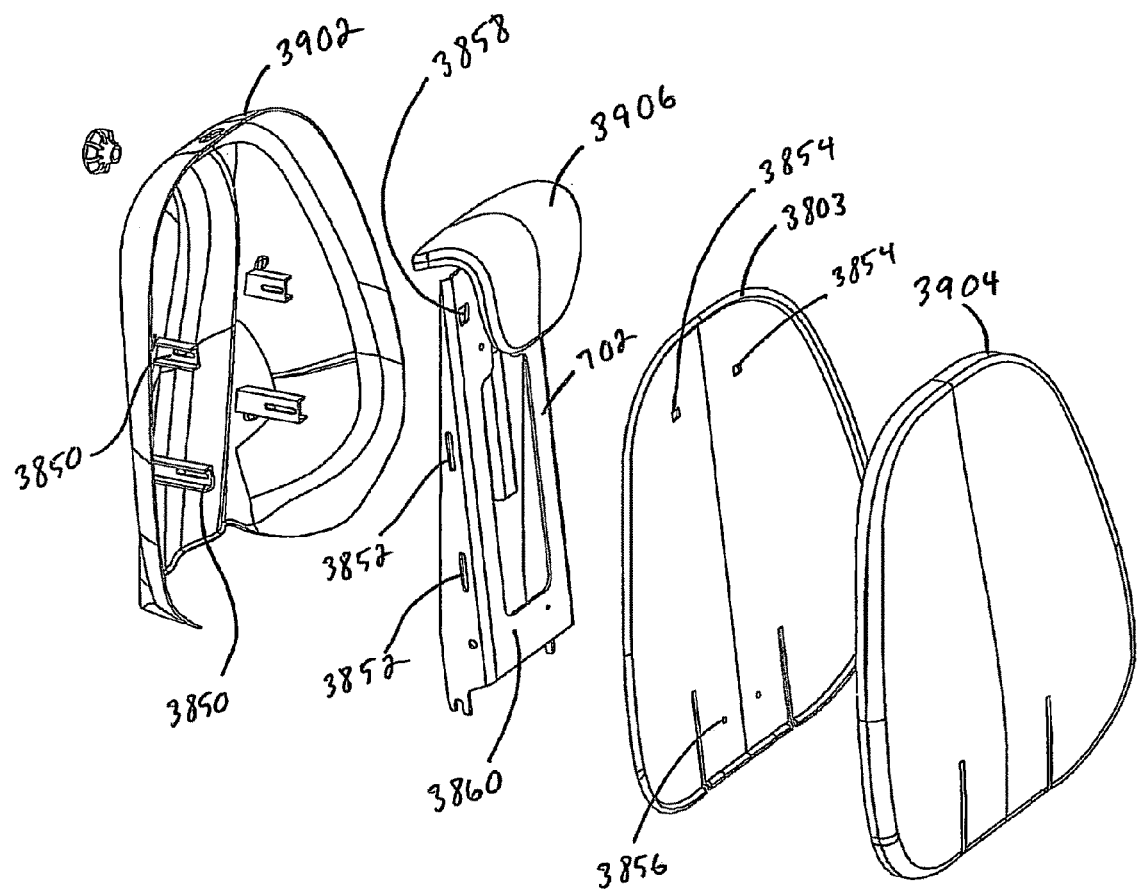
FIG. 39B is an exploded perspective view of the seat back of FIG. 39A.
Figure 39C:
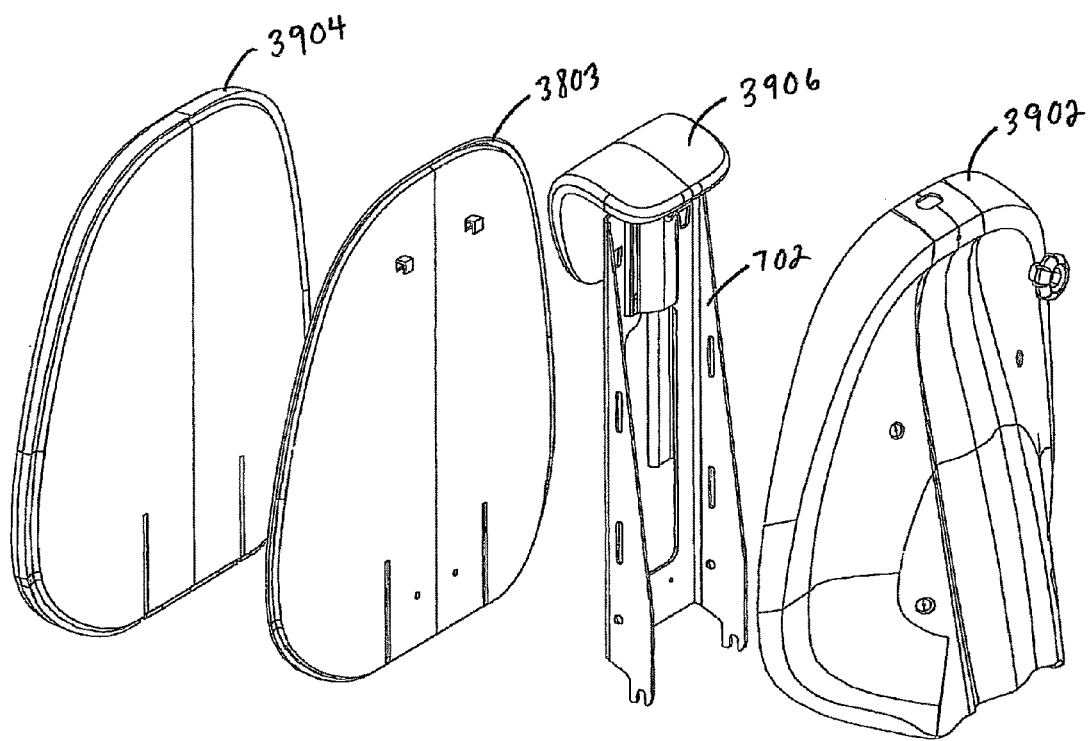
FIG. 39C is an exploded perspective view of the seat back of FIG. 39A.

The seat back 104, seat bottom 106, and armrest assemblies 108, 110 can take a wide variety of different forms. FIG. 38A-38D illustrates another embodiment of a seat assembly 102. In this embodiment, the seat back 104 includes a seat back rear cover 3902, a seat back cushion support 3803, a seat back cushion 3904, and a headrest 3906. FIGS. 39A-39C illustrate that the seat back rear cover 3902, the seat back cushion support 3803, the seat back cushion 3904, and the headrest 3906 are connected to the back support member 702 (FIG. 39B) in one exemplary embodiment. As such, the seat back rear cover 3902, the seat back cushion support 3803, the seat back cushion 3904, and the headrest 3906 are adjustable and foldable by the seat adjustment and folding assembly 600 as described above.

The seat back rear cover 3902 and the seat back cushion support 3803 may be connected to the back support member 702 in a variety of different ways. In the example illustrated by FIG. 39B, the seat back rear cover 3902 includes integrally molded tabs 3850 that align with slots 3852 in the back support member 702. This embodiment may provide "blind mounting" of the rear cover 3902 (i.e. no fasteners extend through the seat back rear cover 3902). The seat back cushion support 3803 includes tabs 3854 that fit in notches 3858 in the back support member 702 and holes 3856 that mate with holes 3860 in the back support member 702. However, any manner of connecting the seat back rear cover 3902 and/or the cushion support member 3803 to the back support member 702 can be used. For example, the tabs 3850 may be replaced by brackets that connect to the seat back rear cover 3902 and the back support member 702 and/or fasteners that extend through the rear cover 3902, the support member 702, and/or the cushion support member 3803 can be used.

Figure 40A:
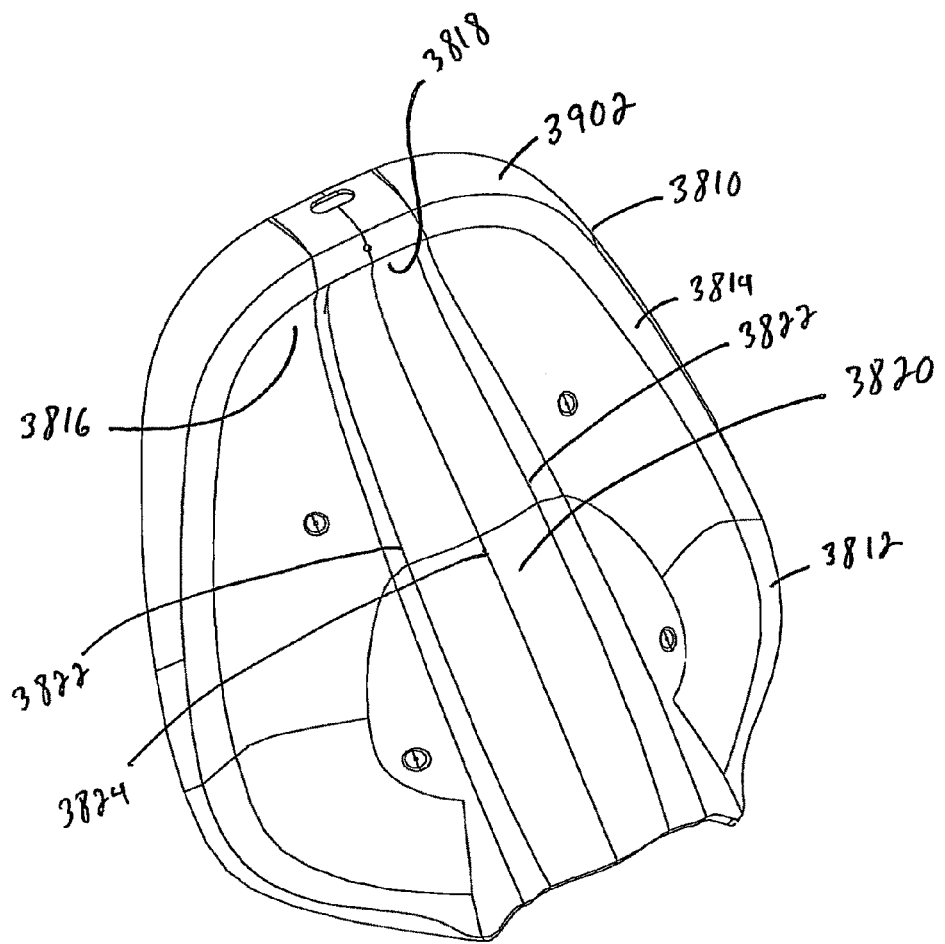
FIG. 40A is a perspective view of a seat back cover.
Figure 40B:
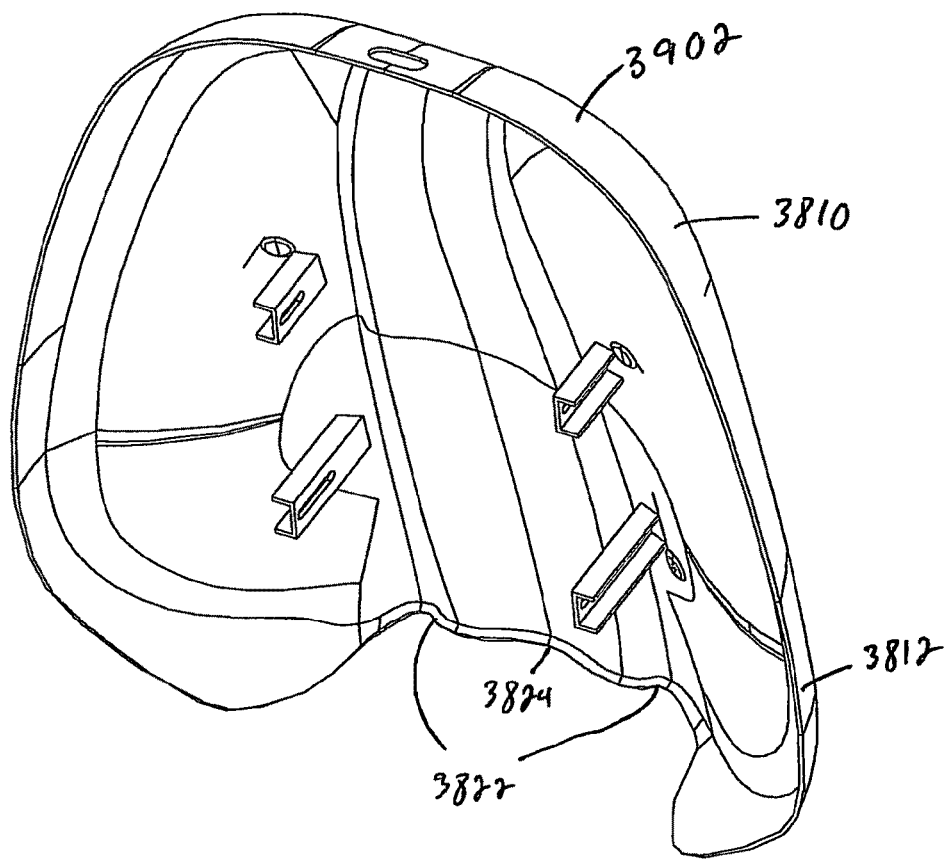
FIG. 40B is another perspective view of the seat back cover of FIG. 40A.
Figure 40C:
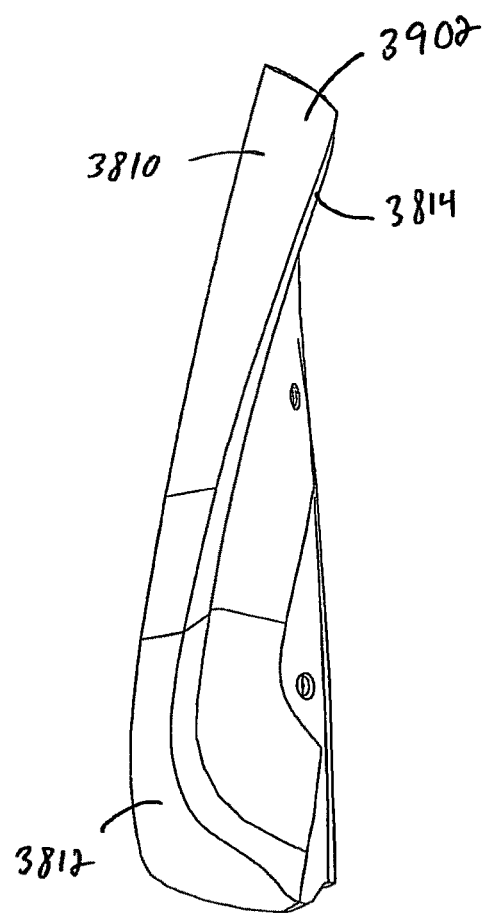
FIG. 40C is a side view of the seat back cover of FIG. 40A.
Figure 40:
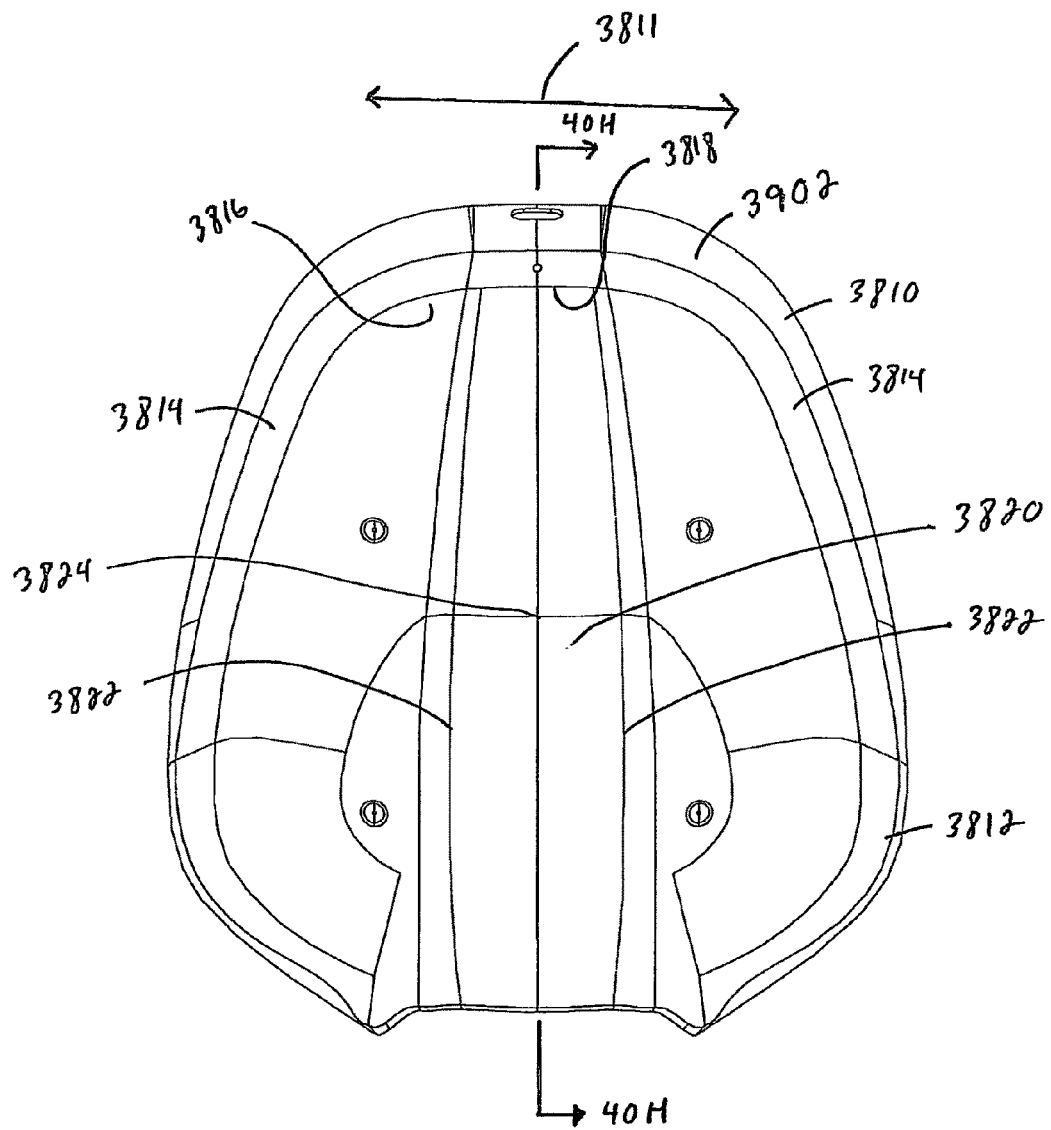
FIG. 40D is a rear view of the seat back cover of FIG. 40A.
FIG. 40E is a front view of the seat back cover of FIG. 40A.
FIG. 40F is a top view of the seat back cover of FIG. 40A.
FIG. 40G is a bottom view of the seat back cover of FIG. 40A.
FIG. 40H is a sectional view taken along the plane indicated by lines 40H-40H in FIG. 40D.
Figure 40E:
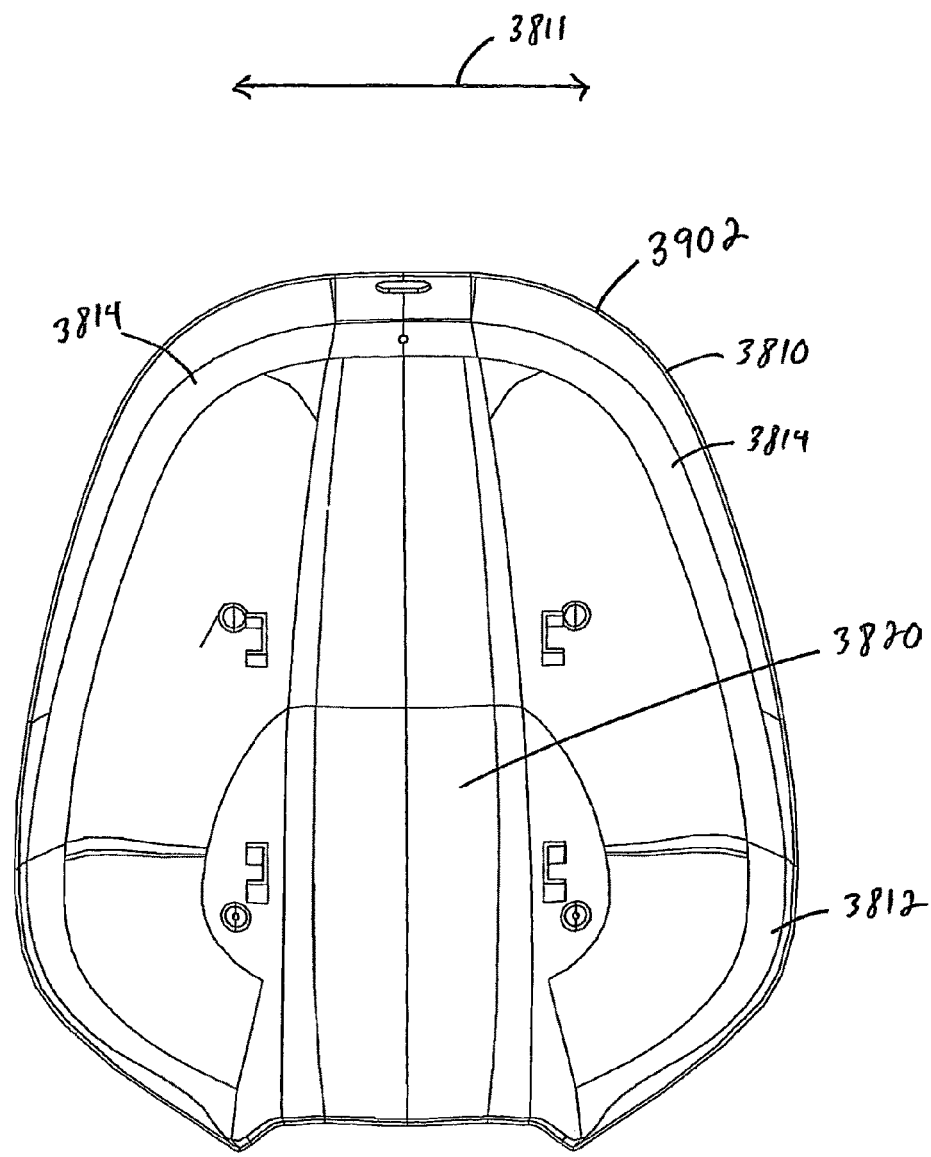
Figure 40F:
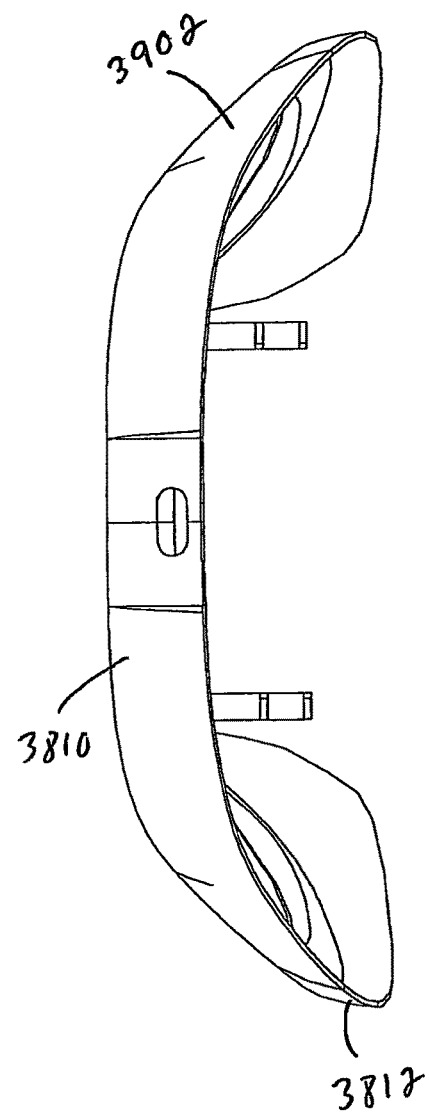
Figure 40G:
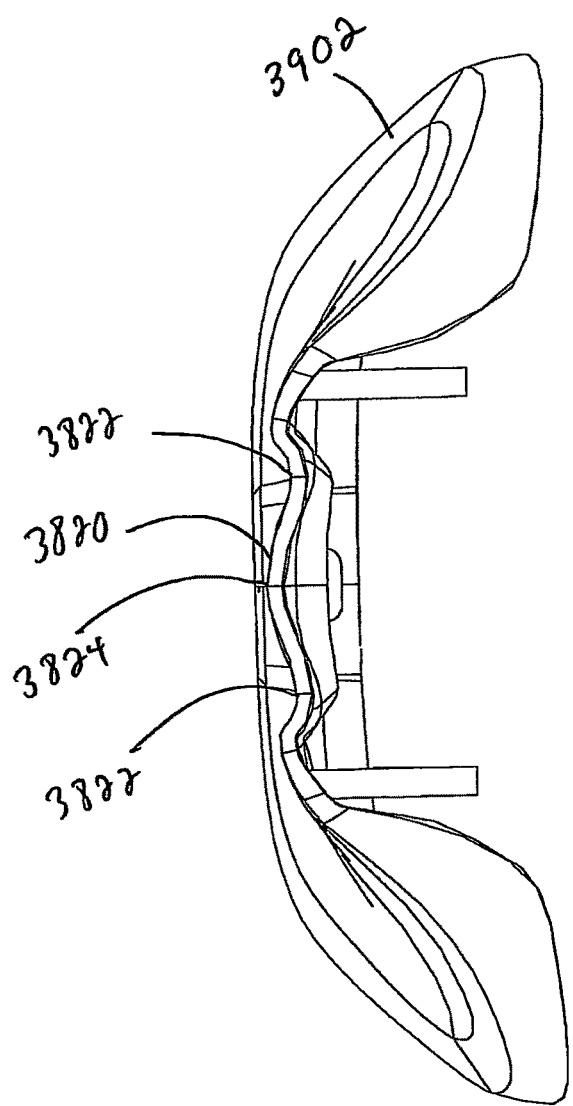
Figure 40H:
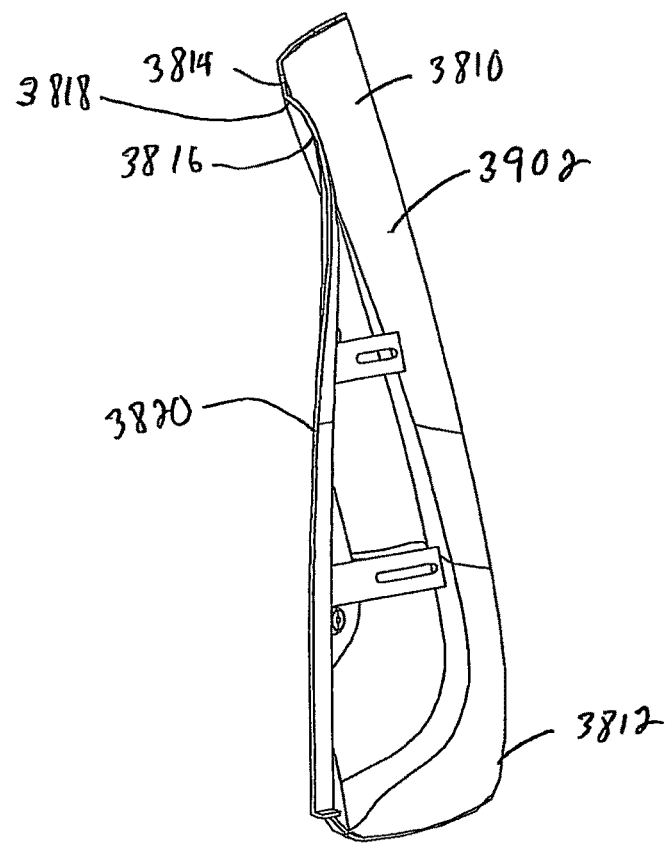

The seat back rear cover 3902 can take a wide variety of different forms. In the embodiment illustrated by FIGS. 40A-40H, the seat back rear cover 3902 is a molded plastic piece. Referring to FIG. 40D, an upper end 3810 of the seat back rear cover 3902 is narrower in the direction indicated by arrows 3811 than a lower end 3812. The seat back rear cover 3902 includes a rim 3814 around its periphery and includes a recess 3816 adjacent to the rim. The rim 3814 and the recess 3816 are most pronounced at the upper end 3810 and gradually diminish toward the lower end 3812. The pronounced rim 3814 and recess 3816 at the top of the seat back support member 3902 serve as a push handle 3818 when the chair is to be manually pushed or positioned. A vertically extending, elongated contour 3820 extends from the rim 3814 at the upper end 3810 to the lower end 3811 of the seat back rear cover 3902. The contour 3820 comprises a pair of spaced apart, symmetrical curved depressions 3822 that smoothly transition to a curved central ridge 3824. Outer edges of the of the curved depressions 3822 are substantially aligned with a central peak of the curved central ridge 3824.

Figure 41A:
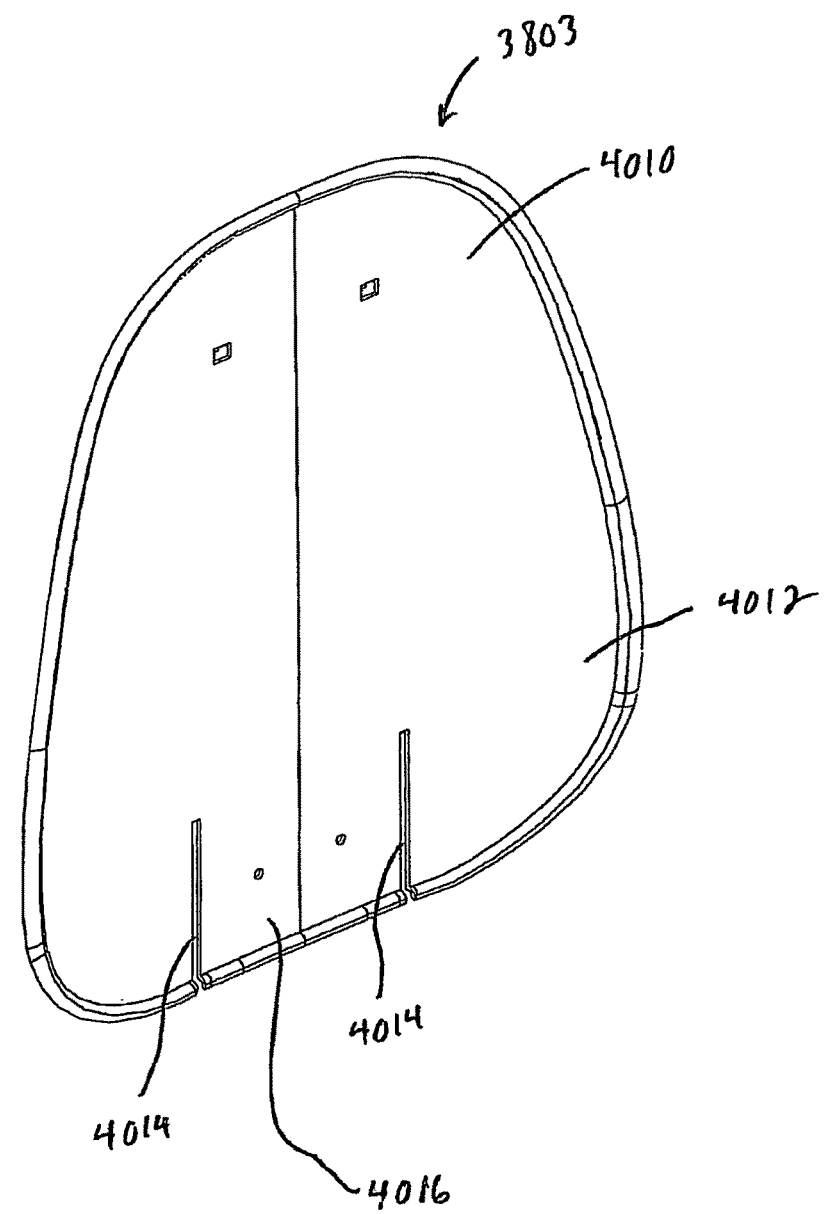
FIG. 41A is a perspective view of a seat back cushion support member.
Figure 41B:
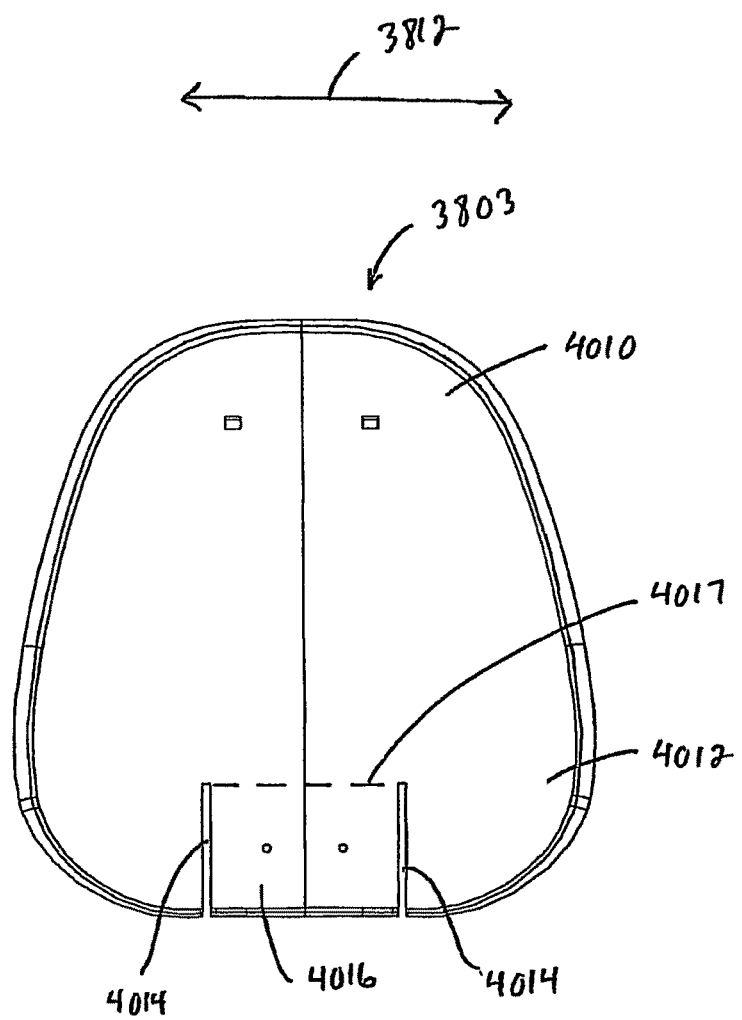
FIG. 41B is a front view of the seat back cushion support member of FIG. 41A.
Figure 41C:
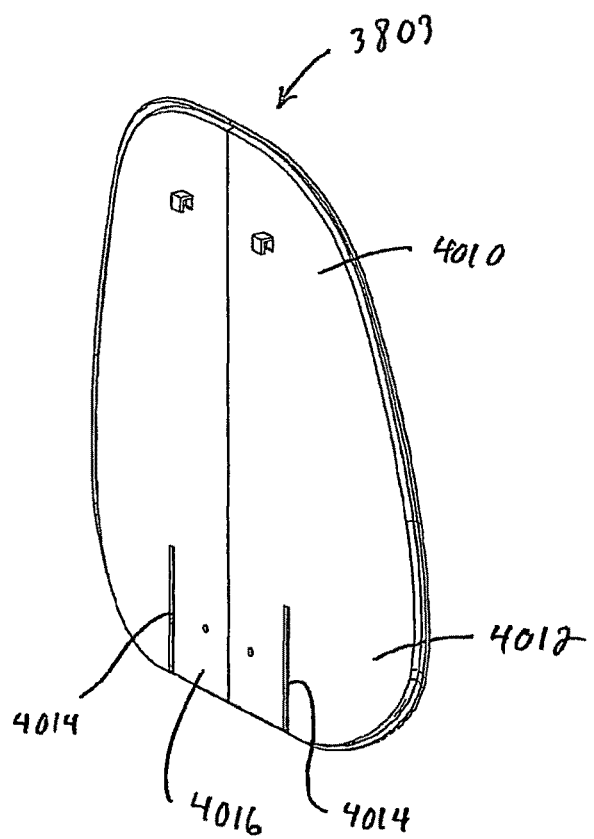
FIG. 41C is another perspective view of the seat back cushion support member of FIG. 41A.

The seat back cushion support 3803 can take a wide variety of different forms. In the embodiment illustrated by FIGS. 41A-41C, the seat back cushion support comprises a molded plastic member. However, any material may be used. The contour of the seat back cushion support 3803 substantially matches the forward facing contour of the seat back rear cover 3902. As such, the illustrated seat back cushion support 3803 has an upper end 4010 that is narrower in the direction indicated by arrows 3812 (FIG. 41B) than a lower end 4012.

Figure 42A:
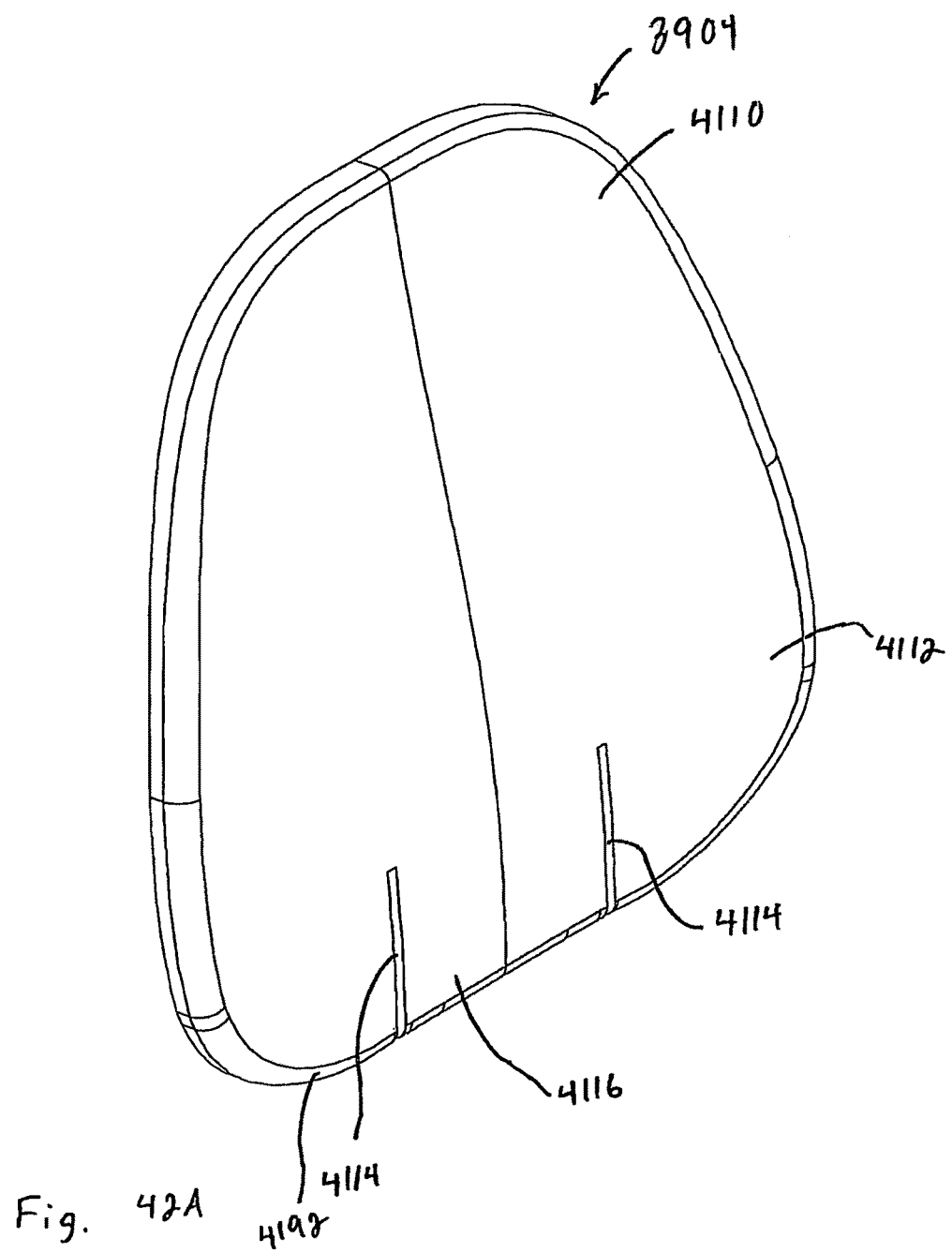
FIG. 42A is a perspective view of a seat back cushion.
Figure 42B:
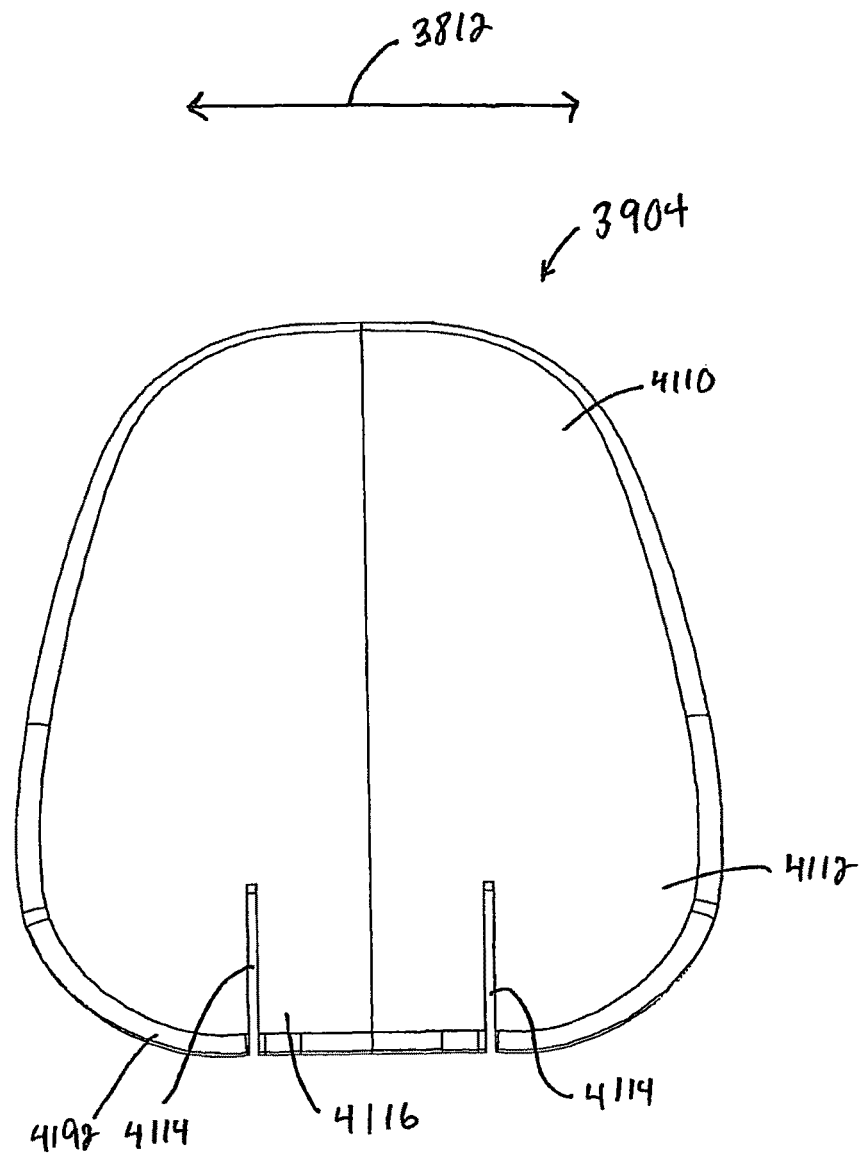
FIG. 42B is a front view of the seat back cushion of FIG. 42A.

The seat back cushion 3904 can take a wide variety of different forms. In the embodiment illustrated by FIGS. 42A and 42B, the seat back cushion 3904 comprises a molded foam piece with a fabric cover. However, any material may be used. The contour and shape of the seat back cushion 3904 substantially matches the contour and shape of the seat back cushion support 3803. As such, the illustrated seat back cushion 3810 has an upper end 4110 that is narrower in the direction indicated by arrows 3812 (FIG. 42B) than a lower end 4012.

In the illustrated embodiment, the lower ends 4012 and 4112 of the seat back cushion support 3803 and the seat back cushion 3904 extend downward far enough to prevent exposure to components of the adjustment and folding mechanism 600, regardless of the position of the seat bottom 106. For example, the seat back cushion 3904 may extend downward to a position just above the seat bottom 106, to the seat bottom, or past the seat bottom.

Figure 43A:
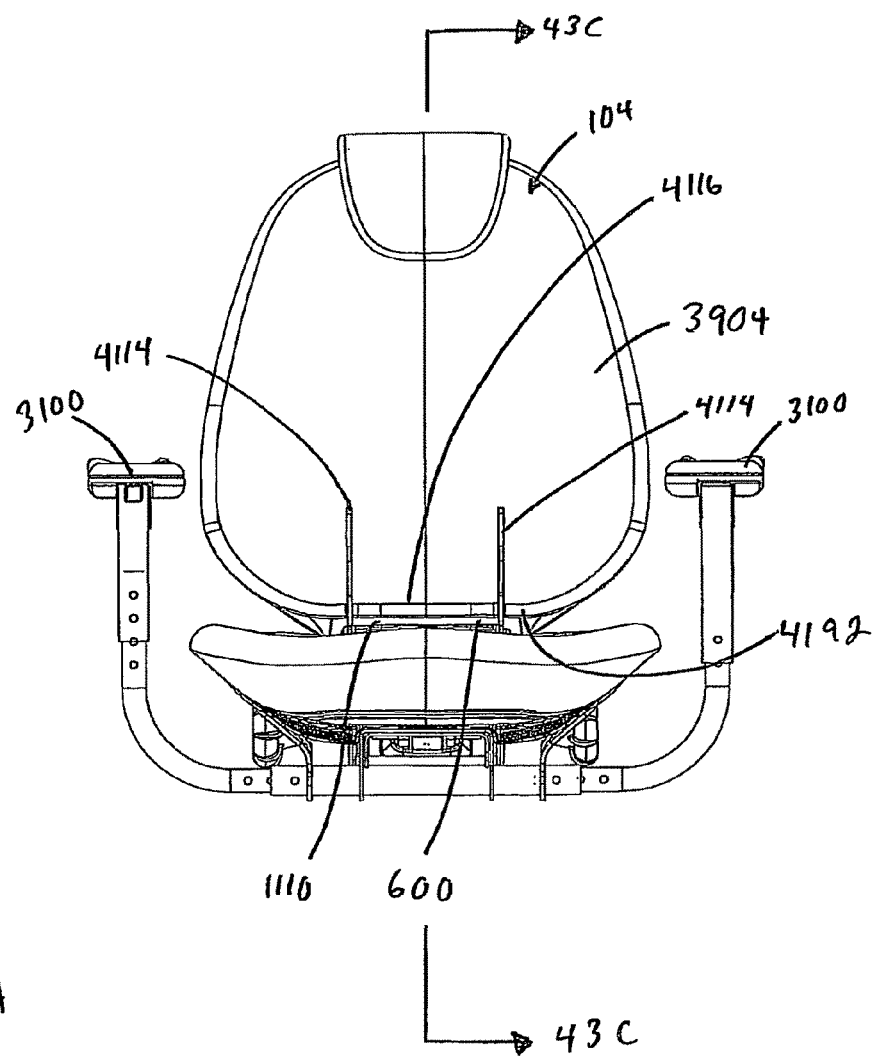
FIG. 43A is a front view of a seat assembly with a seat back raised for folding.
Figure 43B:
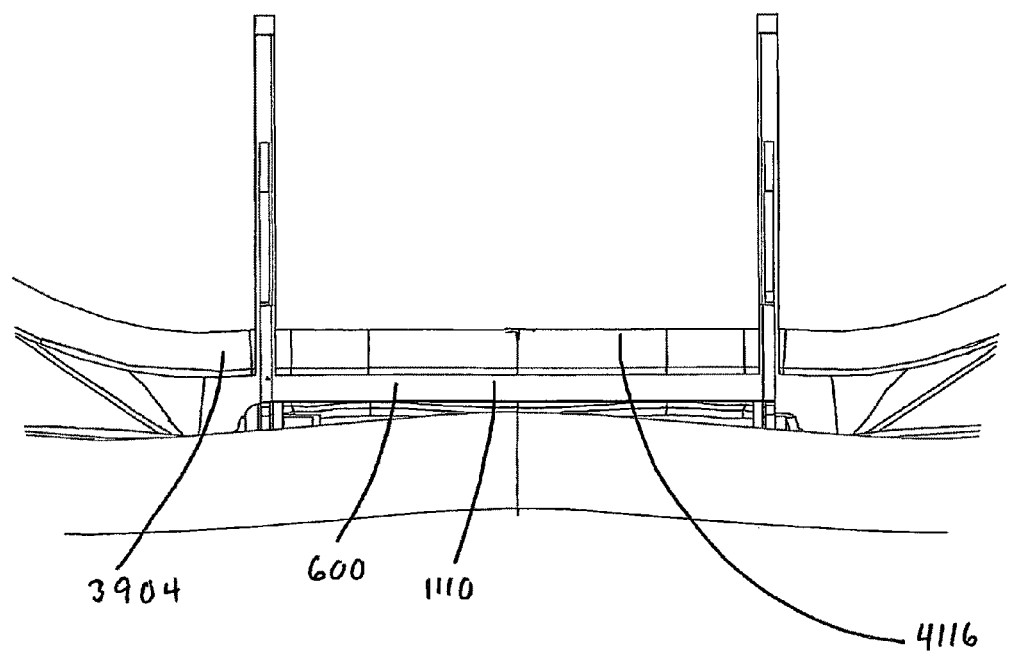
FIG. 43B is an enlarged view as indicated in FIG. 43A.
Figure 43C:
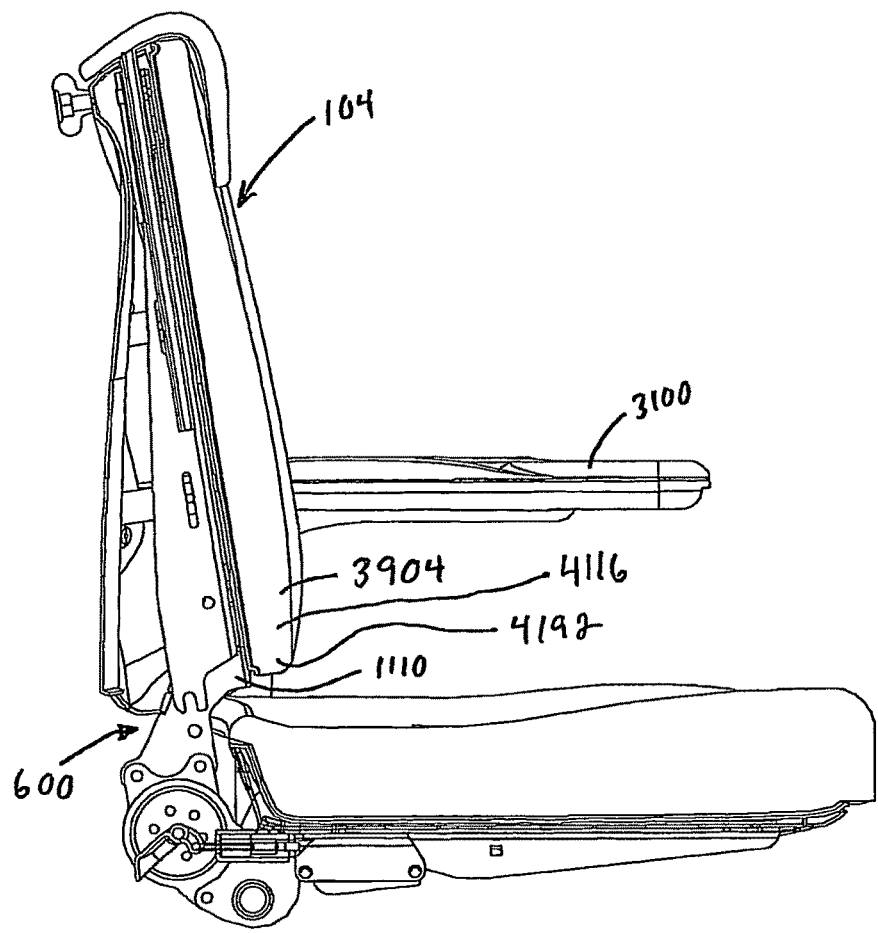
FIG. 43C is a sectional view taken along the plane indicated by lines 43C-43C in FIG. 43A.
Figure 44A:
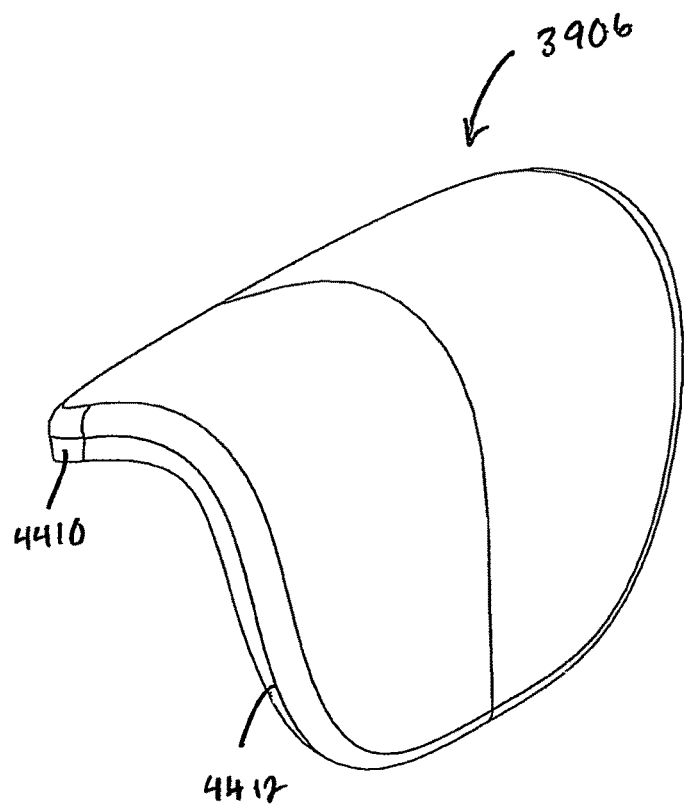
FIG. 44A is a perspective view of an exemplary embodiment of a headrest.
Figure 44B:
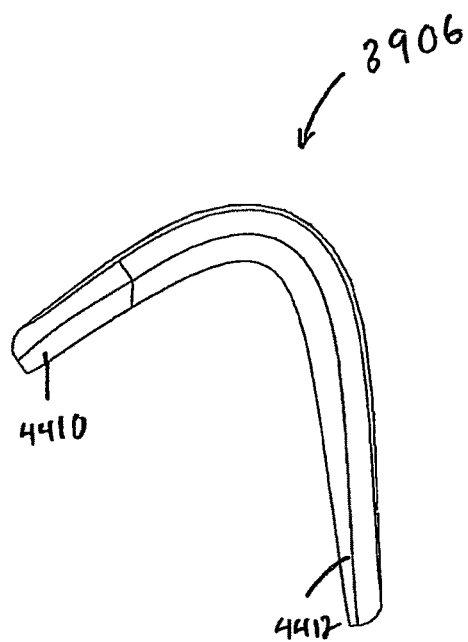
FIG. 44B is a side view of the headrest of FIG. 44A.
Figure 44C:
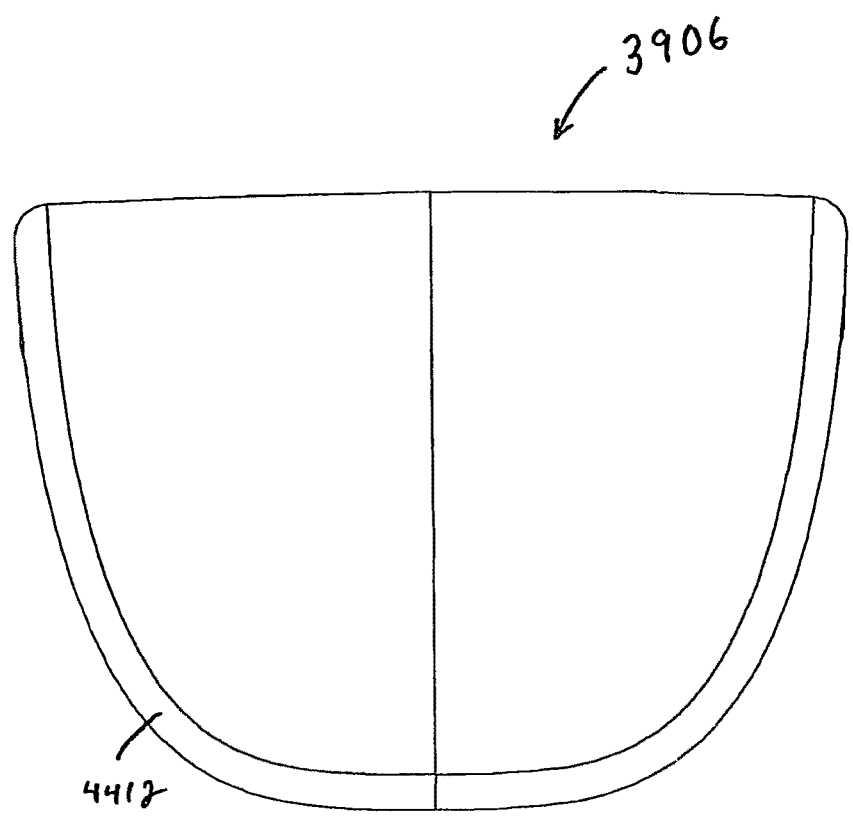
FIG. 44C is a front view of the headrest of FIG. 44A.
Figure 44:
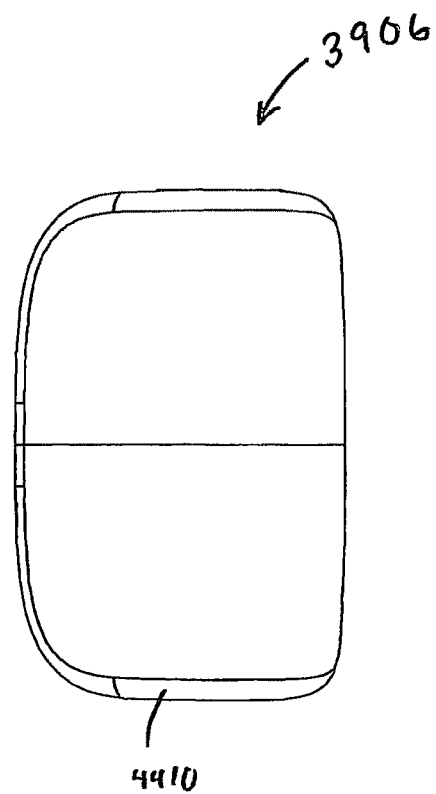
FIG. 44D is a top view of the headrest of FIG. 44A.
FIG. 44E is a rear view of the headrest of FIG. 44A.
FIG. 44F is a bottom view of the headrest of FIG. 44A.
Figure 44E:
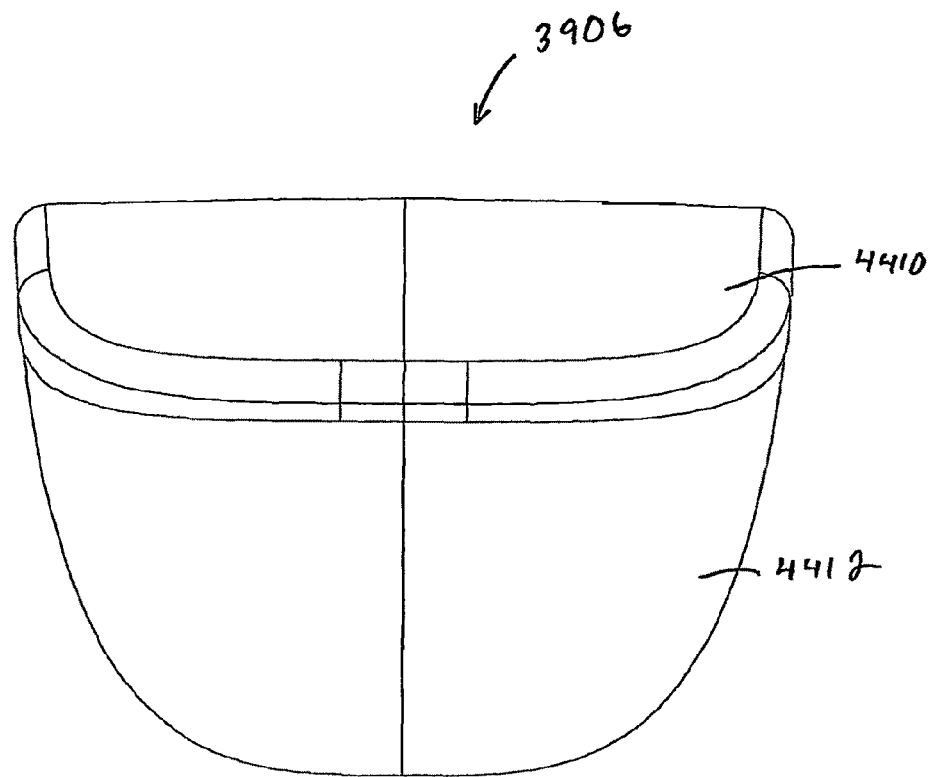
Figure 44F:
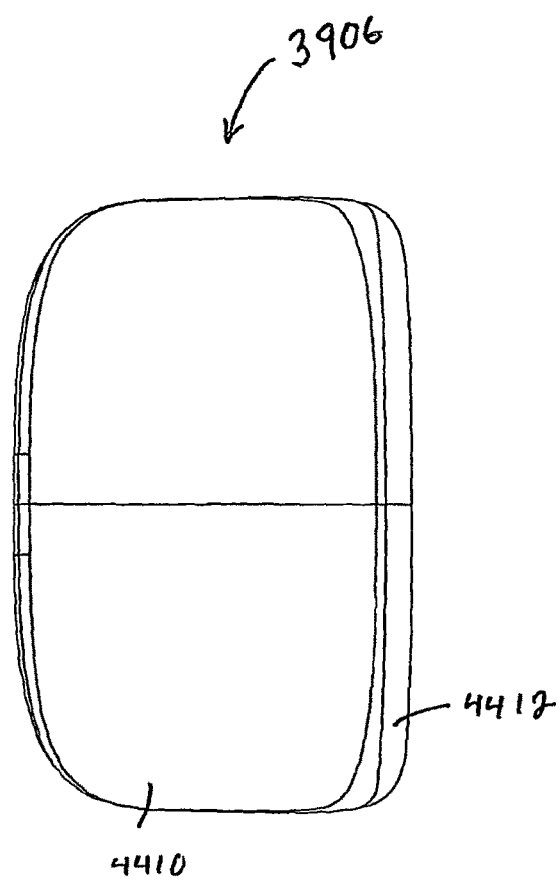

The lower ends 4012 and 4112 of the seat back cushion support 3803 and seat back cushion 3904 include aligned pairs of spaced apart notches 4014 and 4114, respectively. The notches form lower, central flaps 4016 and 4116 of the seat back cushion support 3803 and the seat back cushion 3904 respectively. The lower central flaps 4016, 4116 are disposed over components of the adjustment and folding mechanism 600. The lower, central flaps 4016, 4116 allow the seat 102 with a cushion an cushion support of the embodiment illustrated by FIGS. 41A-41C, 42A, and 42B to be folded. Referring to FIGS. 43A-43C, when the seat back 104 is lifted upward for folding, the lower end 4192 of the seat back cushion 3904 extends downward past a portion of the base member 1110 (see FIG. 43C) of the adjustment and folding mechanism 600. The aligned spaced apart notches 4014, 4114 are disposed on opposite sides of the base member 1110. However, the notches can have a wide variety of different configurations. When the seat back 104 is folded forward, the flaps 4016, 4116 engage the base member 1110 of the folding mechanism and flexes or bends and the remainder of the cushion 3904 clears the base member 1110. The cushion support and/or the cushion in the flap area may be made weaker, thinner, etc. than the remainder of the cushion support and/or foam to facilitate the flexing or bending and thereby act as a hinge. Further, the cushion material and/or cushion support material in the flap area may be a separate piece, or may be omitted. Any arrangement that allows folding or hinging (indicated by dashed line 4017 in FIG. 41B) of the seat back 104, while covering the adjustment and folding mechanism 600 may be used.

The headrest 3906 can take a wide variety of different forms. In the embodiment illustrated by FIGS. 44A-44F, the headrest 3906 comprises a molded foam piece with a fabric cover. The headrest includes a rearward extending portion 4410 and a downwardly extending portion 4412. In the illustrated embodiment, the rearward extending portion 4410 extends rearward over the seatback cushion 3904 and the downwardly extending portion 4412 extends downward past the top of the seat back cushion 3904. This provides the visual impression of a "waterfall" in the sense that the headrest appears to flow over the top end of the seat back cushion 3904.

Figure 45A:
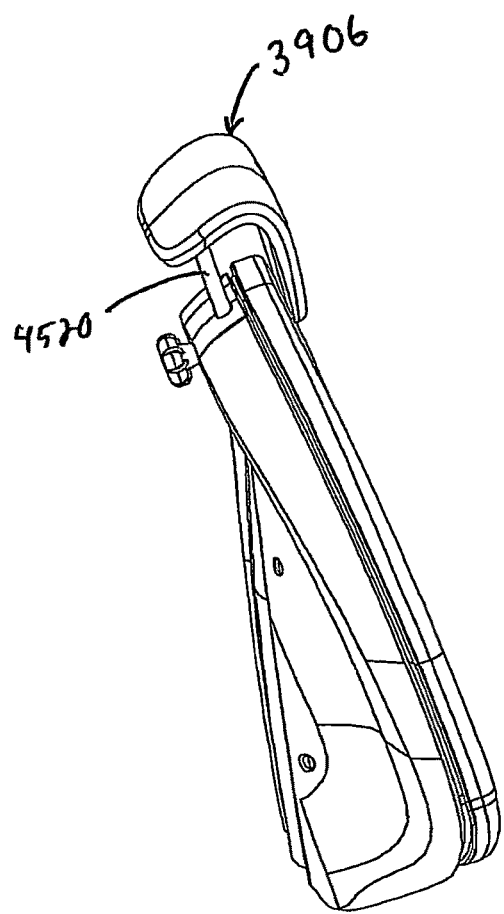
FIG. 45A is a perspective view of an exemplary embodiment of a seat back with a headrest in an extended position.
Figure 45B:
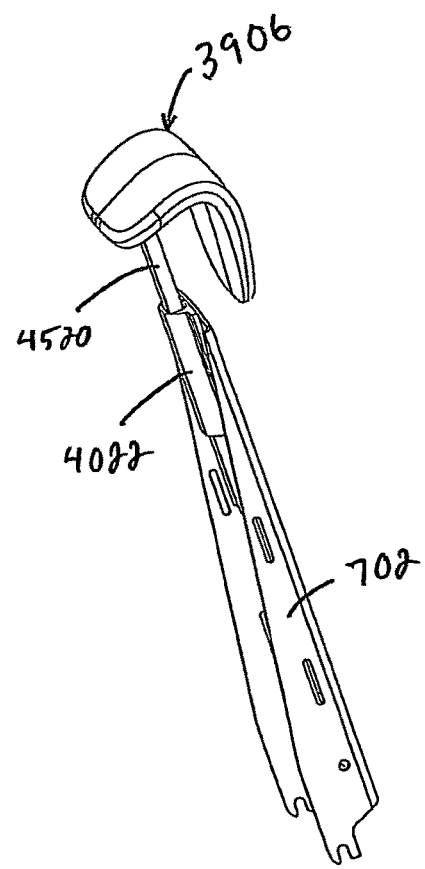
FIG. 45B is a perspective view of a seat back support member and a headrest in an extended position.
Figure 45C:
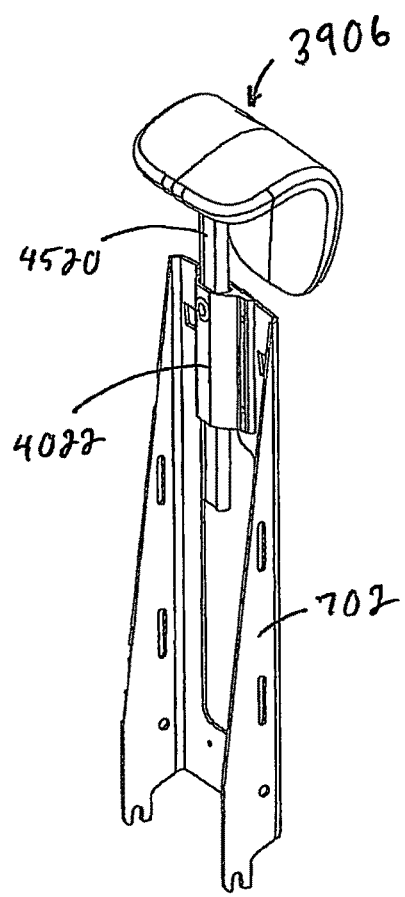
FIG. 45C is another perspective view of the seat back support member and a headrest in an extended position.

Referring to FIGS. 45A-45C, in an exemplary embodiment the headrest 3906 is optionally telescopically mounted, so that the headrest can be raised and lowered with respect to the seat back rear cover 3902, the seat back cushion support 3803, and the seat back cushion 3904. This telescopic mounting can be done in a variety of different ways. In the illustrated embodiment, a shaft 4520 is fixed to the headrest 3906 and a bracket 4022 is fixed to the back support member 702 of the adjustment and folding mechanism 600. The shaft 4020 is slideable in the bracket 4022 to adjust the position of the headrest 3906. A clamp, setscrew, or other position setting device selectively fixes the position of the shaft 4020 with respect to the bracket 4022 to set the position of the headrest 3906.

Figure 46A:
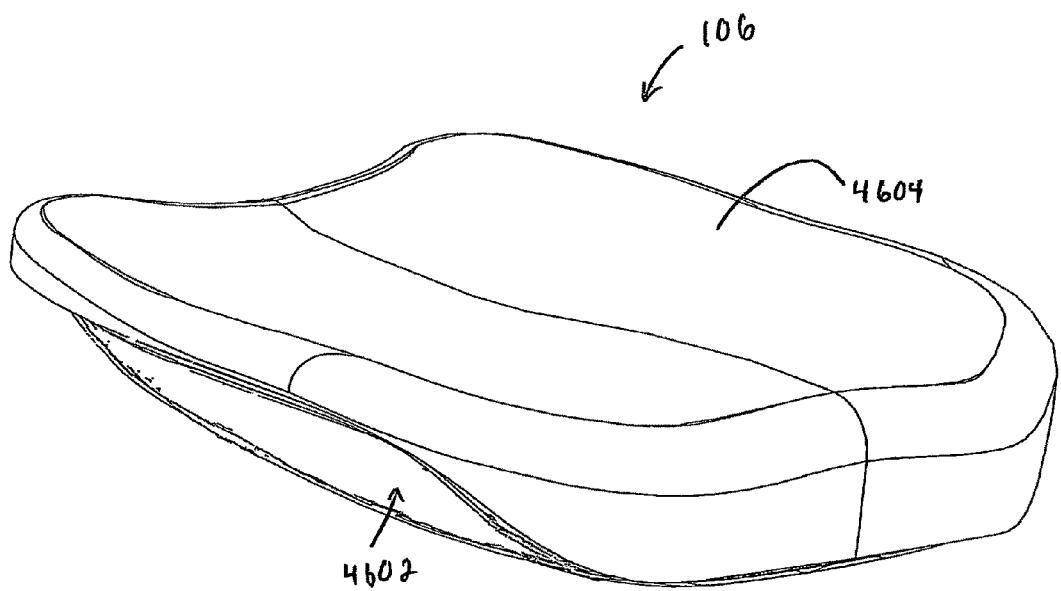
FIG. 46A is a perspective view of an exemplary embodiment of a seat bottom.
Figure 46B:
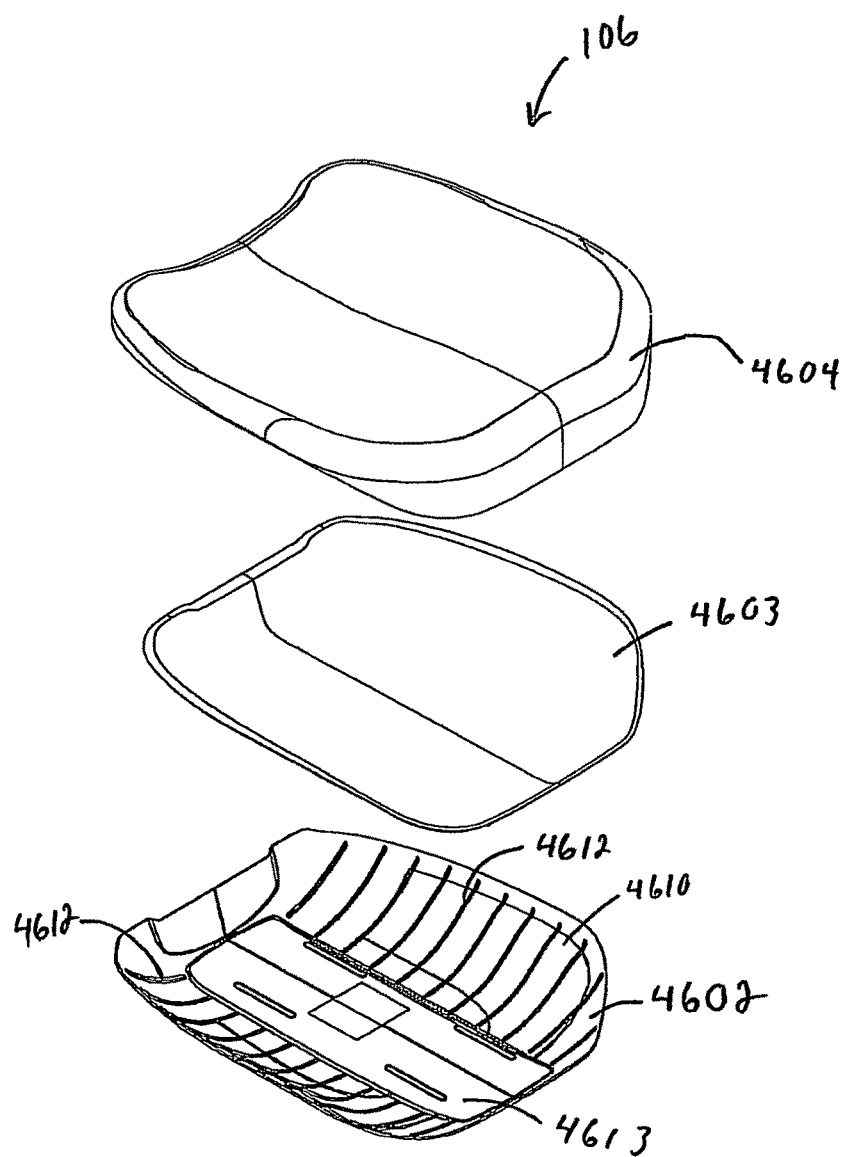
FIG. 46B is an exploded perspective view of the seat bottom of FIG. 46A.
Figure 46:
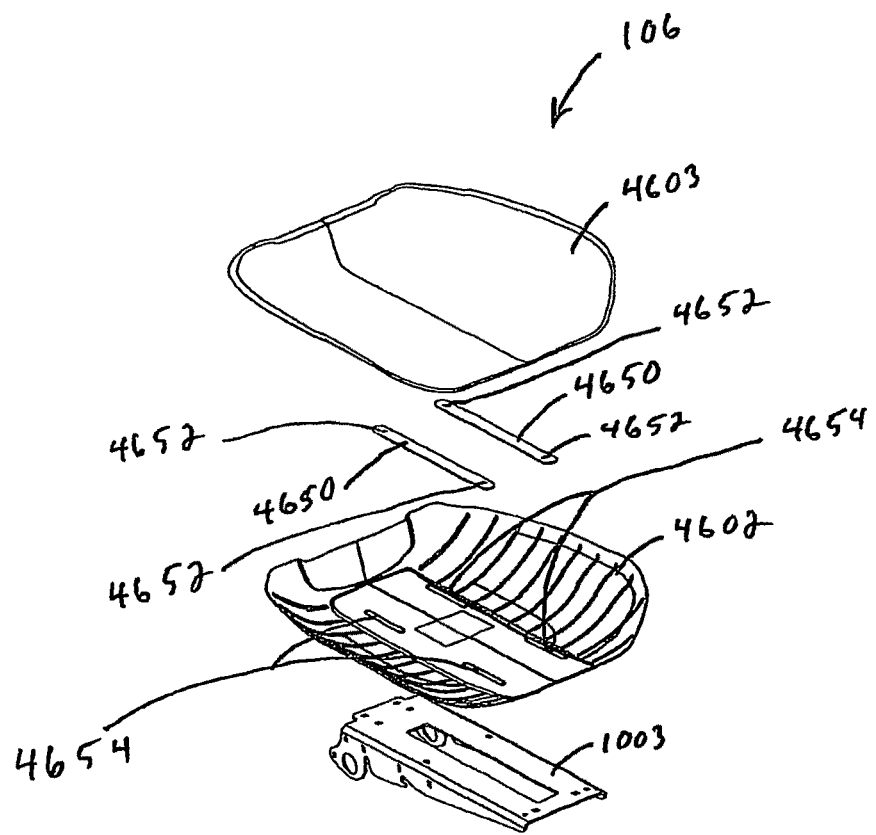
FIG. 46C is an exploded perspective view of the seat bottom of FIG. 46A with optional straps for reinforcement of a connection between the seat bottom and a seat support member.

In the embodiment illustrated by FIGS. 46A and 46B, the seat bottom 106 includes a base member 4602, a cushion support member 4603, and a seat bottom cushion 4604. Referring to FIG. 46C, reinforcement members or straps 4650 may be provided between the base member 4602 and the cushion support member 4603 to reinforce the connection between the base member 4602 and the support member 1003. The reinforcement members or straps 4650 include holes 4652 that are alignable along the length of slots 4654 in the base member 4602. Fasteners secure the straps 4550 to the support member 1003, with the base member 4602 secured in between. The straps may be made from metal (with the base member being made from plastic) to strengthen the connection between the base member 4602 and the support member 1003. The slots allow the position of the seat bottom 106 to be adjusted fore and aft with respect to the support member 1003 as described above and with respect to the straps 4650. Once the seat bottom 106 is in the desired position, the fasteners are tightened.

Referring to FIGS. 47A-47G, the cushion support member 4603 is coupled to the base member 4602 in a manner that provides some suspension or resilience to the cushion support member 4603 in an exemplary embodiment. This suspension or resilience provides a smoother ride or feel to the user. The seat bottom cushion 4604 is secured to the cushion support member 4603 (FIG. 46A).

The base member 4602 can take a wide variety of different forms. In the embodiment illustrated by FIG. 46B, the base member 4602 is a molded plastic piece. The base member 4602 includes a bottom concave pan portion 4610 and a plurality of reinforcement portions 4612. The reinforcement portions 4612 can take a wide variety of different forms. In an exemplary embodiment, the reinforcement portions 4612 provide structural rigidity to the pan portion 4610. In the illustrated embodiment, the support portions 4612 comprise a plurality of laterally extending (extending side to side) ribs or walls. However, the support portions may extend longitudinally, may extend both longitudinally and laterally, may form a lattice, may form a honeycomb configuration, may be discretely positioned, may be a different material or durometer than the material of the pan portion 4110, etc.

Figure 47A:
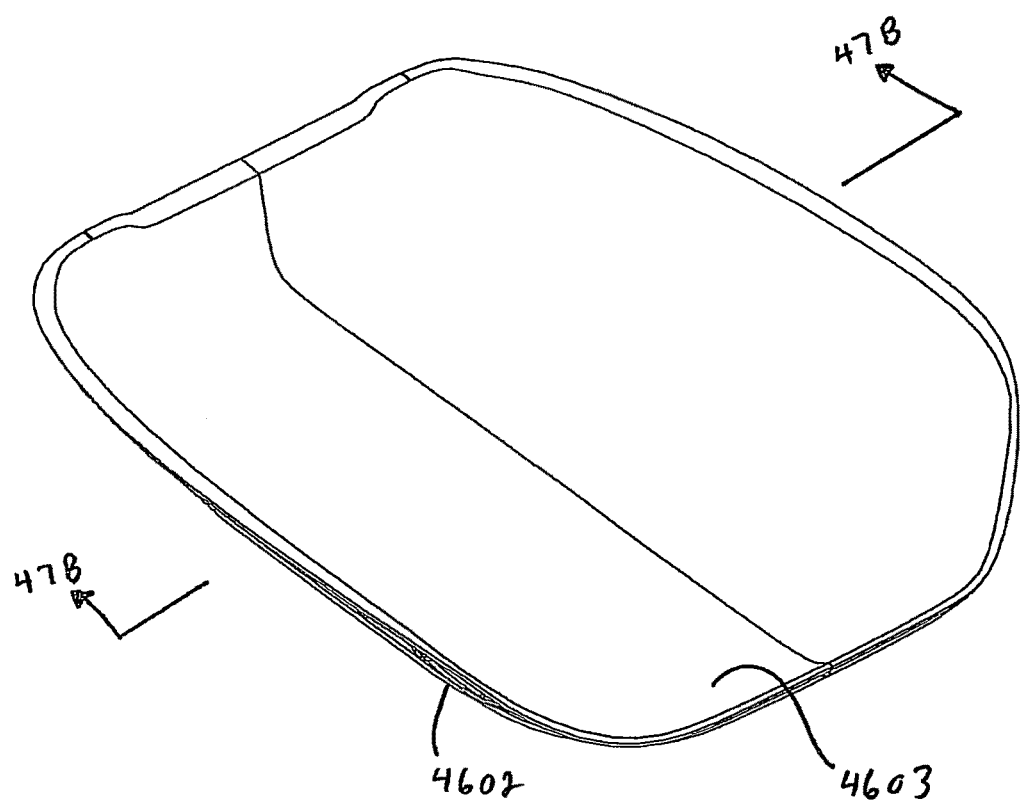
FIG. 47A is a perspective view of an exemplary embodiment of a seat bottom.
Figure 47B:
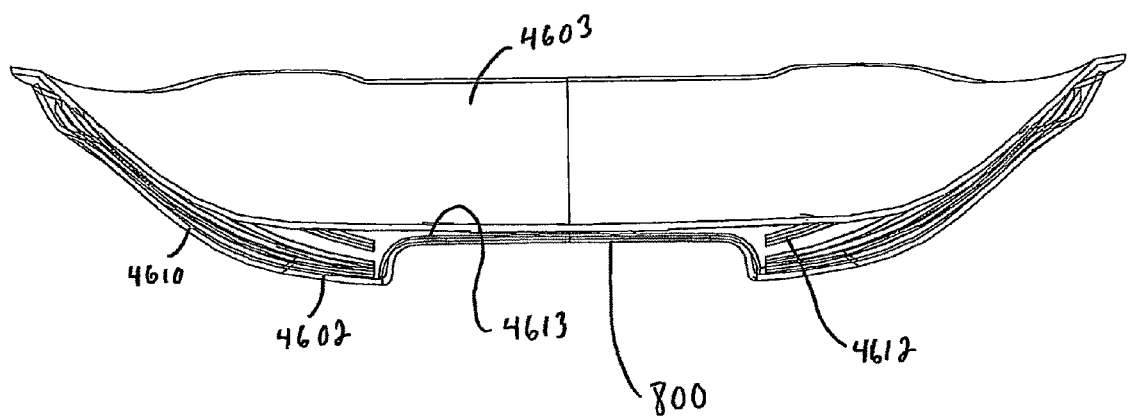
FIG. 47B is a sectional view taken along the plane indicated by lines 47B-47B in FIG. 47A.
Figure 47C:
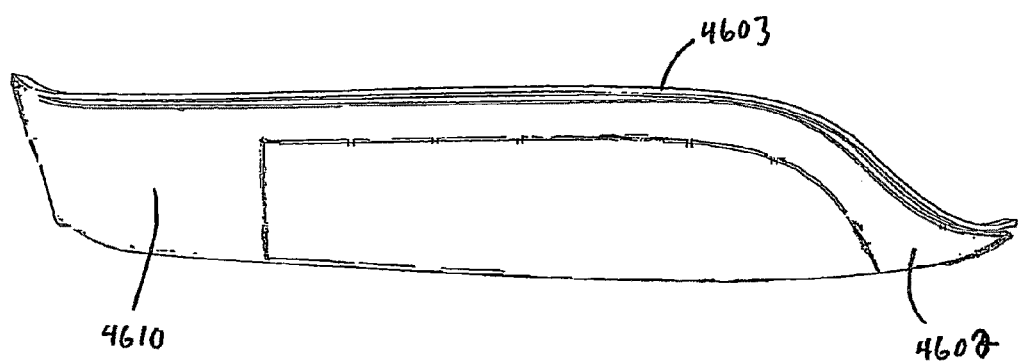
FIG. 47C is a side view of the seat bottom of FIG. 47A.
Figure 47D:
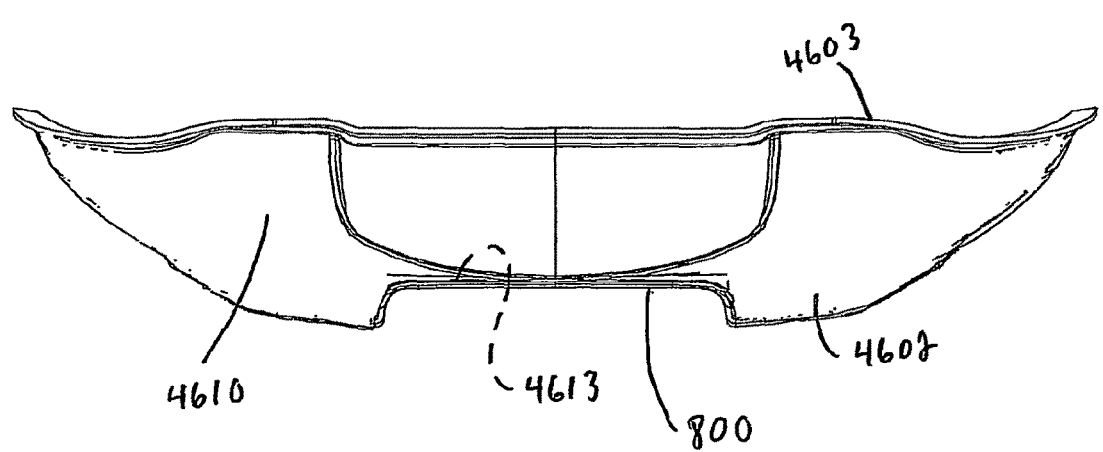
FIG. 47D is a rear view of the seat bottom of FIG. 47A.
Figure 47:
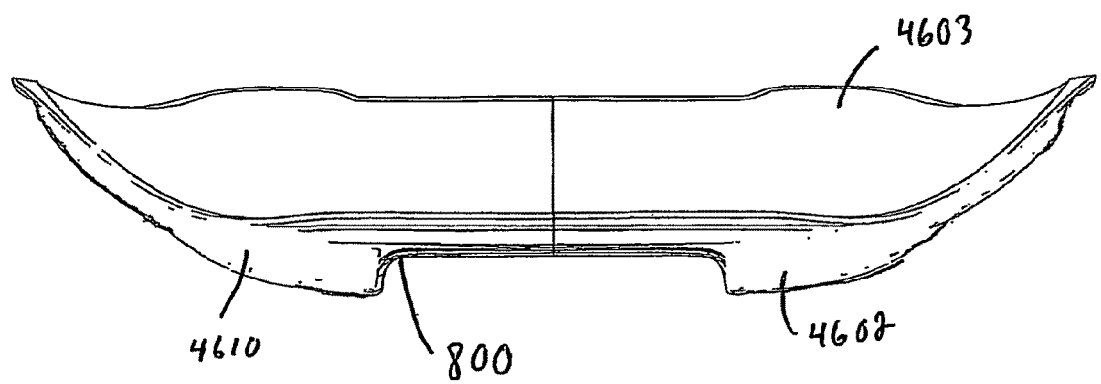
FIG. 47E is a front view of the seat bottom of FIG. 47A.
FIG. 47F is a top view of the seat bottom of FIG. 47A.
FIG. 47G is a bottom view of the seat bottom of FIG. 47A.
Figure 47F:
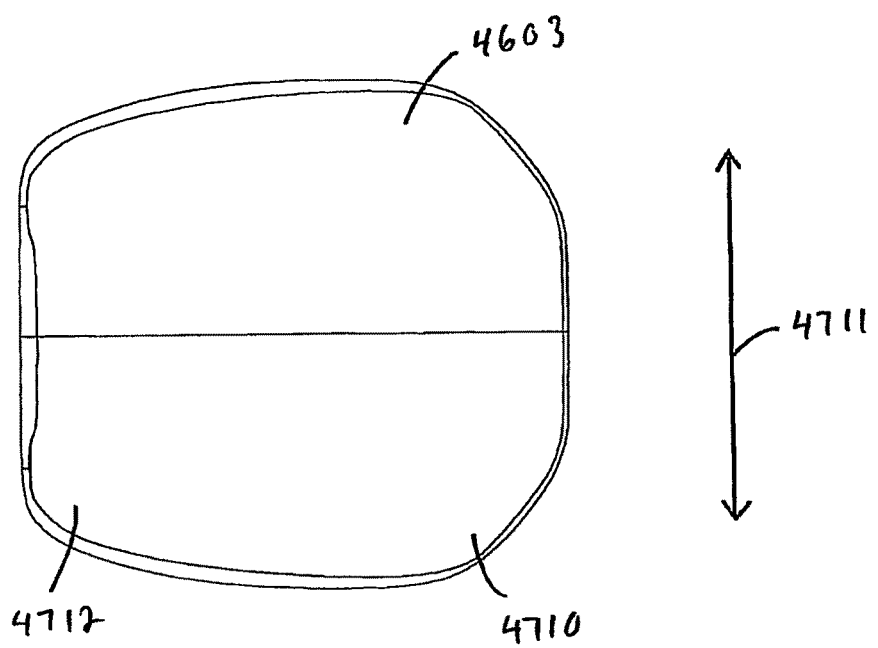
Figure 47G:
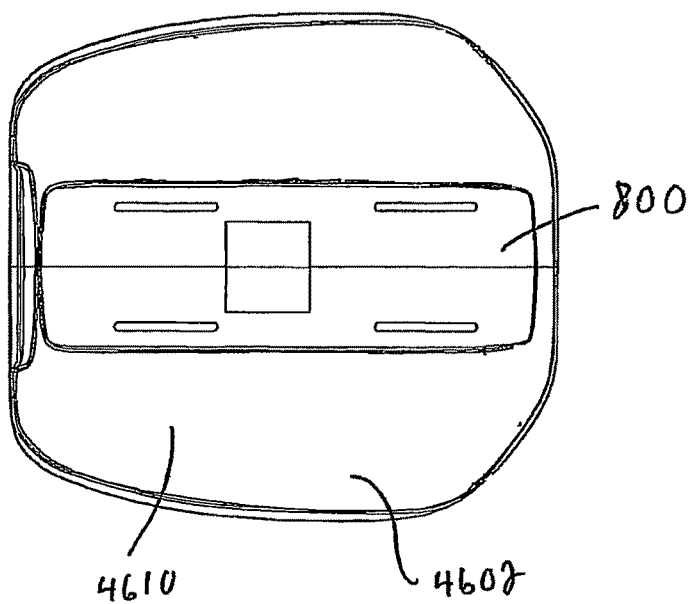

The cushion support member 4103 can take a wide variety of different forms. In the embodiment illustrated by FIG. 4603, the cushion support portion 4603 is a molded plastic piece. The illustrated cushion support member 4603 is in the form of a concave pan. The cushion support member 4603 is attached to the base member 4602. This connection may take a wide variety of different forms. Portions of the cushion support member 4603 may be attached to the pan portion 4610. For example, a periphery of the cushion support member 4603 may be attached to the periphery of the pan portion 4610. Referring to FIG. 47B, the attachment around the periphery may suspend the cushion support member 4603 above the support portions 4612 and/or an elevated portion 4613 that corresponds to the mounting recess 800. When a user sits on the seat, the cushion support member 4603 may flex somewhat, with the bottom of the concave pan remaining spaced apart from the support portions 4612 and/or the elevated portion 4613. Alternatively, a portion of the weight may optionally be supported by the support portions 4112 and/or the elevated portion 4613. The cushion support member 4103 may be attached to the base member 4602 in any manner that provides resilient support for the cushion support member 4603.

The base member 4602 and the cushion support member 4603 may have a variety of different shapes and sizes. In the embodiment illustrated by FIG. 47F, a forward end 4710 of the base member 4602 and cushion support member 4603 assembly is wider in the direction indicated by arrows 4711 than a rear end 4712. The seat bottom cushion 4604 can take a wide variety of different forms. The seat bottom cushion 4604 may comprise a molded foam piece with a fabric cover.

Figure 48A:
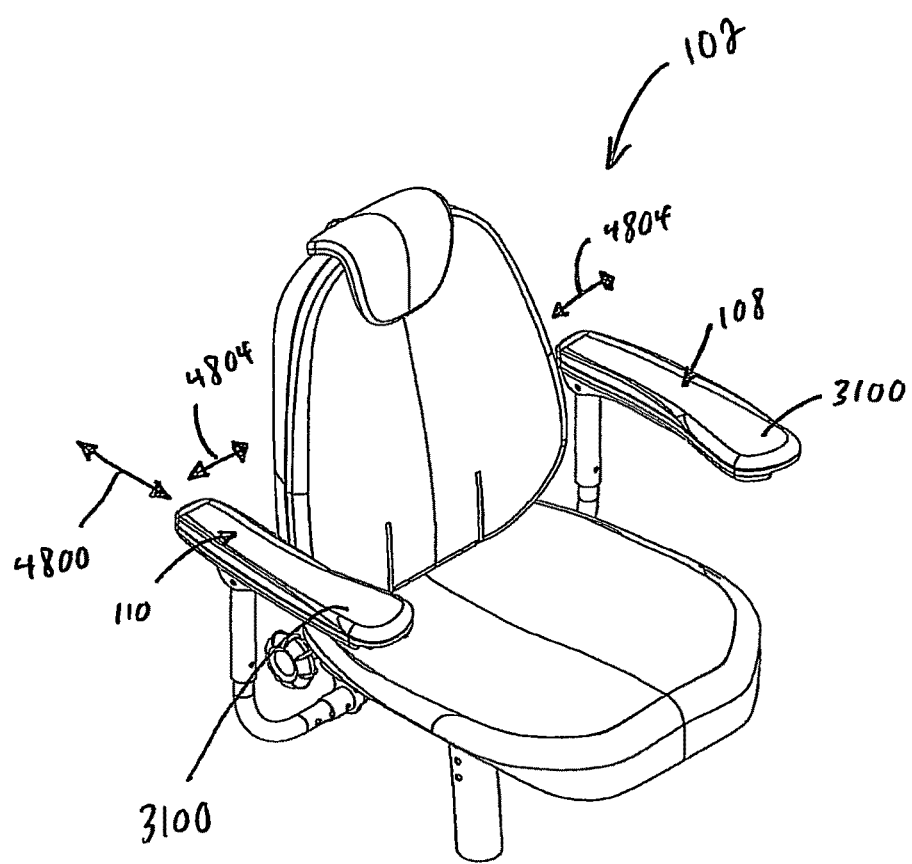
FIG. 48A is a perspective view of a seat assembly with an armrest moved rearward.
Figure 48B:
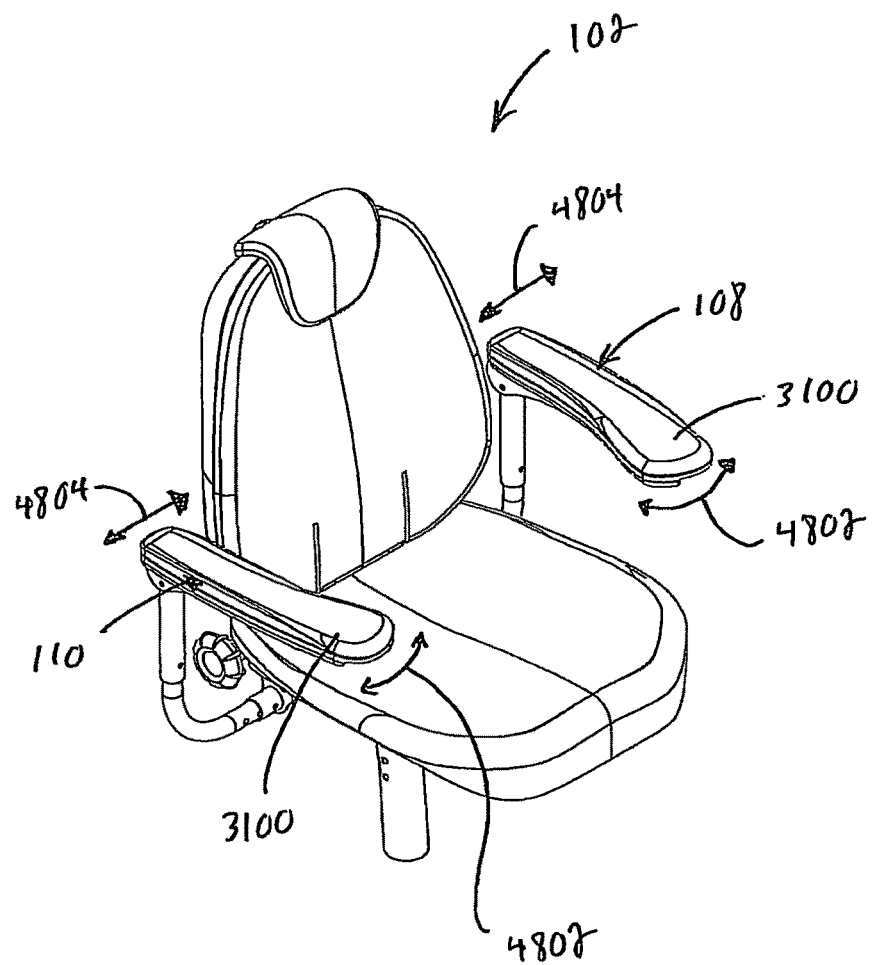
FIG. 48B is a perspective view of a seat assembly with an armrest pivoted inward.

FIGS. 48A and 48B illustrate an embodiment of a seat assembly 102 with armrest assemblies 108, 110 that each have an armrest cushion 3100 that is adjustable. The adjustment of the cushion 3100 may take many forms and a variety of different mechanisms may be used to accommodate the adjustability. For example, the cushion 3100 may be moved fore and aft (indicated by arrow 4800 in FIG. 48A), pivoted inward and outward (indicated by arrow 4802 in FIG. 48B), moved laterally (indicated by arrow 4804), etc. These movements may be facilitated by a wide variety of different mechanisms.

Figure 49A:
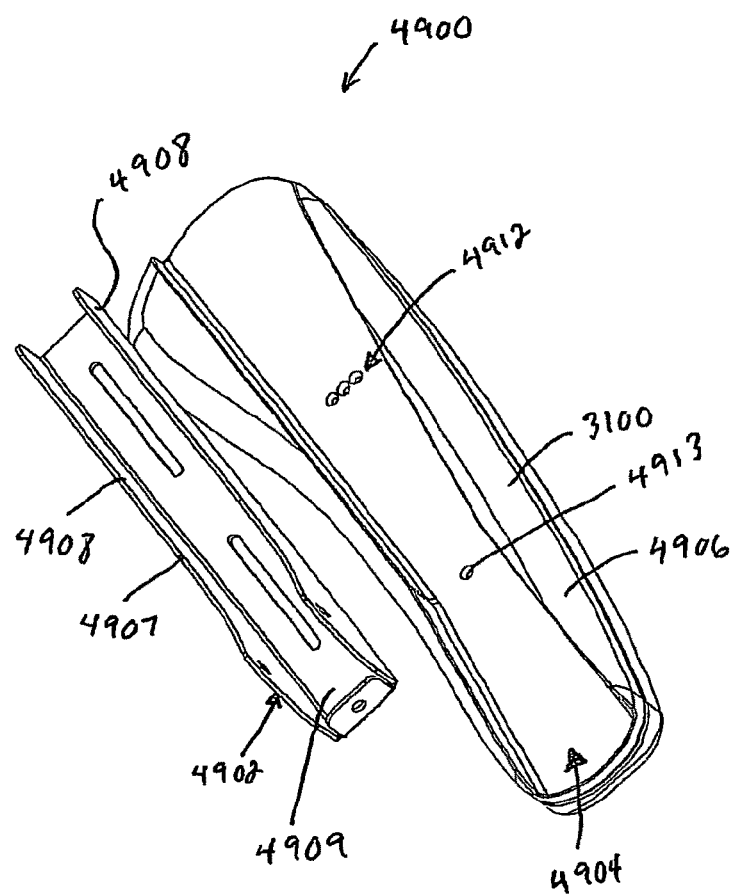
FIG. 49A is an exploded perspective view of an armrest adjustment assembly.
Figure 49B:
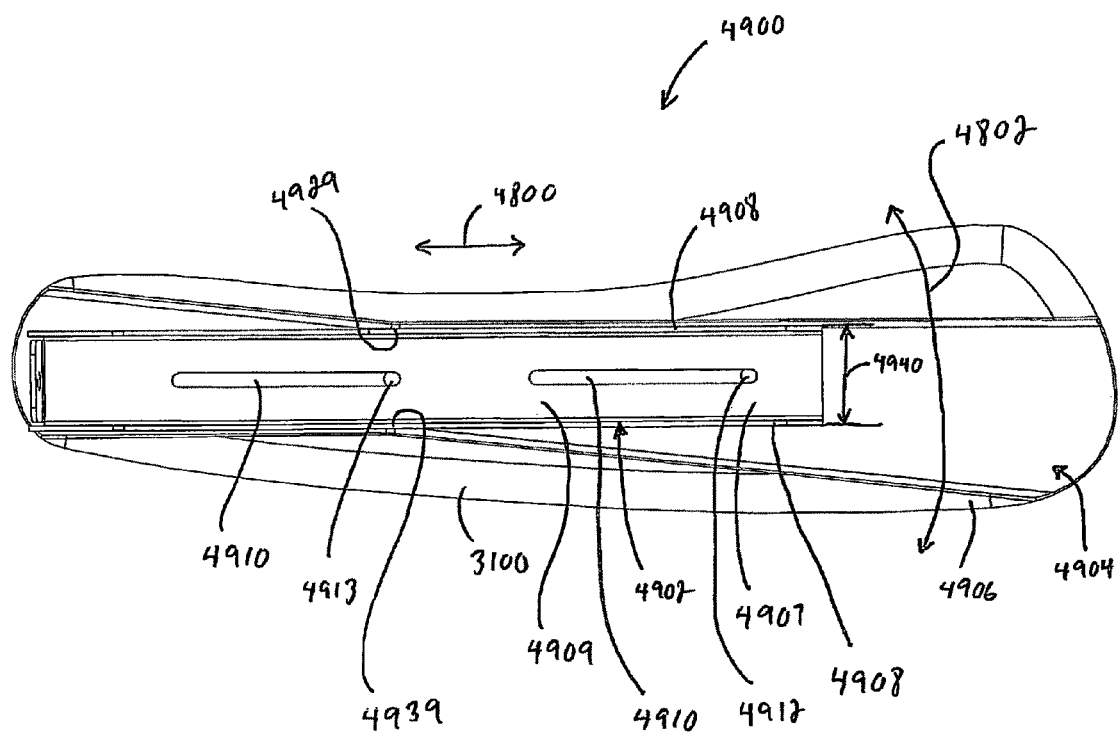
FIG. 49B is a bottom view of the armrest adjustment assembly of FIG. 49A.
Figure 49C:
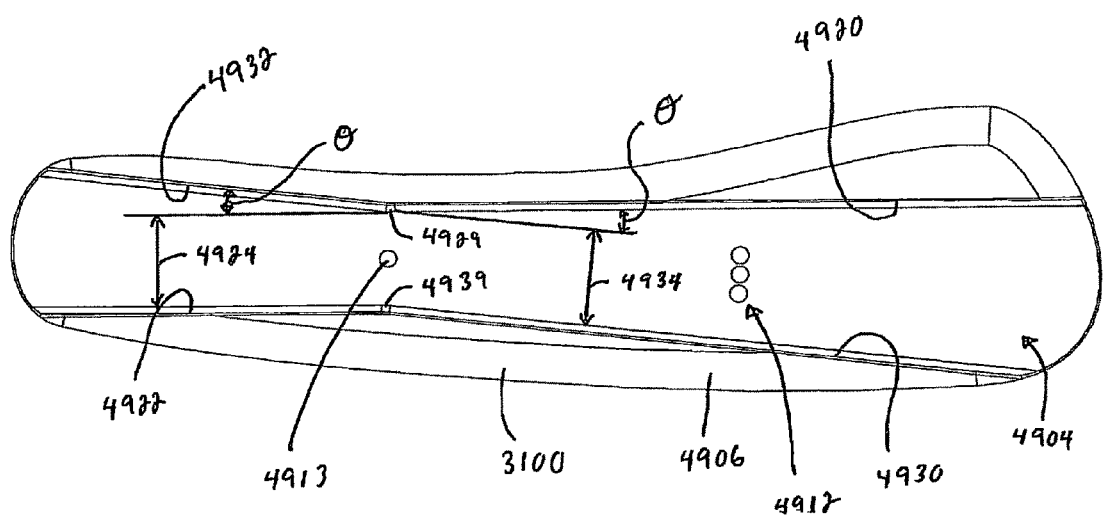
FIG. 49C is a bottom view of the armrest of the armrest adjustment assembly.

FIGS. 49A-49C illustrate one exemplary adjustment mechanism 4900 that can be configured to allow fore and aft adjustment, inward and outward pivotal adjustment, and optionally, lateral adjustment of the cushion 3100. The illustrated adjustment mechanism includes a support member 4902 and a channel 4904 in a lower side 4906 of the cushion. The illustrated support member 4902 is a u-shaped channel member 4907 with spaced apart parallel walls 4908 that are connected by a central wall 4909. The support member 4902 includes one or more slots 4910 and the cushion 3100 includes a plurality of mounting apertures 4912 (front), 4913 (rear). Fasteners that pass through the slots 4910 and into the apertures 4912, 4913 may be used to secure the cushion 3100 to the support 4902. Any alignable aperture arrangement in the support member 4902 and the channel 4904 may be employed. In the illustrated embodiment, the slots 4910 are positionable over the apertures 4912, 4913 to allow the cushion 3100 to be placed at a plurality of different positions.

The positions and numbers of the apertures 4912, 4913, the size, positions, and numbers of slots 4910, and the size and shape of the channel 4904 may be selected to constrain the possible positioning of the cushion 3100 relative to the support member 4902. For example, the adjustment may be constrained to prevent the cushion 3100 from moving to a position where the cushion would collide with the seat back 104 when the seat back is folded down or the armrests 108, 110 are pivoted up, while accommodating users of a variety of different sizes and needs. In the illustrated embodiment the length of the slots 4910 limits the amount of fore and aft adjustability. The optional inclusion of only one rear mounting aperture 4913 prevents lateral adjustment of the cushion 3100 at the location of the single rear mounting aperture. This constraint prevents the rear end of the cushion 3100 from being moved to a position where the narrower rear end of the cushion would collide with the wider lower end of the seat back 104, when the seat back is folded down or the armrests 108, 110 are pivoted up. More rear apertures 4913 can be included to facilitate lateral pivoting and/or lateral movement. The illustrated channel 4904 is configured to prevent substantially all pure lateral movement of the cushion, but could be increased in width to allow for lateral movement (or the support member could be decreased in width). In the illustrated embodiment, the channel 4904 and the front apertures 4912 are configured to allow the cushion 3100 to be pivoted inward, but not so far that the wider front end of the cushion 3100 would collide with the narrower upper end of the seat back 104, when the seat back is folded down or the armrests 108, 110 are pivoted up. This combination of a seat back 104 having a wider lower end and a narrower upper end and an inwardly pivotable armrest cushion 3100 with a narrower rear end and a wider front end comfortably accommodates a wide variety of different users. The wider lower end of the seat back accommodates larger users. The inward pivoting of the wider front end of the armrest cushion makes smaller users comfortable in the wider seat.

Referring to FIG. 49C, the illustrated channel 4904 includes a first forward wall 4920 that is parallel to or substantially parallel to a first rearward wall 4922. The channel 4904 also includes a second forward wall 4930 and a second rearward wall 4932. In the illustrated embodiment, the lateral distance 4924 between the first forward wall 4920 and the first rearward wall 4922 and the lateral distance 4934 between the second forward wall 4930 and a second rearward wall 4932 are substantially the same as the width 4940 (FIG. 49B) of the support member 4902. The illustrated intersection 4929 of the first forward wall 4920 with the second rearward wall 4932 and the illustrated intersection 4939 of the second forward wall 4930 with the first rearward wall 4922 are spaced directly laterally apart. This spacing between the walls and positioning of the intersections 4929, 4939 prevents or substantially prevents purely lateral adjustment of the cushion relative to the support member 4902, since the intersections 4929, 4939 engage the side walls 4908 sides of the support 4902. The spacing of the walls 4920, 4922, 4930, 4932 and/or the locations of the intersections 4929, 4939 can be adjusted to allow for purely lateral positioning of the armrest.

In the illustrated embodiment, an angle θ (FIG. 49C) between the first walls 4920, 4922 and the second walls 4930, 4932 determines the amount of the lateral pivoting that is allowable between the cushion 3100 and the support member 4902. In the illustrated embodiment where the distance between the intersections 4929, 4939 is the same or substantially the same as the width of the support member 4902, the lateral pivoting allowed between the cushion 3100 and the support member 4902 is θ or substantially θ. The lateral pivoting can optionally be further limited by the number and positions of the mounting apertures 4912, 4913.

Figure 50A:
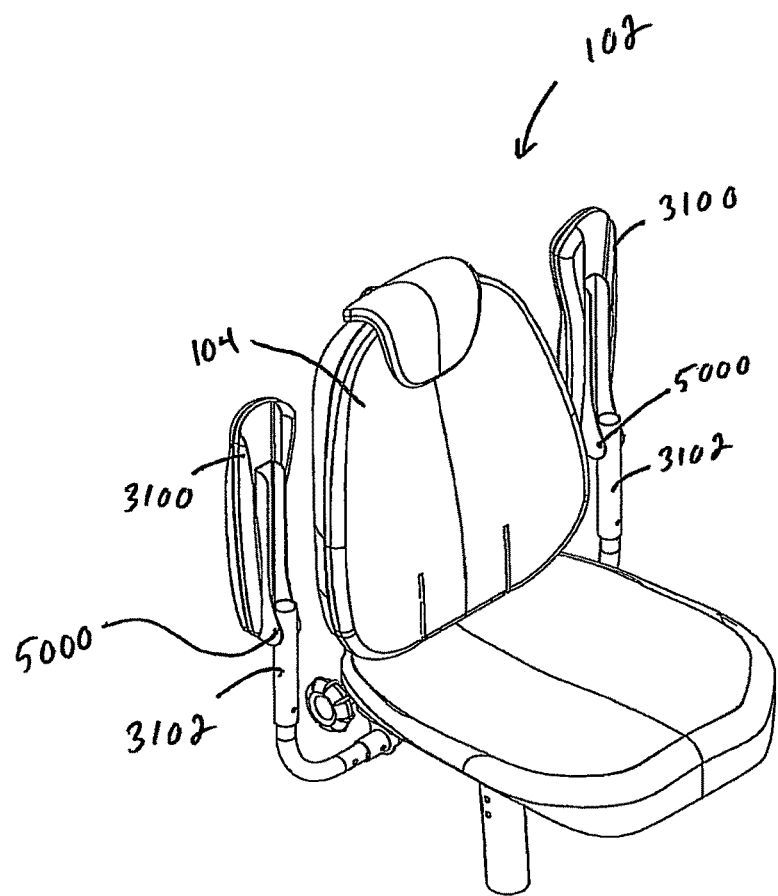
FIG. 50A is a perspective view of an exemplary embodiment of a wheelchair seat assembly with armrests pivoted upward.
Figure 50B:
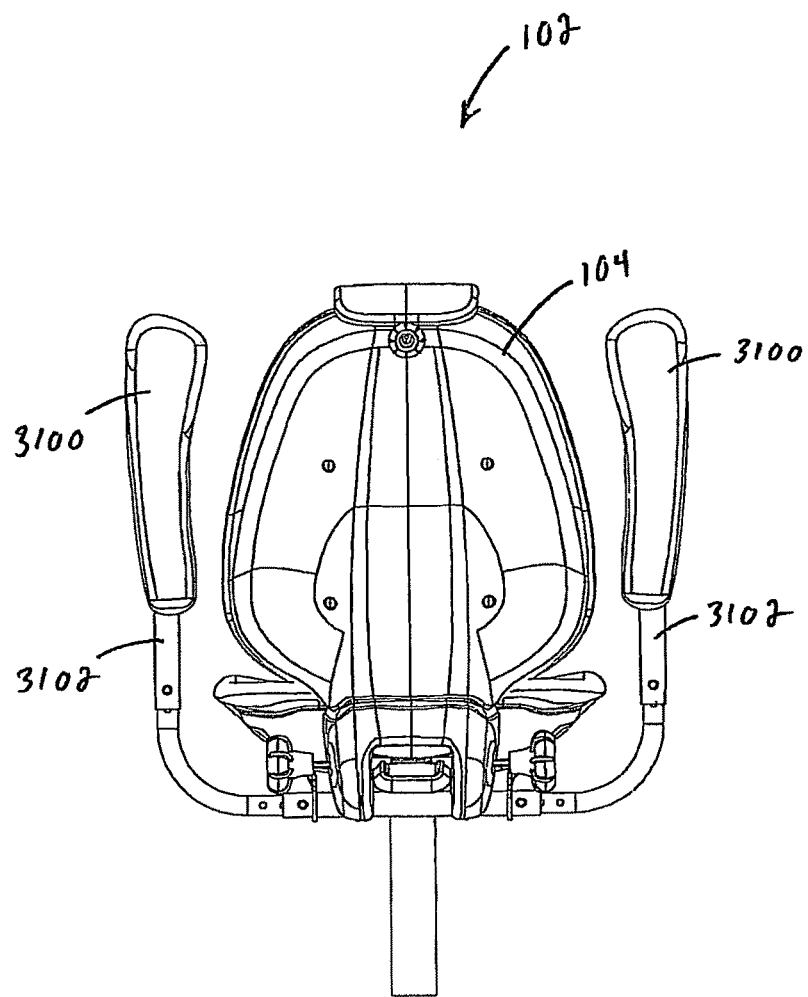
FIG. 50B is a rear view of the seat assembly of FIG. 50A.

Referring to FIGS. 50A and 50B, in one exemplary embodiment the armrest cushion 3100 is pivotally connected at 5000 to a support tube 3102. This pivotal connection 5000 allows the armrest cushions 3100 to be pivoted out of the way when the user is getting on or off the seat assembly 102. The pivotal connection 5000 can take a wide variety of different forms. In the illustrated embodiment, a pin or other fastener pivotally connects the support member 4902 to the support tube 3102.

Figure 50C:
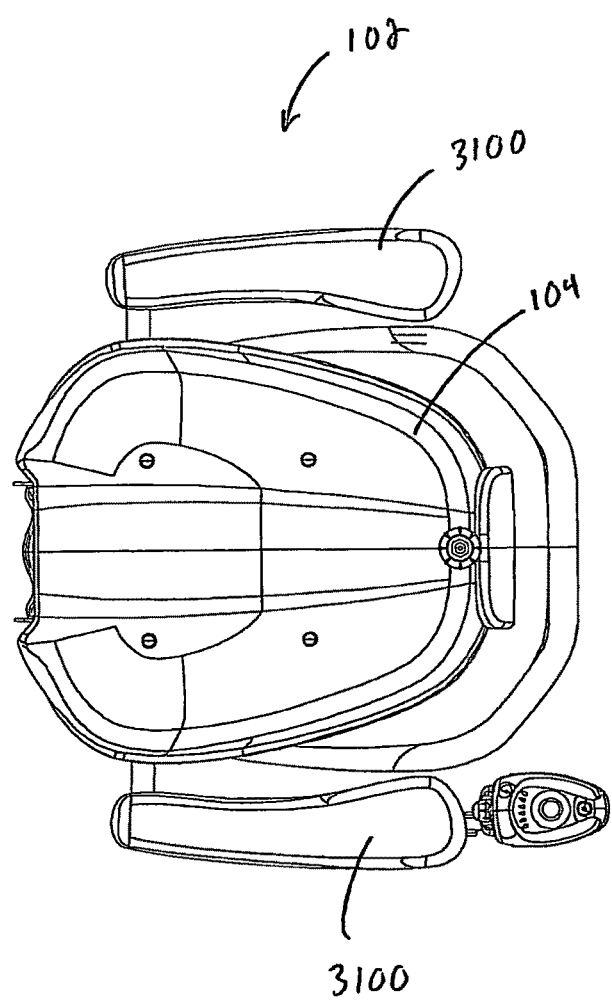
FIG. 50C is a top view of the seat assembly of FIG. 50A with the armrests and seat back pivoted down.

Referring to FIGS. 50B and 50C, the armrests have a shape that complements the shape of the seat back 104. In the illustrated embodiment, the seat back 104 is narrower at the top and the armrest cushions 3100 are wider at the front. When the seat is in the upright position and the armrests are pivoted upward (FIG. 50B) and when the seat is in the folded position and the armrests are in the normal position (FIG. 50C), the armrests frame the seat back 104 with the wide portions of the armrests adjacent to the narrower upper portion of the seat back in both positions. The wider lower portion of the seat back 104 fits nicely between the narrower portions of the armrest cushions 3100 in both positions.

Figure 51A:
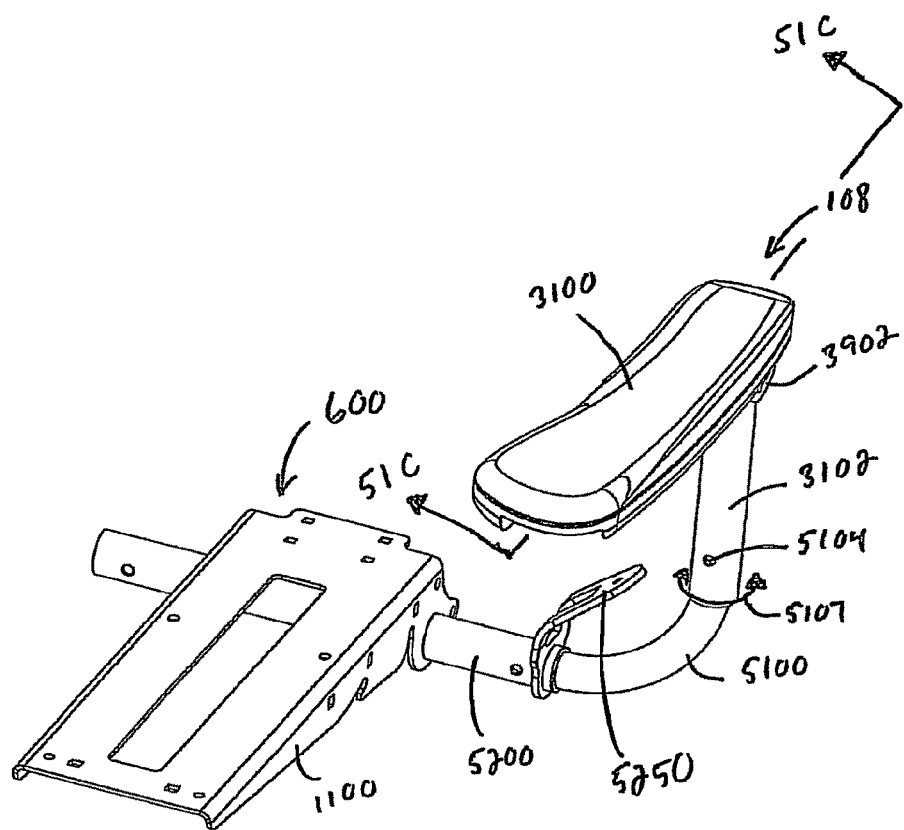
FIG. 51A is a perspective view of an exemplary embodiment of a telescoping armrest support assembly.
Figure 51B:
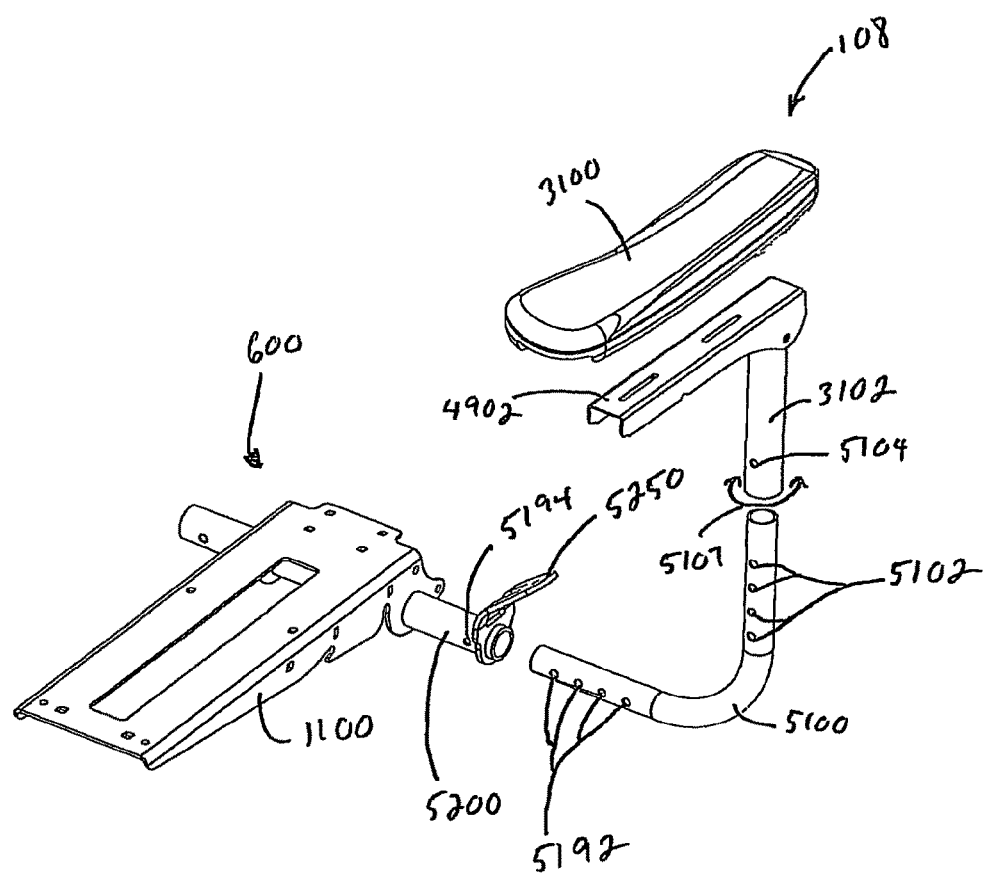
FIG. 51B is an exploded perspective view of the telescoping armrest support assembly of FIG. 51A.
Figure 51C:
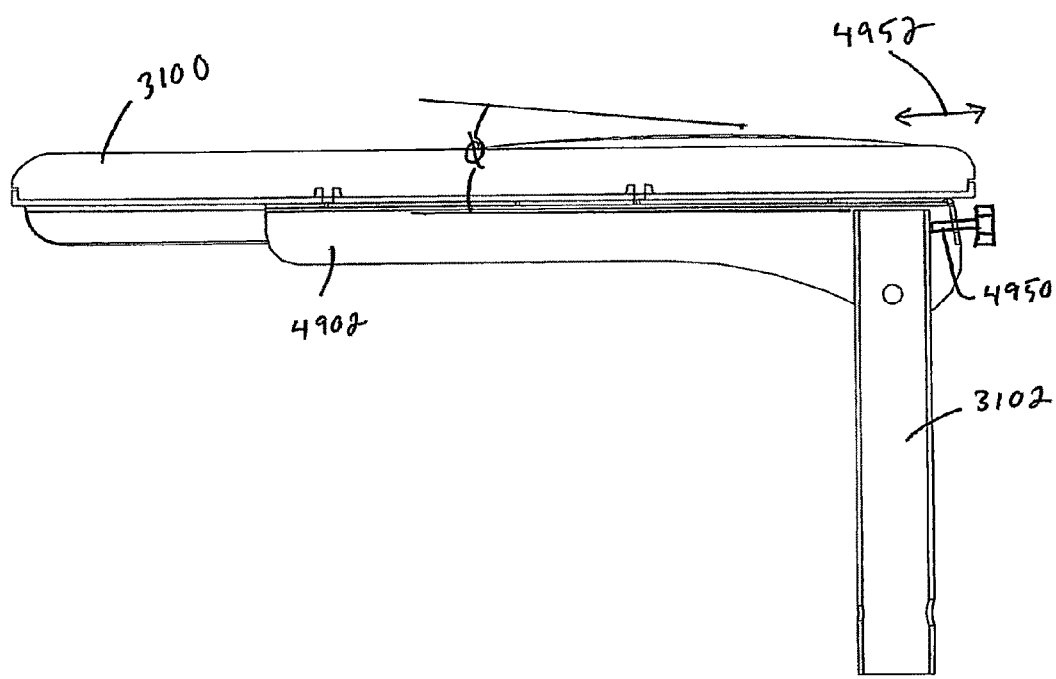
FIG. 51C is a sectional view taken along the plane indicated by lines 51C-51C in FIG. 51A.

FIGS. 51A and 51B illustrate an exemplary embodiment of an armrest assembly 108 that is adjustable. In the illustrated embodiment, the support member 4902 (FIG. 51B) is pivotally connected to the support tube 3102 as described above. Referring to FIG. 510, a set screw 4950 is disposed in the support member 4902 for adjusting the angle D of the armrest when the armrests are in the lowered position. The setscrew 4950 engages the support tube 3102 to set the angle Φ. The setscrew may be moved as indicated by arrow 4952 to adjust the angle Φ. A variety of different adjustment mechanisms may be used to set the angle Φ of the armrest.

The support tube 3102 is telescopically coupled to a support tube 5100. The tube 3102 and the support tube 5100 can be replaced with any telescoping arrangement. A wide variety of different coupling arrangements can be employed to releasably fix the vertical position of the armrest cushion with respect to the seat bottom. In the illustrated embodiment, the armrest cushion 3100 position may be adjusted and fixed through the use of one or more apertures 5102 in the support tube 5100, which are aligned with one or more apertures 5104 in the tube 3102 in a manner similar to the coupling of the seat support members 316, 318. A suitable fastener can then be inserted through the appropriately aligned apertures to fix or maintain them in position. The fastener may be of an easily removable type not requiring the use of tools. Additional apertures may be provided radially around the circumference of the tube 3102 and/or the tube 5100 to allow the position of the tube 3102 to be pivotally adjusted as indicated by arrow 5107.

The armrest assembly 108 can be connected to the seat adjustment and folding assembly 600 in a wide variety of different ways. In the illustrated embodiment, the support tube 5100 is telescopically coupled to a base support tube 5200. The tubes 5100, 5200 can be replaced with any telescoping arrangement. A wide variety of different coupling arrangements can be employed to releasably fix the lateral position of the armrest cushion with respect to the seat bottom 106. In the illustrated embodiment, the armrest cushion 3100 position may be adjusted and fixed through the use of one or more apertures 5192 in the support tube 5100, which are aligned with one or more apertures 5194 in the tube 5200 in a manner similar to the coupling of the tube 5100 with the tube 3102. A suitable fastener can then be inserted through the appropriately aligned apertures to fix or maintain them in position. The fastener may be of an easily removable type not requiring the use of tools. Additional apertures may be provided radially around the circumference of the tube 5100 and/or the tube 5200 to allow the position of the tube 5100 to be pivotally adjusted.

Figure 52:
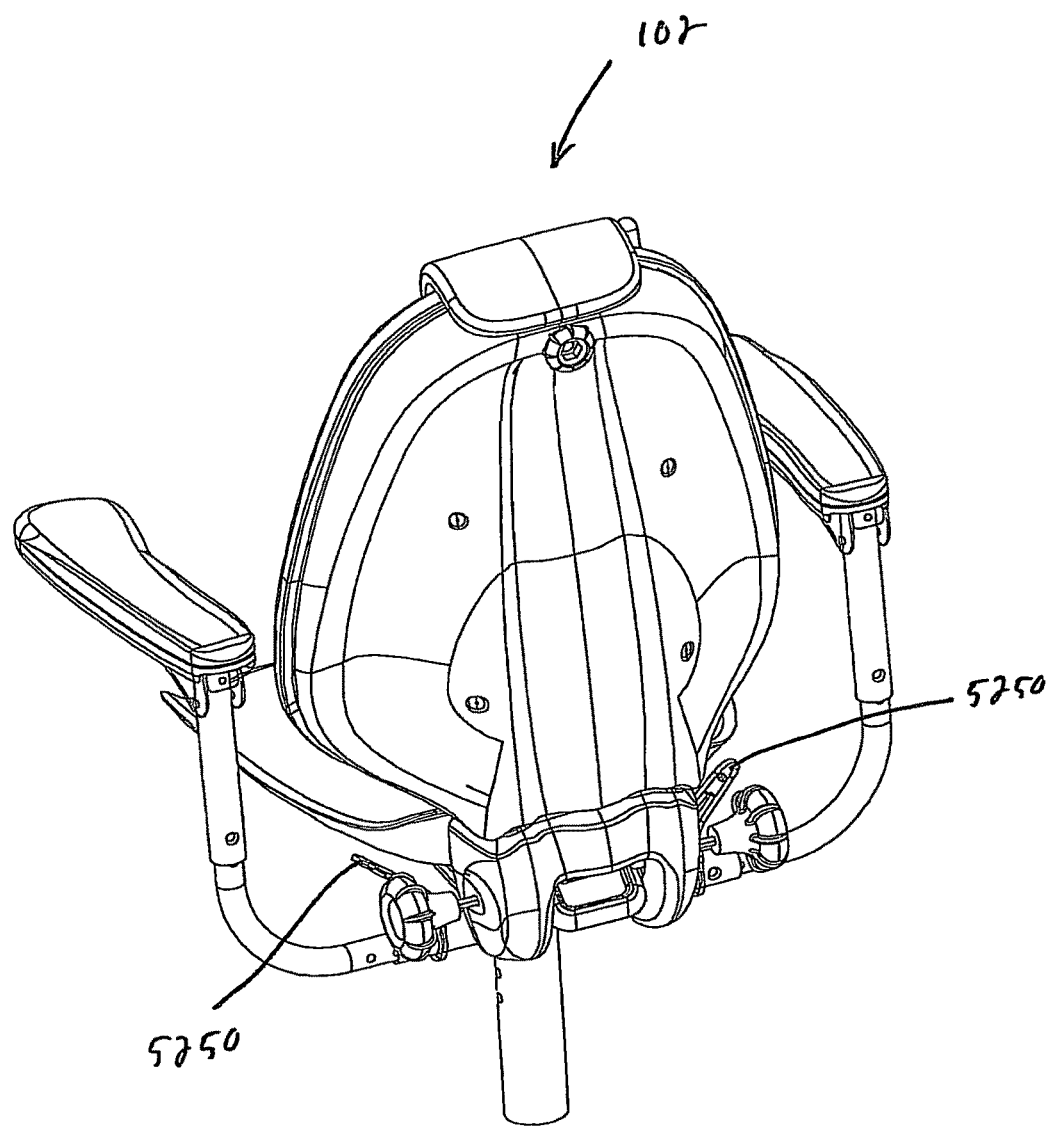
FIG. 52 is a perspective view of an exemplary embodiment of a seat with tie down brackets.

Referring to FIG. 52, the seat assembly 102 may include attachment points 5250 or tie downs. The attachment points may be used to secure the wheelchair in a vehicle or other location, secure a user in the wheelchair, etc. referring to FIGS. 51A and 51B, the illustrated attachment points 5250 are fixed to the seat adjustment and folding assembly 600. However, the attachment points may be connected to any structural component of the seat assembly 102.

Figure 53:
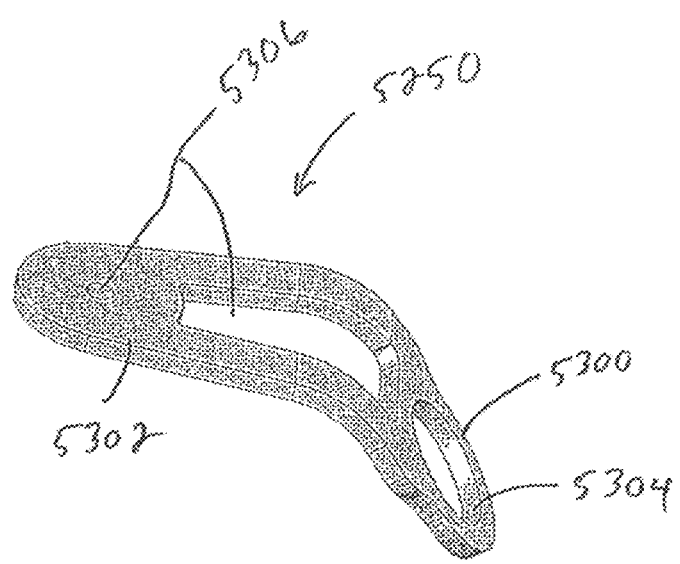

Referring to FIG. 53, the illustrated attachment points 5250 or tie downs include a base portion 5300 and an attachment portion 5302. In the illustrated embodiment, the base portion 5300 comprises a circular ring 5304 that fits around and is secured to the tube 5200 to secure the attachment point 5250 to the seat adjustment and folding assembly 600. However, the base portion 5300 can take any form that facilitates attachment to a structural component of the seat assembly 102. The illustrated attachment portion 5302 includes one or more apertures 5306. A tie down strap or other structure can be secured to the one or more apertures 5306 to secure the wheelchair and/or secure the user in the wheelchair.

Referring to FIGS. 54A-54D, in an exemplary embodiment a tilt angle β between the seat bottom 106 and the seat support member 318 can be adjusted as indicated by arrows 5400. This tilt angle adjustment can be achieved using a wide variety of different types of adjustment mechanisms 5402. Any mechanism that allows the seat to be pivoted forward and rearward can be used. The adjustment mechanism 5402 may be located at a variety of different positions on the seat assembly. Any position that allows the tilt angle β to be adjusted can be selected for the adjustment mechanism 5402. In the example illustrated by FIG. 54B, the tilt mechanism 5402 is positioned between a seat bottom 106 and seat bottom support member 1103. In the example illustrated by FIG. 54C, the tilt mechanism 5402 is positioned between the support member 1103 and a seat attachment plate 3704. In the example illustrated by FIG. 54D, the tilt mechanism 5402 is positioned between the seat attachment plate 3704 and the seat support post 318. Alternatively, the tilt adjustment function can be incorporated into the seat bottom 106, the seat bottom support member 1103, the seat attachment plate 3704, and/or the seat support post 318, without adding a separate tilt adjustment mechanism.

Figure 54:
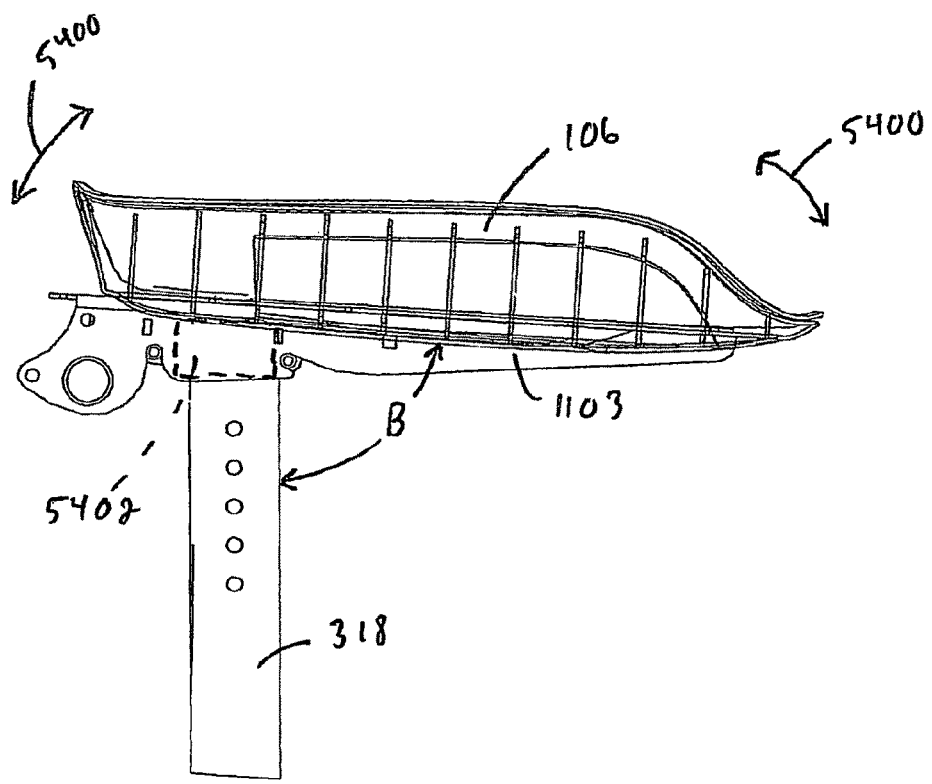
Figure 54B:
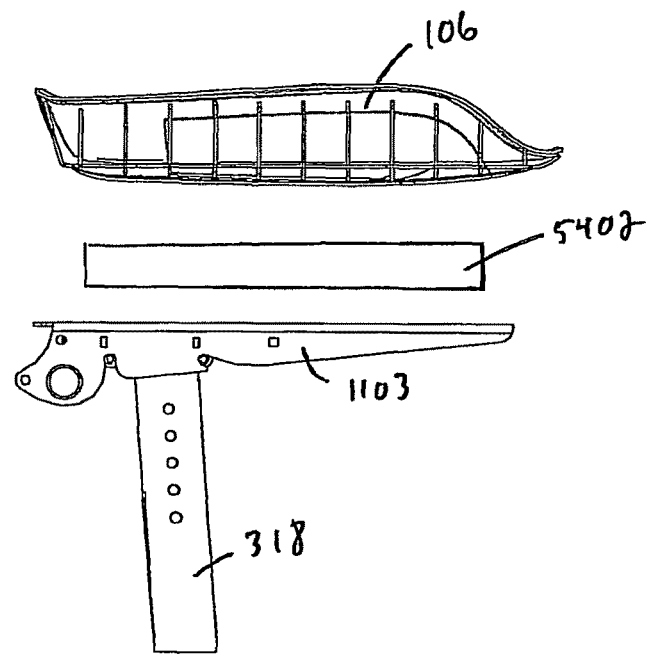
Figure 54C:
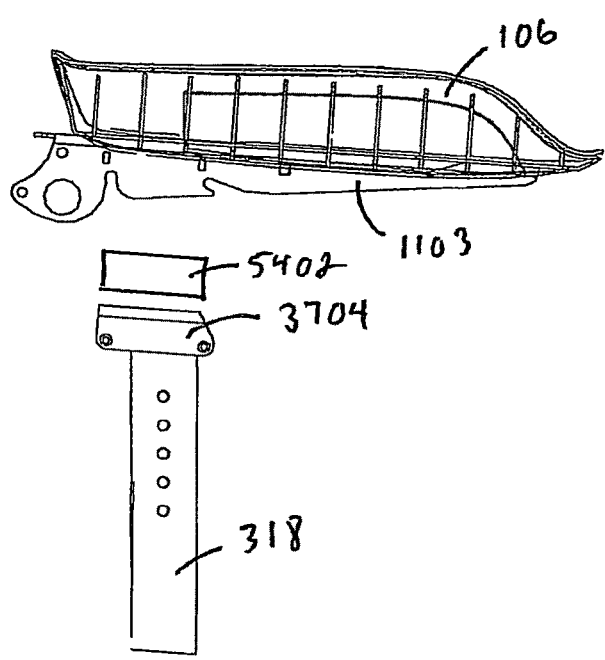
Figure 54D:
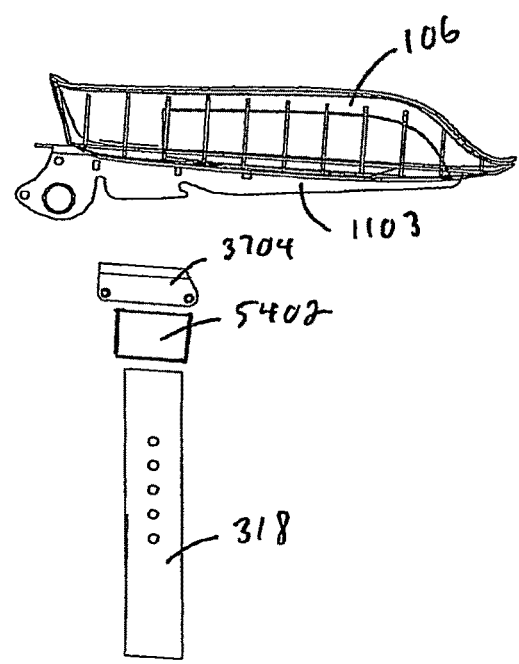
Figure 54E:
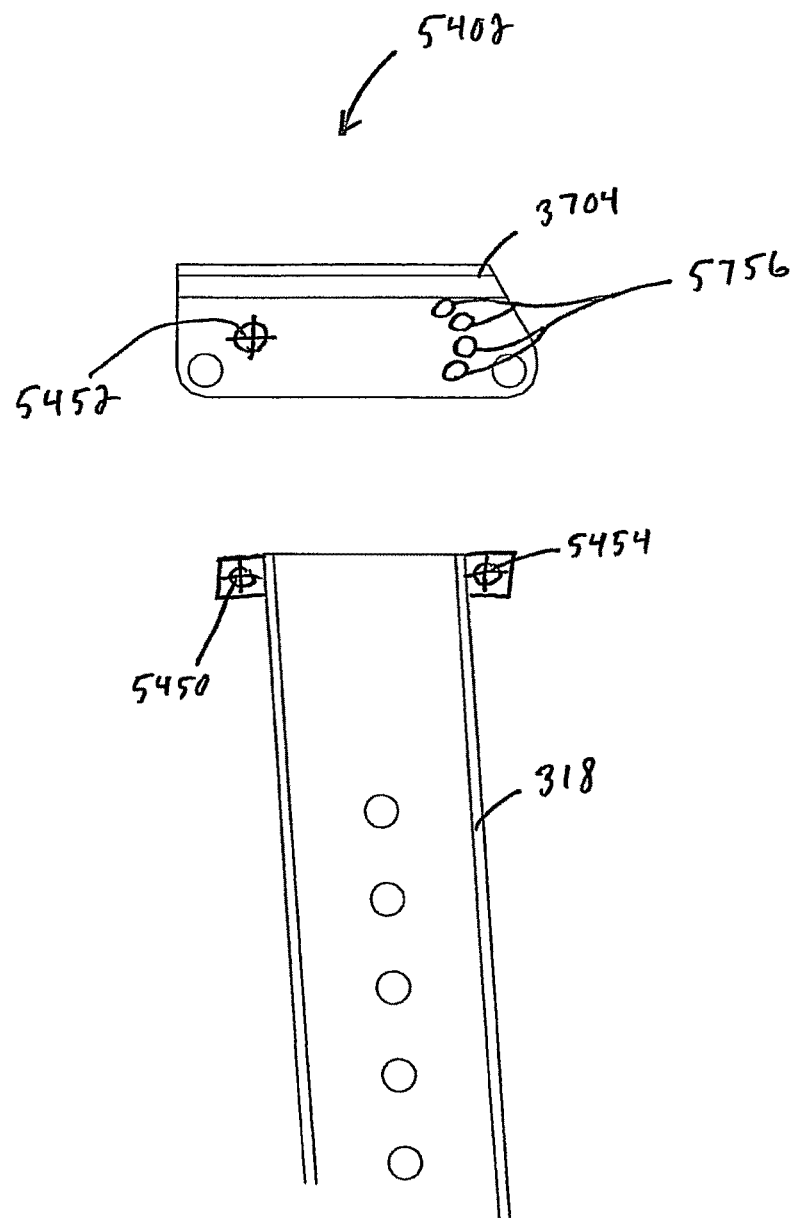
Figure 54F:
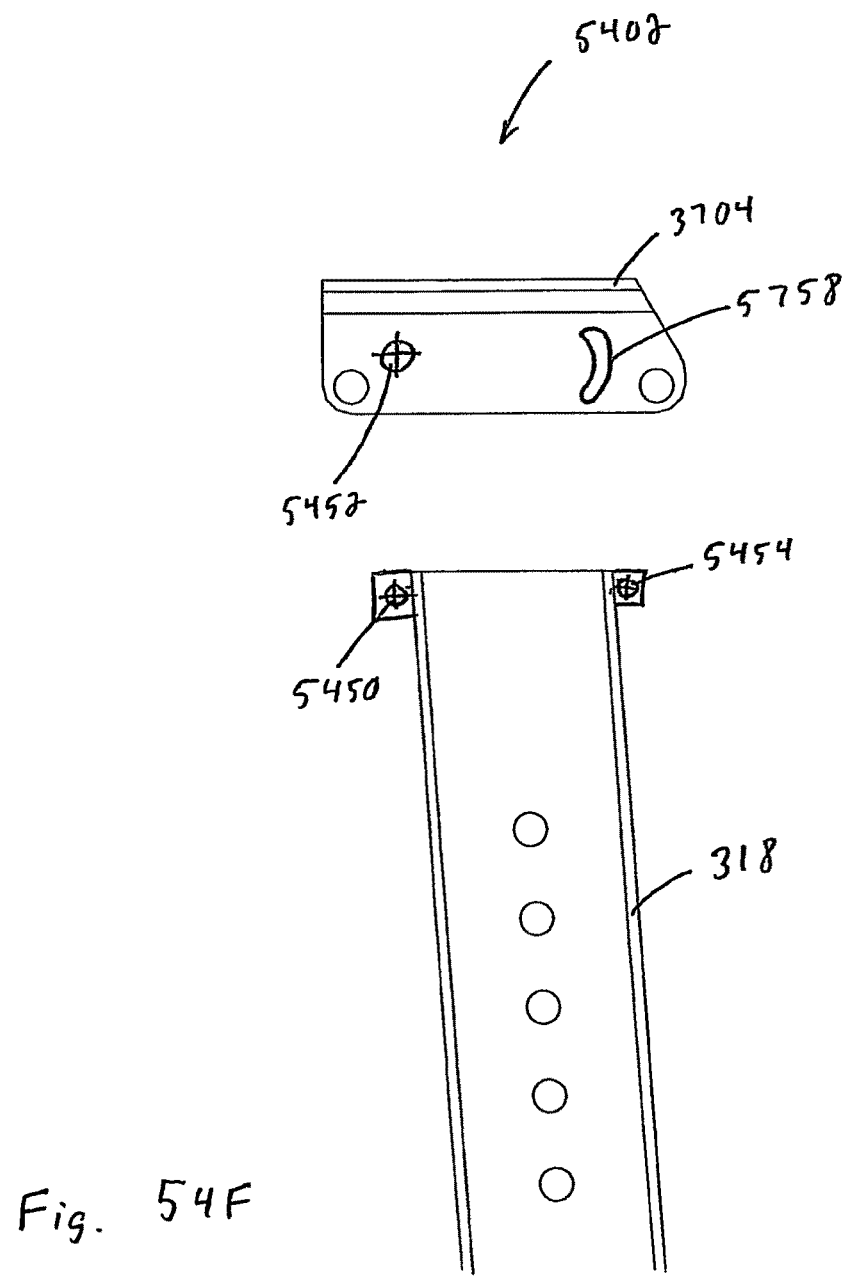

FIGS. 54E and 54F illustrate an example of a tilt adjustment mechanism 5402, where the tilt adjustment function is incorporated into the connection between the seat attachment plate 3704 and the seat support post 318. The tilt adjustment mechanism 5402 illustrated by FIGS. 54E and 54F can be similarly incorporated into the connection between the seat bottom 106 and the seat bottom support member 1103, or the seat bottom support member 1103 and the seat attachment plate 3704. In the example illustrated by FIGS. 54E and 54F, pivot point 5450 of the seat support post 318 is pivotally connected to the pivot point 5452 of the seat attachment plate 3704. Point 5454 of the seat support post 318 can be fixed to the seat attachment plate at a plurality of different positions to facilitate adjustment of the angular position of the seat attachment plate 3704 to the seat support post 318. In the example illustrated by FIG. 54E, a plurality of predetermined discrete attachment points 5756, such as holes, are included in the seat attachment plate 3704. The discrete attachment points 5756 define the number and degree of the angular adjustments. In the example illustrated by FIG. 54F, a range of attachment points are defined by a slot 5758 or other similar arrangement. The slot 5758 defines the range of the angular adjustment that is available.

Figure 36:
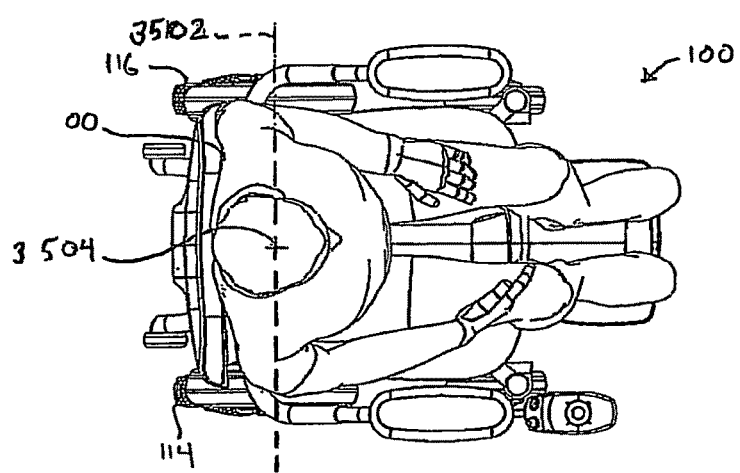

Referring now to FIGS. 5 and 36, side elevational and top plan views of wheelchair 100 are shown having an occupant 3500 seated therein. The position of occupant 3500 can be adjusted by, for example, lateral (either side-to-side or fore/aft) and/or angular movement of back 104 relative to seat 106, and/or lateral (either side-to-side or fore/aft) movement of seat 106 relative chassis 112. In one embodiment, the position of occupant 3500 is configured such that the occupant's center of perception 3504 is substantially aligned with a vertical plane 3502 extending between or through the axles of drive wheels 114 and 116. In other embodiments, the occupant's center of perception 3504 can be placed proximate to vertical plane 3502, either slightly forward or rearward thereof.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

The invention claimed is:

1. A wheelchair seat assembly comprising:
a seat back support for supporting a seat back;
a seat bottom support for supporting a seat bottom;
a seat back recline mechanism;
a seat back folding mechanism;
wherein the seat back recline mechanism and the seat back folding mechanism couple the seat back support to the seat bottom support;
wherein the seat back recline mechanism facilitates pivoting of the seat back support about a first axis with respect to the seat bottom support to allow adjustment and setting of the recline angle;
wherein the seat folding mechanism facilitates pivoting of the seat back support about a second axis with respect to the seat bottom support to allow folding of the seat back toward the seat bottom;
wherein the seat back folding mechanism comprises a lockable pivotable connection between the seat back support and the recline mechanism; and
wherein the lockable pivotable connection is unlocked by lifting the seat back support with respect to the seat bottom support.

2. The wheelchair seat assembly of claim 1 wherein the lockable pivotable connection selectively sets the position of the seat back support with respect to the seat bottom support.

3. The wheelchair seat assembly of claim 1 wherein the seat back recline mechanism comprises a settable pivotal connection between the seat bottom support and the seat folding mechanism.

4. The wheelchair seat assembly of claim 1 wherein the seat bottom support pivots about a third axis with respect to a wheelchair chassis to allow adjusting and setting of a tilt angle of the seat bottom support with respect to the chassis.

5. The wheelchair seat assembly of claim 1 wherein the second axis is moveable with respect to the seat bottom support.

6. The wheelchair seat assembly of claim 1 wherein the seat back recline mechanism comprises a first member fixed to the seat bottom support and a second member pivotably connected to the first member, wherein the second axis is movable with respect to the second member.

7. The wheelchair seat assembly of claim 1 wherein the second axis is formed by fasteners that are slideably and pivotably disposed in slots.

8. The wheelchair seat assembly of claim 1 wherein the second axis is formed by fasteners that are slideably and pivotably disposed in slots such that the seat back can be moved in translation upward along with corresponding translational movement of the fasteners in the slots and such that the seat can be rotated along with corresponding rotation of the fasteners in the slots.

9. The wheelchair seat assembly of claim 1 wherein the lockable pivotable connection comprises a first fastener disposed in an open ended slot to selectively lock the lockable pivotable connection.

10. The wheelchair seat assembly of claim 9 wherein the lockable pivotable connection comprises a second fastener disposed in a closed slot to facilitate upward translation and pivoting of the seat back support relative to the seat bottom support.

* * * * *